US007789267B2

(12) United States Patent
Hutchinson et al.

(10) Patent No.: US 7,789,267 B2
(45) Date of Patent: Sep. 7, 2010

(54) VACUUM PILL DISPENSING CASSETTE AND COUNTING MACHINE

(75) Inventors: Kevin Hutchinson, Pineville, LA (US); Anthony Self, Colfax, LA (US); Joseph Inabnet, Pineville, LA (US); Monroe Milton, Lecompte, LA (US); Mike Bergeron, Pineville, LA (US)

(73) Assignee: McKesson Automation Systems, Inc., Pittsburgh, PA (US)

( * ) Notice: Subject to any disclaimer, the term of this patent is extended or adjusted under 35 U.S.C. 154(b) by 0 days.

(21) Appl. No.: 11/861,557

(22) Filed: Sep. 26, 2007

(65) Prior Publication Data

US 2008/0017661 A1 Jan. 24, 2008

Related U.S. Application Data

(62) Division of application No. 10/423,331, filed on Apr. 25, 2003, now Pat. No. 7,303,094.

(60) Provisional application No. 60/402,485, filed on Aug. 9, 2002.

(51) Int. Cl.
*B65G 59/04* (2006.01)

(52) U.S. Cl. ....................... 221/211; 221/277; 221/278; 221/311; 221/9

(58) Field of Classification Search .......... 221/1–312 C
See application file for complete search history.

(56) References Cited

U.S. PATENT DOCUMENTS 2,002,753 A 5/1935 Parks et al.

(Continued)

FOREIGN PATENT DOCUMENTS

WO WO 03/008308 A1 1/2003

OTHER PUBLICATIONS

Automated Prescription Systems, Inc., Drug-O-Matic from Baker, Storage and Counting System, Operating Manual, Model 200, pp. 1-13.

(Continued)

*Primary Examiner*—Gene Crawford
*Assistant Examiner*—Michael K Collins
(74) *Attorney, Agent, or Firm*—Alston & Bird LLP

(57) ABSTRACT

Methods are disclosed for storing and dispensing medications. A medication storing and dispensing cassette is comprised of a housing defining at least a portion of a bulk storage chamber for storing a medication, defining at least a portion of a pick-up area, and defining at least a portion of a discharge chute sized to temporarily store a quantity of the medication. A divider wall is positioned between the bulk storage chamber and the pick-up area. A gate is positioned to control an exit end of the discharge chute. A rotatable conveying wheel having openings proximate to the periphery thereof is positioned such that a portion of the wheel is in communication with the pick-up area while another portion of the wheel is adjacent to an entrance end of the discharge chute. A calibration arm is positioned adjacent the openings of the rotatable wheel. A baffle is positioned to block those openings in that portion of the rotatable wheel adjacent to the discharge chute. An air agitation system is provided so that pills may be moved from the bulk storage chamber to the pick-up area. In one embodiment, air agitation is used to move pills from the bulk storage chamber to the pick-up area, for automatically setting the position of the calibration arm and for automatically learning the setting for the calibration arm for an unclassified medication.

6 Claims, 45 Drawing Sheets

U.S. PATENT DOCUMENTS

| | | | | |
|---|---|---|---|---|
| 2,442,025 | A | 5/1948 | Smith | |
| 3,045,864 | A | 7/1962 | Hurst et al. | |
| 3,170,627 | A | 2/1965 | Pearson et al. | |
| 3,194,431 | A | 7/1965 | Garvin | |
| 3,215,310 | A | 11/1965 | Hurst et al. | |
| 3,266,664 | A | 8/1966 | Pearson et al. | |
| 3,269,595 | A | 8/1966 | Krakauer et al. | |
| 3,368,713 | A | 2/1968 | Hurst et al. | |
| 3,637,108 | A | 1/1972 | Loesch et al. | |
| 3,715,057 | A | 2/1973 | Becker | |
| 3,722,740 | A | 3/1973 | List | |
| 3,770,164 | A | 11/1973 | Hembree | |
| 3,837,139 | A | 9/1974 | Roseberg | |
| 3,871,156 | A | 3/1975 | Koenig et al. | |
| 3,889,591 | A * | 6/1975 | Noguchi | 101/37 |
| 3,928,753 | A | 12/1975 | Kivett et al. | |
| 3,938,700 | A | 2/1976 | Camp et al. | |
| 3,960,292 | A | 6/1976 | Knapp | |
| 4,018,358 | A * | 4/1977 | Johnson et al. | 221/7 |
| RE29,393 | E | 9/1977 | Becker | |
| 4,111,332 | A | 9/1978 | Hurst et al. | |
| 4,171,065 | A | 10/1979 | Hurst | |
| 4,180,183 | A | 12/1979 | Muller | |
| 4,232,800 | A | 11/1980 | Martin et al. | |
| 4,303,179 | A | 12/1981 | Spring | |
| 4,515,291 | A | 5/1985 | Holmes | |
| 4,546,901 | A | 10/1985 | Buttarazzi | |
| 4,619,369 | A * | 10/1986 | Mertens | 212/304 |
| 4,694,230 | A | 9/1987 | Slocum et al. | |
| 4,697,721 | A * | 10/1987 | Johnson et al. | 221/211 |
| 4,730,750 | A | 3/1988 | Ficken | |
| 4,740,025 | A | 4/1988 | Nelson | |
| 4,741,428 | A * | 5/1988 | Taniguchi et al. | 198/397.04 |
| 4,782,274 | A | 11/1988 | Teegarden et al. | |
| 4,812,629 | A | 3/1989 | O'Neil et al. | |
| 4,869,394 | A | 9/1989 | Hurst | |
| 4,878,705 | A | 11/1989 | Amquist | |
| 4,980,292 | A | 12/1990 | Elbert et al. | |
| 5,025,950 | A | 6/1991 | Trouteaud et al. | |
| 5,058,766 | A | 10/1991 | Deckler | |
| 5,061,145 | A | 10/1991 | Genis et al. | |
| 5,080,256 | A | 1/1992 | Rockola | |
| 5,082,141 | A | 1/1992 | Martin et al. | |
| 5,092,986 | A | 3/1992 | Feistner et al. | |
| 5,133,632 | A | 7/1992 | Aramaki et al. | |
| 5,143,193 | A | 9/1992 | Geraci | |
| 5,152,422 | A | 10/1992 | Springer | |
| 5,170,909 | A | 12/1992 | Lundie et al. | |
| 5,208,762 | A | 5/1993 | Charhut et al. | |
| 5,267,174 | A | 11/1993 | Kaufman et al. | |
| 5,277,330 | A | 1/1994 | Saussier | |
| 5,277,534 | A | 1/1994 | Anderson et al. | |
| 5,322,187 | A | 6/1994 | Zizola | |
| 5,337,919 | A | 8/1994 | Spaulding et al. | |
| 5,348,061 | A | 9/1994 | Riley et al. | |
| 5,385,265 | A | 1/1995 | Schlamp | |
| 5,392,827 | A | 2/1995 | Yasso et al. | |
| 5,404,384 | A | 4/1995 | Colburn et al. | |
| 5,405,048 | A | 4/1995 | Rogers et al. | |
| 5,480,062 | A | 1/1996 | Rogers et al. | |
| 5,483,843 | A | 1/1996 | Miller et al. | |
| 5,502,944 | A * | 4/1996 | Kraft et al. | 53/55 |
| 5,533,079 | A | 7/1996 | Colburn et al. | |
| 5,562,232 | A | 10/1996 | Pearson | |
| 5,564,593 | A | 10/1996 | East, Sr. | |
| 5,588,688 | A | 12/1996 | Jacobsen et al. | |
| 5,593,267 | A | 1/1997 | Mcdonald et al. | |
| 5,597,995 | A | 1/1997 | Williams et al. | |
| 5,632,408 | A | 5/1997 | Mitchell | |
| 5,638,417 | A | 6/1997 | Boyer et al. | |
| 5,660,305 | A | 8/1997 | Lasher et al. | |
| 5,671,262 | A | 9/1997 | Boyer et al. | |
| 5,671,592 | A | 9/1997 | Yuyama et al. | |
| 5,713,485 | A | 2/1998 | Liff et al. | |
| 5,713,487 | A | 2/1998 | Coughlin | |
| 5,720,154 | A | 2/1998 | Lasher et al. | |
| 5,746,323 | A | 5/1998 | Dragotta | |
| 5,755,357 | A | 5/1998 | Orkin et al. | |
| 5,761,877 | A | 6/1998 | Quandt | |
| 5,762,235 | A | 6/1998 | Coughlin | |
| 5,771,657 | A | 6/1998 | Lasher et al. | |
| 5,790,409 | A | 8/1998 | Fedor et al. | |
| 5,799,598 | A | 9/1998 | Stufflebeam et al. | |
| 5,812,410 | A | 9/1998 | Lion et al. | |
| 5,819,500 | A | 10/1998 | Haraguchi et al. | |
| 5,826,217 | A | 10/1998 | Lerner | |
| 5,839,257 | A | 11/1998 | Soderstrom et al. | |
| 5,848,593 | A | 12/1998 | McGrady et al. | |
| 5,852,911 | A | 12/1998 | Yuyama et al. | |
| 5,860,563 | A | 1/1999 | Guerra et al. | |
| 5,873,488 | A | 2/1999 | Guerra | |
| 5,884,806 | A | 3/1999 | Boyer et al. | |
| 5,897,024 | A | 4/1999 | Coughlin et al. | |
| 5,907,493 | A | 5/1999 | Boyer et al. | |
| 5,912,818 | A | 6/1999 | McGrady et al. | |
| 5,946,883 | A | 9/1999 | Yuyama et al. | |
| 5,964,374 | A | 10/1999 | Yuyama et al. | |
| 5,971,593 | A | 10/1999 | McGrady | |
| 5,971,594 | A | 10/1999 | Sahai et al. | |
| 5,993,046 | A | 11/1999 | McGrady et al. | |
| 6,006,946 | A | 12/1999 | Williams et al. | |
| 6,022,180 | A | 2/2000 | Motoyama et al. | |
| 6,036,812 | A | 3/2000 | Williams et al. | |
| 6,053,302 | A | 4/2000 | Leu et al. | |
| 6,068,156 | A | 5/2000 | Liff et al. | |
| 6,085,938 | A * | 7/2000 | Coughlin | 221/203 |
| 6,106,221 | A | 8/2000 | Manuszak et al. | |
| 6,108,588 | A | 8/2000 | McGrady | |
| 6,109,193 | A | 8/2000 | Crabb et al. | |
| 6,112,502 | A | 9/2000 | Frederick et al. | |
| 6,119,737 | A | 9/2000 | Yuyama et al. | |
| 6,152,364 | A | 11/2000 | Schoonen et al. | |
| 6,155,485 | A | 12/2000 | Coughlin et al. | |
| 6,161,721 | A | 12/2000 | Kudera et al. | |
| 6,163,737 | A | 12/2000 | Fedor et al. | |
| 6,170,230 | B1 | 1/2001 | Chudy et al. | |
| 6,176,392 | B1 | 1/2001 | William et al. | |
| 6,181,982 | B1 | 1/2001 | Yuyama et al. | |
| 6,196,787 | B1 | 3/2001 | Manuszak et al. | |
| 6,256,967 | B1 | 7/2001 | Hebron et al. | |
| 6,264,419 | B1 | 7/2001 | Schinzel | |
| 6,283,322 | B1 | 9/2001 | Liff et al. | |
| 6,308,494 | B1 | 10/2001 | Yuyama et al. | |
| 6,317,648 | B1 | 11/2001 | Sleep et al. | |
| 6,318,630 | B1 | 11/2001 | Coughlin et al. | |
| 6,343,711 | B1 | 2/2002 | Coughlin | |
| 6,352,200 | B1 | 3/2002 | Schoonen et al. | |
| 6,363,687 | B1 | 4/2002 | Luciano et al. | |
| 6,364,517 | B1 | 4/2002 | Yuyama et al. | |
| 6,370,841 | B1 | 4/2002 | Chudy et al. | |
| 6,385,943 | B2 | 5/2002 | Yuyama et al. | |
| 6,412,527 | B1 | 7/2002 | Brice | |
| 6,449,927 | B2 | 9/2002 | Hebron et al. | |
| 6,470,234 | B1 | 10/2002 | McGrady | |
| 6,484,902 | B1 | 11/2002 | Rouse | |
| 6,490,502 | B2 | 12/2002 | Fellows et al. | |
| 6,502,718 | B2 | 1/2003 | Fitzgerald et al. | |
| 6,550,296 | B2 | 4/2003 | Segawa | |
| 6,561,377 | B1 * | 5/2003 | Pearson et al. | 221/7 |
| 6,592,005 | B1 | 7/2003 | Coughlin et al. | |
| 6,631,826 | B2 | 10/2003 | Pollard et al. | |
| 6,735,497 | B2 | 5/2004 | Wallace et al. | |
| 6,748,885 | B2 | 6/2004 | Sauder et al. | |
| 6,755,931 | B2 | 6/2004 | Vollm et al. | |

| | | | | |
|---|---|---|---|---|
| 6,761,554 | B2 | 7/2004 | Patel | |
| 6,883,561 | B2 | 4/2005 | Bartholomew et al. | |
| 6,929,149 | B2 | 8/2005 | Selfridge et al. | |
| 6,974,049 | B2 * | 12/2005 | Williams et al. | 221/120 |
| 6,997,341 | B2 | 2/2006 | Pearson et al. | |
| 7,059,526 | B1 * | 6/2006 | Sullivan et al. | 235/462.01 |
| 7,118,006 | B2 | 10/2006 | Williams et al. | |
| 7,139,639 | B2 | 11/2006 | Broussard et al. | |
| 7,210,598 | B2 | 5/2007 | Gerold et al. | |
| 7,289,879 | B2 | 10/2007 | William et al. | |
| 7,303,094 | B2 | 12/2007 | Hutchinson et al. | |
| 2001/0002448 | A1 | 5/2001 | Wilson et al. | |
| 2001/0046437 | A1 | 11/2001 | Bramwell et al. | |
| 2001/0048894 | A1 | 12/2001 | Schmidt et al. | |
| 2002/0017531 | A1 | 2/2002 | Adriani | |
| 2003/0175820 | A1 | 9/2003 | Smith et al. | |
| 2004/0026442 | A1 | 2/2004 | Hutchinson | |
| 2005/0224510 | A1 | 10/2005 | Remis et al. | |
| 2006/0224274 | A1 | 10/2006 | Broussard et al. | |

OTHER PUBLICATIONS

Automated Prescription Systems, Inc., Drug-O-Matic from Baker, Storage and Counting System, Preventative Maintenance and Service Manual, Model 200, pp. 1-39.
BK2000 Prescription Fulfillment System, Aug. 24, 1995, pp. 1-5.
BK-2000 Robot Dual Counters, color photocopy, p. 1.
International Search Report for PCT/US03/24725, mailed Dec. 3, 2003.
Schwartz, Gary et al., "Pharmacy & Technology," *U.S. Pharmacist*, vol. No. 28:10, Posted Oct. 15, 2003.
International Search Report for International Appl. No. PCT/US03/24725 mailed Dec. 3, 2003.
Notification of Transmittal of the International Preliminary Examination Report for International Appl. No. PCT/US03/24725 mailed May 14, 2004.
Communication/Office Action for Application No. 03 784 995.7 dated Feb. 16, 2006.
Communication/Office Action for Application No. 03 784 998.1-1261 dated Feb. 16, 2006.
International Search Report for International Application No. PCT/US03/24731 mailed Dec. 3, 2003.
International Preliminary Examination Report for International Application No. PCT/US03/24731 completed Nov. 10, 2004.
Baker Autoschript, Autoscript II, vol. 1—Operation, Nov. 14, 1991, pp. 1-78.
Baker Autoscript, The Baker Autoscript II System, pp. 1-8.
Baker Autoscript, Autoscript II, vol. IV -OEM Manuals, Nov. 14, 1991, pp. 1-8.
Baker Autoscript, Autoscript II, vol. III—Baker Cells, Nov. 14, 1991, pp. 1-8.
Baker Autoscript, Autoscript II, vol. II—Service, Nov. 14, 1991, pp. 1-27.
BK2000, Prescription Fulfillment System, Aug. 24, 1995, pp. 1-16.
BK2000 Color Photocopies, 6 pages.
BK2000 Technical Manual, Version 1.0, Rev 0.0, Feb. 12, 1999, pp. 1-100.
Notice of Allowance for U.S. Appl. No. 10/423,579 mailed Jan. 10, 2007.
Final Office Action for U.S. Appl. No. 10/423,579 mailed Sep. 27, 2006.
Non-Final Office Action for U.S. Appl. No. 10/423,579 mailed Jan. 3, 2006.
Notice of Allowance for U.S. Appl. No. 11/740,585 mailed Dec. 1, 2009.
Non-Final Office Action for U.S. Appl. No. 11/740,585 mailed Apr. 15, 2009.
Final Office Action for U.S. Appl. No. 11/740,585 mailed Oct. 17, 2008.
Non-Final Office Action for U.S. Appl. No. 11/740,585 mailed Mar. 18, 2008.
Notice of Allowance for U.S. Appl. No. 11/740,551 mailed Feb. 9, 2009.
Non-Final Office Action for U.S. Appl. No. 11/740,551 mailed May 15, 2008.
Supplemental Notice of Allowance for U.S. Appl. No. 11/861,560 mailed Dec. 10, 2008.
Notice of Allowance for U.S. Appl. No. 11/861,560 mailed Jul. 22, 2008.
Non-Final Office Action for U.S. Appl. No. 11/861,560 mailed Jan. 31, 2008.
Notice of Allowance for U.S. Appl. No. 11/861,555 mailed Feb. 2, 2010.
Non-Final Office Action for U.S. Appl. No. 11/861,555 mailed Dec. 18, 2009.
Non-Final Office Action for U.S. Appl. No. 11/861,555 mailed Jun. 4, 2009.
Non-Final Office Action for U.S. Appl. No. 11/861,555 mailed Dec. 2, 2008.
Non-Final Office Action for U.S. Appl. No. 11/861,555 mailed Apr. 24, 2008.
Notice of Allowance for U.S. Appl. No. 10/423,331 mailed Jun. 26, 2007.
Final Office Action for U.S. Appl. No. 10/423,331 mailed Feb. 2, 2007.
Non-Final Office Action for U.S. Appl. No. 10/423,331 mailed Aug. 7, 2006.
Non-Final Office Action for U.S. Appl. No. 10/423,331 mailed Jan. 10, 2006.
Non-Final Office Action for U.S. Appl. No. 10/423,331 mailed Aug. 16, 2005.
Advisory Action for U.S. Appl. No. 11/740,573 mailed Jan. 19, 2010.
Final Office Action for U.S. Appl. No. 11/740,573 mailed Sep. 15, 2009.
Non-Final Office Action for U.S. Appl. No. 11/740,573 mailed Dec. 4, 2008.
International Search Report for International Appl. No. PCT/US03/24725 mailed Dec. 3, 2003 (complete copy).

* cited by examiner

Front

Front

VACUUM PILL DISPENSING CASSETTE AND COUNTING MACHINE

CROSS REFERENCE TO RELATED APPLICATIONS

This application is a Divisional of U.S. application Ser. No. 10/423,331, filed Apr. 25, 2003 now U.S. Pat. No. 7,303,094, entitled "Vacuum Dispensing Cassette and Counting Machine", which claims the benefit of U.S. Provisional Application No. 60/402,485, filed Aug. 9, 2002, entitled "Prescription Filling Apparatus Implementing A Pick And Place Method", which are both hereby incorporated herein in their entirety by reference.

BACKGROUND OF THE INVENTION

1. Field of the Invention

The present invention is broadly concerned with pill dispensing devices as well as with storage and dispensing cassettes useful in automated dispensing equipment and especially for use in pill dispensing devices.

2. Description of the Background

U.S. Pat. No. 4,018,358 covers the Drug-O-Matic (DOM) cassette and counting machine available from McKesson Automation Systems Inc. of Pineville, La. The original DOM cassette relied upon a pill separator positioned to separate the pills from the conveying wheel to release the pills into the discharge chute. U.S. Pat. No. 4,697,721 covers improvements made to the DOM cassette including the addition of two chambers, one for storage and one for dispensing, and an adjustment mechanism to partially cover the holes in the conveying wheel.

U.S. Pat. No. 6,053,302 issued to Leu et.al. describes a cassette based counter for pharmaceutical products using vacuum technology and pick up tubes. The vacuum is removed from the product to allow inertia to release the pill into a discharge tube. The '302 patent requires precise timing of the vacuum shut off and must be adjusted for each pill type. Adjustment of the vacuum shut off for each type of pill requires the operator to spend a considerable amount of time before dispensing a new pill type for a patient prescription. Another limitation of the '302 patent is that it relies on inertia to 'throw' the pill from the pickup tube into the discharge chute when the vacuum is released; the design does not appear to allow a pill released from the pickup tube to fall under gravity into the discharge tube. Another limitation is the ends of the pick up tubes are modified to accommodate different pill shapes and may include the application of an adhesive to promote the adherence of pills to the pick up tube. The count speed of the '302 patent is less than half of the previous vacuum pill counting devices when operating at the same revolutions per minute. Increasing the motor speed is unlikely to improve the performance due to the reduced efficiency of the pickup tubes at higher speeds and the likelihood of the pickup tubes damaging or breaking the pills in the hopper.

U.S. Pat. No. 5,061,145 by Genis et.al. describes an article dispenser using vacuum and pick up tubes rotating in a drum. The vacuum source in the pick up tube is removed and replaced by an air pressure source to dispense the article.

There is accordingly a need for an improved pill storage and dispensing cassette, which improves the vacuum airflow efficiency, reduces noise level, improves pill agitation between the storage and dispensing compartments to insure free flow of pills for dispensing, sets the calibration to a predetermined setting prior to dispensing, allows pre-counting and dispensing into a discharge chute and primes the conveying wheel before dispensing.

SUMMARY OF THE PRESENT INVENTION

One aspect of the present invention is a medication storing and dispensing cassette comprising a housing defining at least a portion of a bulk storage chamber for storing a medication, defining at least a portion of a pick-up area, and defining at least a portion of a discharge chute sized to temporarily store a quantity of the medication. A divider wall is positioned between the bulk storage chamber and the pick-up area. A gate is positioned to control an exit end of the discharge chute. A rotatable conveying wheel having openings proximate to its periphery is positioned such that a portion of the wheel is in communication with the pick-up area while another portion of the wheel is adjacent to an entrance end of the discharge chute. A calibration arm is positioned adjacent the openings of the rotatable wheel. A baffle is positioned to block those openings in that portion of the rotatable wheel adjacent to the discharge chute. An air agitation system is provided so that pills may be moved from the bulk storage chamber to the pick-up area. Methods are also disclosed in which air agitation is used to move pills from the bulk storage chamber to the pick-up area, for automatically setting the position of the calibration arm and for automatically learning the setting for the calibration arm for an unclassified medication.

The present invention is also directed to a counter for use with a cassette of the type described above, i.e. having a chamber for carrying medication to be counted and dispensed. The counter is comprised of a loader for receiving a cassette, a sensor for sensing whether a cassette is in the loader, means for moving the loader into an operative position, a vacuum unit for applying a vacuum to the cassette, a drive unit for driving a driven portion of the cassette and a counter for counting medication within a portion of the cassette.

A method of operating the counter comprises sensing the presence of a cassette, precounting a predetermined number of medication units into a discharge chute and discharging the predetermined number of medication units from the discharge chute. Where the precounted number of pills equals the desired number of pills, the process stops. If the precounted number does not equal the desired number, counting continues with the counted pills being dispensed directly into the vial.

The present invention overcomes the problems outlined above and provides a pill storage and dispensing cassette for storing and dispensing pills (e.g., tablets, capsules, caplets, gel-caps, or pills) or similarly shaped articles from a bulk storage chamber and regulates the pill flow into a pick-up area so as to maintain a preferred amount of pills in the pick-up area without crushing or damaging the pills. The vacuum source is not in communication with the openings in the rotatable conveying wheel while the openings are rotated within the discharge chute of the cassette. By eliminating the airflow through those openings, the vacuum source requirements are reduced. The venturi design of the plurality of openings in the rotatable conveying wheel maintains an equivalent airflow and vacuum pressure differential through the openings in the conveying wheel but reduces the airflow turbulence and substantially reduces the audible noise levels. As a result of those features, and others, the present invention enables a reduction in the size of the vacuum motor of the counter, which in turn results in reduced air turbulence and quieter operation.

Improved flow of pills from the bulk storage chamber into the pick-up area is achieved by utilizing the vacuum airflow to agitate the pills in the bulk storage chamber, thereby eliminating the need for mechanical agitation. Through the disclosed precount operation, the operator or robotic manipulator may quickly retrieve the patient vial after the last pill has been counted and is no longer required to wait for the vacuum source to be removed from the cassette before retrieving the patient vial. This also eliminates the need for the dump valve and the requirement for the vacuum motor to come to a complete stop as required by some previous designs. Those advantages and benefits, and others, will be apparent from the detailed description of the invention appearing below.

BRIEF DESCRIPTION OF THE DRAWINGS

To enable the present invention to be easily understood and readily practiced, the present invention will now be described for purposes of illustration and not limitation, in connection with the following figures wherein:

FIG. 3A is a front view of another embodiment of a prescription filling apparatus (with the housing removed), having a single carousel 16 on the left side while

DETAILED DESCRIPTION OF THE INVENTION

Figure 1A:
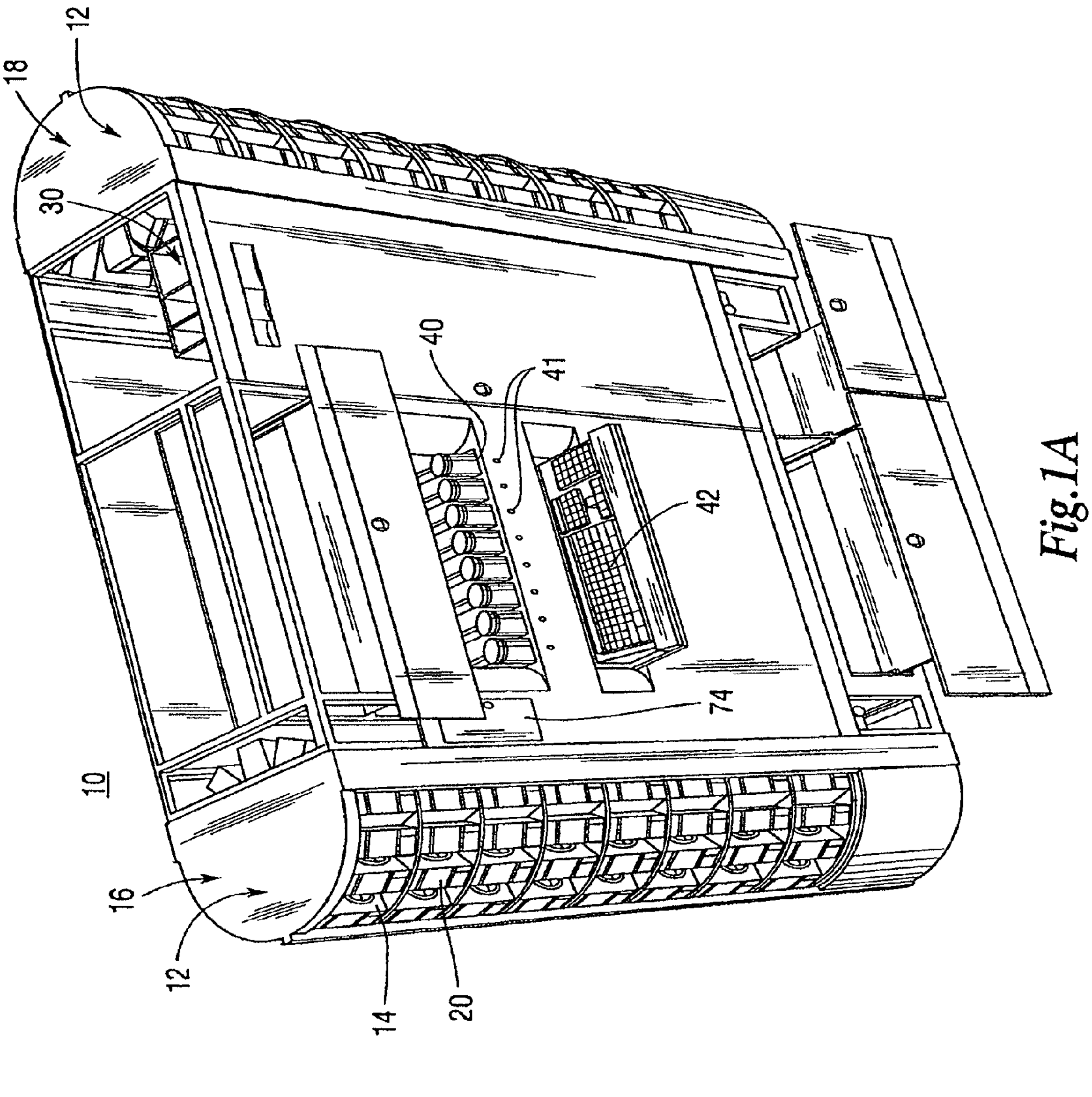
FIGS. 1A and 1B are perspective views of a prescription filling apparatus having two carousels constructed according to the teachings of the present invention taken from the front.
Figure 1B:
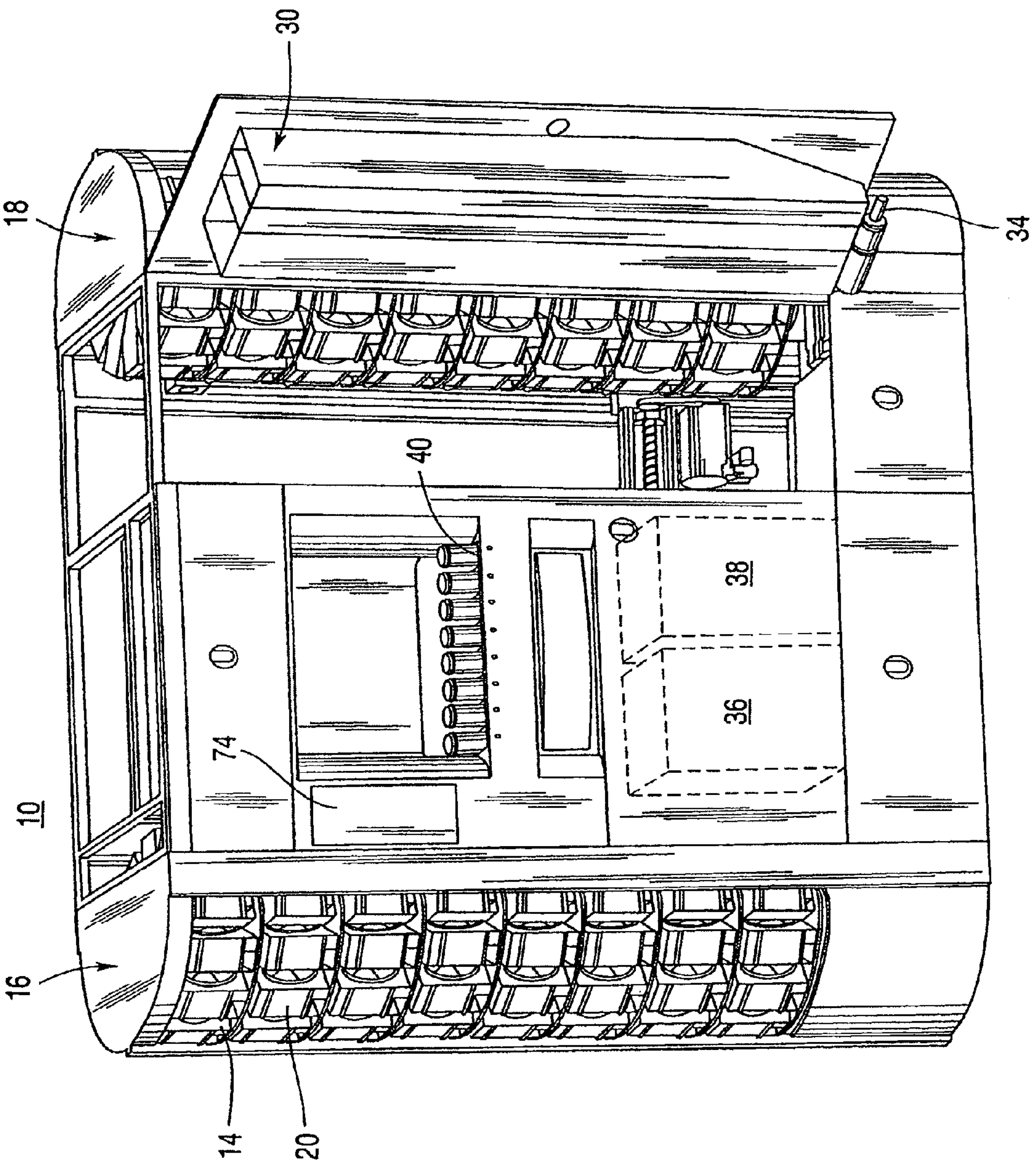
Figure 1C:
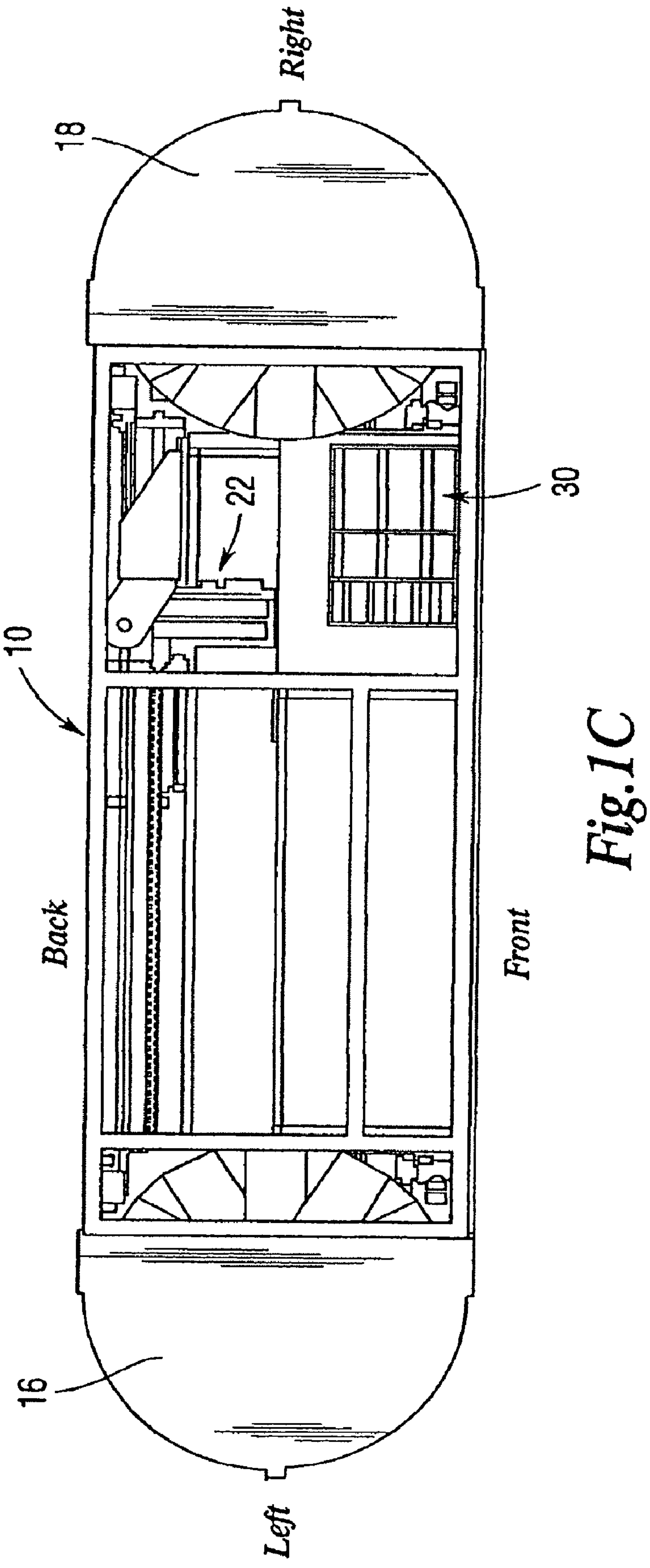
FIG. 1C is a top view of the prescription filling apparatus of FIG. 1A.
Figure 2:
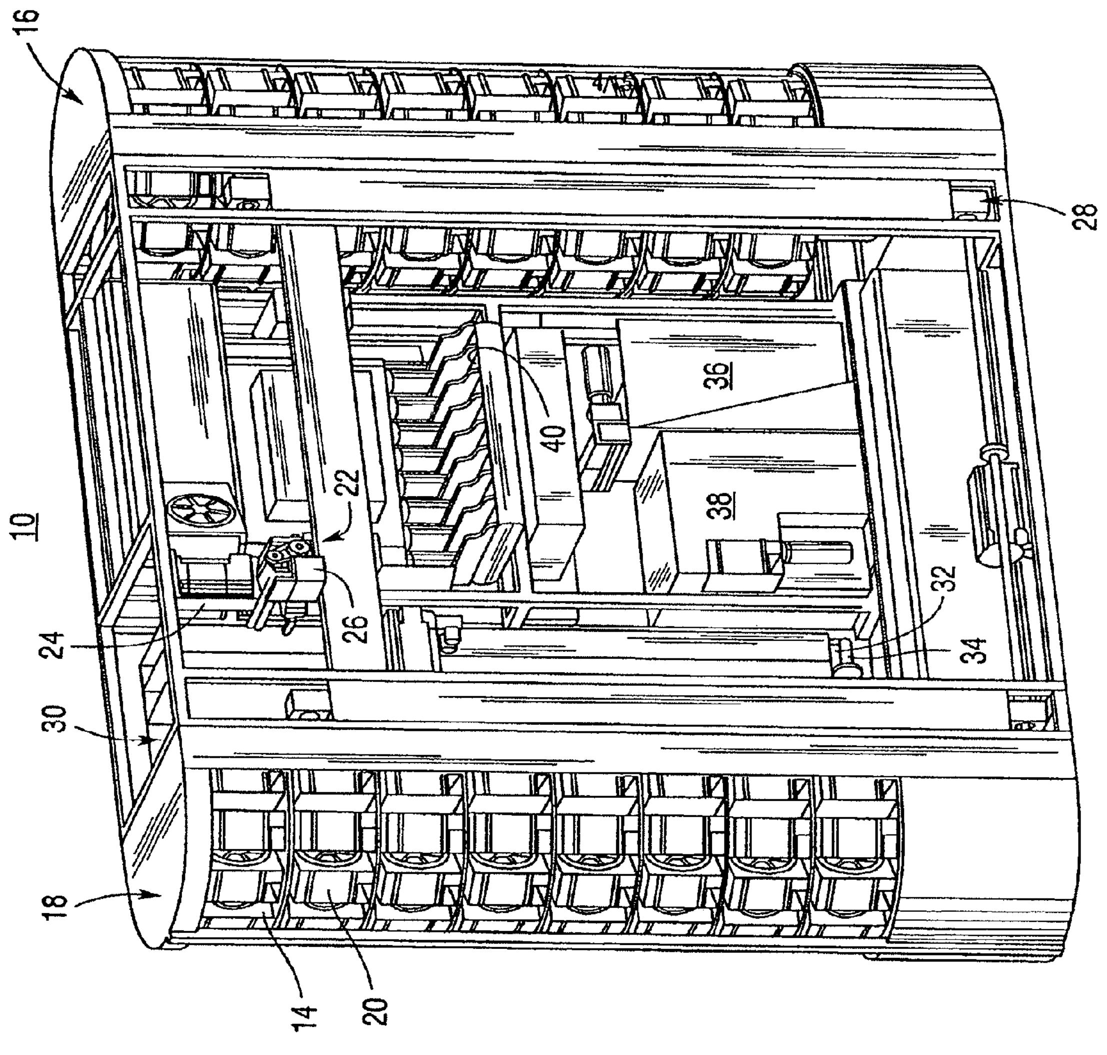
FIG. 2 is a perspective view of the prescription filling apparatus of FIG. 1 taken from the rear.

FIGS. 1A and 1B are two perspective views, taken from the front, with various doors and drawers opened, of one embodiment of a prescription filling apparatus 10 of the present invention. The apparatus 10 technically fills vials, which are normally for a prescription, but need not be, such that reference to apparatus 10 as a prescription filling apparatus is not intended to limit its use or the scope of the claims to filling prescriptions. FIG. 1C is a top view of the apparatus 10. FIG. 2 shows a perspective view of the prescription filling apparatus 10 of the present invention taken from the rear. All references to front, back, left and right are taken with respect to the orientation shown in FIG. 1A.

In FIGS. 1A, 1B, 1C and 2, apparatus 10 includes at least one shelving unit 12 which includes an array of storage locations 14. In FIGS. 1A, 1B, 1C and 2 a pair of shelving units 12 is implemented as a pair of carousels, a left carousel 16 and a right carousel 18. However, shelving unit 12 could be an array in an XY plane. In the event that carousels are provided, the carousels may be partitioned vertically into two or more portions, e.g., an upper and a lower half, individual shelves, etc., which may be individually controlled and rotated independently of one another. Each storage location 14 contains storage container or cassette 20 which is removable from storage location 14. Each storage container 20 may house a discrete quantity of an identified medication. A suitable storage container or cassette 20 is described below in conjunction with FIGS. 19-24.

Apparatus 10 also contains a computer controlled engagement device 22 as shown in FIG. 2. Engagement device 22 is a two-stage engagement device having an upper or first stage 24 and a lower or second stage 26. Upper and lower stages of engagement device 22 are each separately capable of motion in the Z direction as will be described below. Upper stage 24 of engagement device 22 is designed to cooperate with storage containers or cassettes 20 which are housed in storage locations 14 of shelving units 12. Lower stage 26 of engagement device 22 is designed to cooperate with vials. A computer-controlled system 28 (See FIG. 5) provides movement of engagement device 22 in the X and Y directions. Computer controlled system 28 may be electronically, pneumatically or hydraulically driven. The engagement device 22 and the computer-controlled system 28 may be thought of collectively as a robot. Although preferred embodiments for the robot are disclosed, those of ordinary skill in the art will recognize that many different embodiments for the robot are possible while remaining within the scope of the present invention.

As shown in FIGS. 1A, 1B, 1C and 2, apparatus 10 additionally contains vial source 30 from which lower stage 26 of engagement device 22 picks up or obtains vials to be filled with medication or pills. The terms pills, medication, and medication units may be used interchangeably herein and are intended to be broadly construed to mean tablets, capsules, caplets, gel-caps, pills, etc. Vial source 30 may take a variety of forms. As shown in FIGS. 1B and 2, vial source 30 may be implemented using a plurality of bins each for holding a quantity of vials of different diameter and/or length in a desired orientation. Each of the bins may be provided with a bar code, the purpose of which is described below, identifying the contents of the bin. An opening 32 across the bottom of the bins provides access to the vials and provides a plurality of vial pick positions depending on the diameter and/or length of the vial to be picked. Stop cylinders 34 of various diameters, depending upon the diameter of the vials in each bin, are provided proximate to opening 32 so that only one vial from each bin is accessible. When the vial in the lowest position is removed, the vials remaining in the bin fall under the force of gravity to present another vial in the lowest position. Vial source 30 may be implemented in other ways while remaining within the scope of the present invention including known types of vial descramblers and various types of known discharge chutes and mechanisms. The present invention is not to be limited by the particular manner in which the vial source 30 is implemented.

Apparatus 10 also contains label printer and application unit 36 (sometimes referred to herein as a label printer and applier) which is designed to cooperate with lower stage 26 of engagement device 22. Label printer and application unit 36 prints medication identification information on labels and applies the printed labels to vials delivered to it by the lower stage 26 of engagement device 22. One example of a label printer and application unit 36 is disclosed in U.S. application Ser. No. 10/197,742 filed Jul. 18, 2002 and entitled “Apparatus and Method for Applying Labels to A Container”. Other types of label printers and appliers may be used without departing from the scope of the present invention. For example, the label printer and applier could be implemented as a single component as shown in the figures or as two separate components. The present invention is not to be limited by the particulars of the label printer and application unit 36 and the language used herein is intended to cover both single or multiple unit types of devices.

Figure 16A:
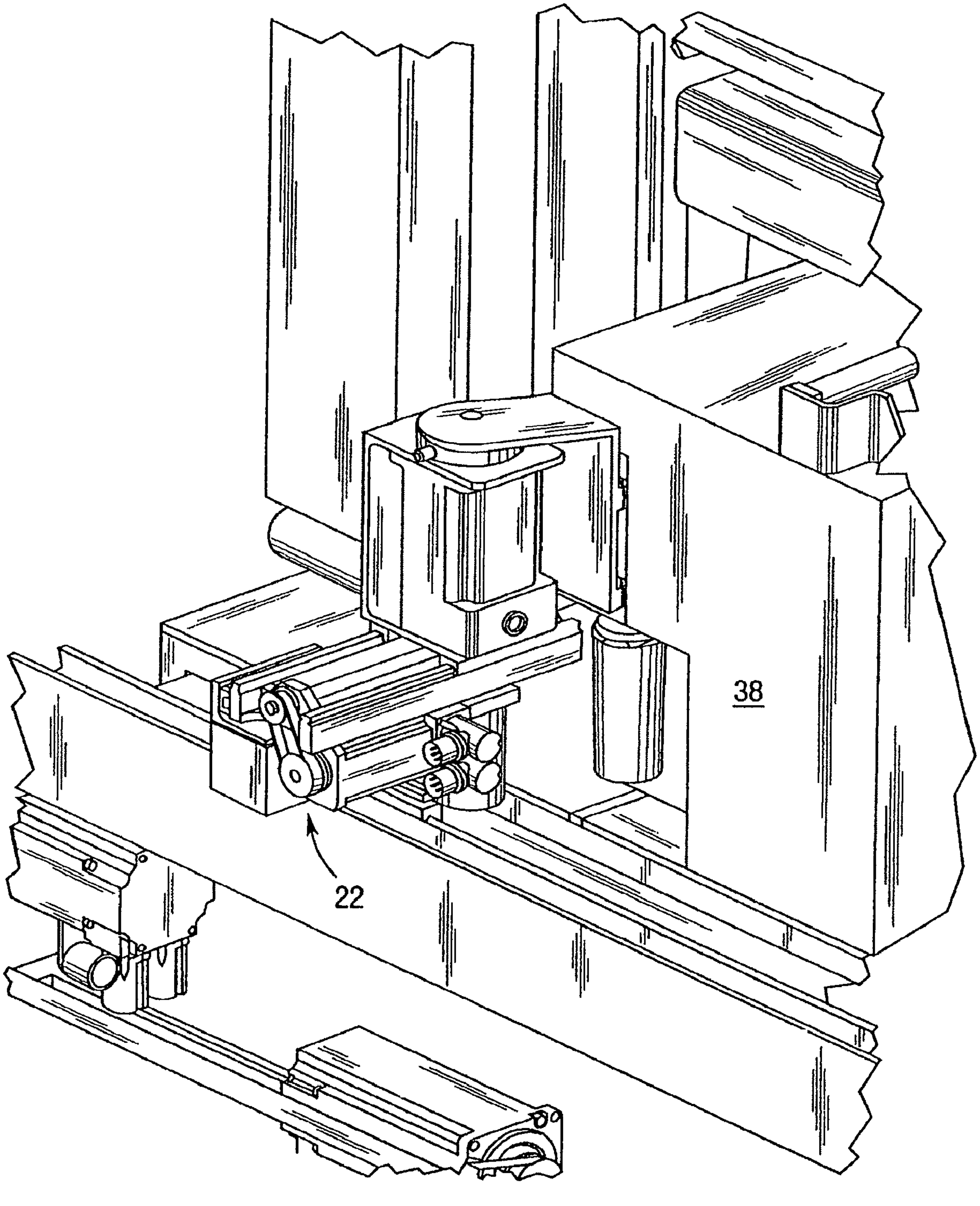
FIGS. 16A and 16B are a perspective view and a plan view from the rear, respectively, of the engagement device upon insertion and after insertion, respectively, of a cassette into the pill counting and dispensing unit.
Figure 16B:
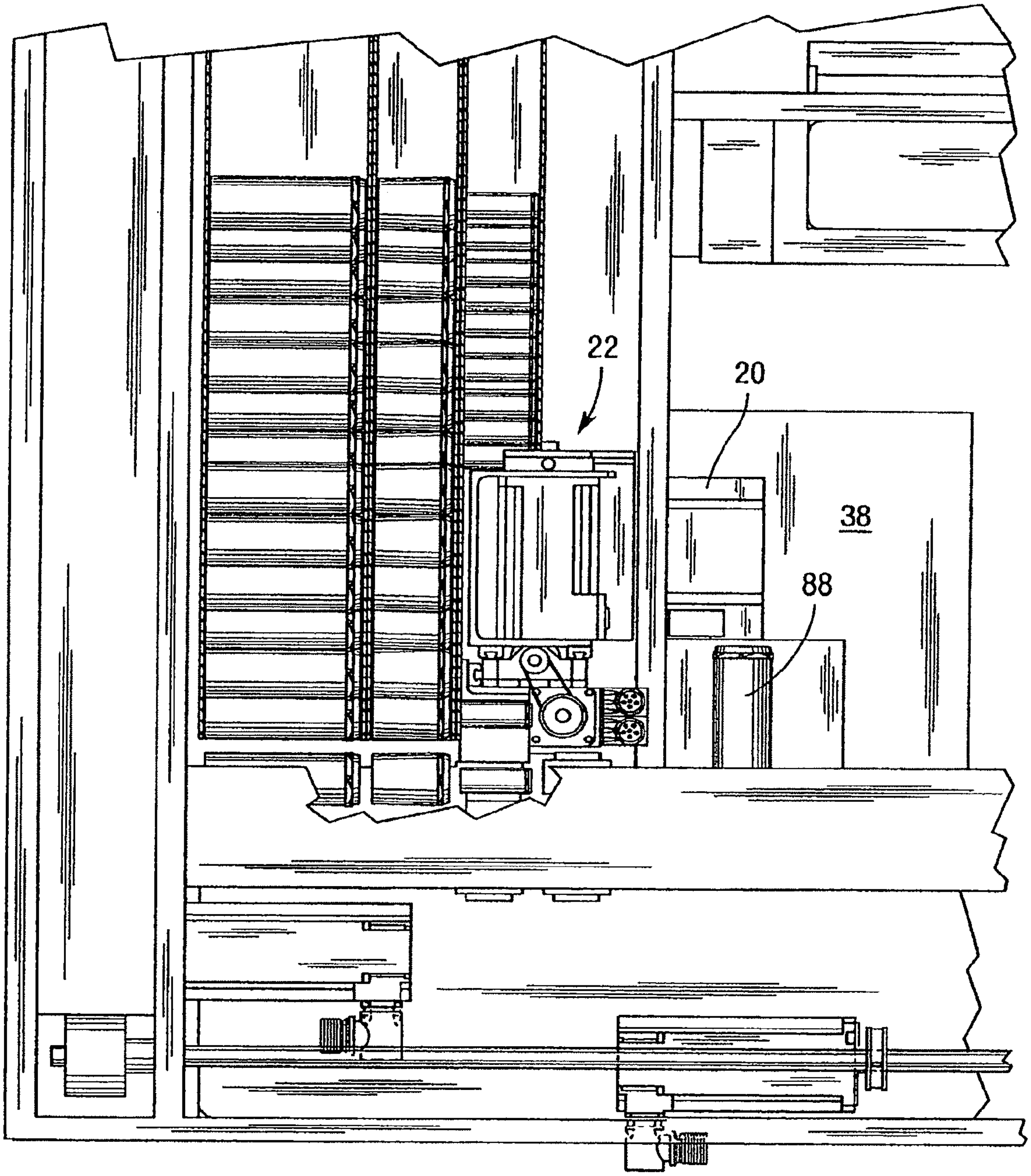

Further, apparatus 10 contains pill or medication counting and dispensing unit 38 described in greater detail in conjunction with FIGS. 25-32. Pill counting and dispensing unit 38 is designed to receive the cassette or storage container 20 (described in greater detail in conjunction with FIGS. 19-24) from upper stage 24 of engagement device 22 and as shown in FIGS. 16A and 16B. Additionally, counting and dispensing unit 38 operates to engage and fill a vial inserted into counting and dispensing unit 38 by lower stage 26 of engagement device 22 (See FIGS. 9 and 10) with medication from cassette or storage container 20. Counting and dispensing unit 38 is configured to dispense pills or medication units into each vial.

Apparatus 10 additionally includes output position or output device 40. Output position or output device 40 is designed to hold, house or contain vials which have been filled and labeled (and, optionally, capped) with medication for distribution. As shown in FIGS. 1A, 1B and 2 output device 40 may be a plurality of lanes in which filled vials may be placed. The lanes may be provided with LED’s 41 to provide pick lighting. As shown in the figures, eight output lanes with pick lighting LED’s 41 may be provided. Seven of the output lanes may be used for order grouping while one of the lanes may be used for access for exception management. (Exception management includes management of vials resulting from events such as a cassette running out of pills before the prescription is filled.) The pick lighting 41 informs the operator when an order is complete. However, it should be understood that output device 40 may be any number of configurations including identified storage locations 14 of shelving unit 12. Additionally, output device 40 may be an output conveyor or a dedicated output carousel. Further, apparatus 10 may additionally contain a capping device to cap or close filled vials. Should apparatus 10 contain a capping device, output device 40 could also be of a chute configuration. Output lanes 40 may be provided with computer controlled doors or other barriers (not shown) on both an entrance end and an exit end to prevent an operator from inserting their hand, or objects, into the interior of the apparatus 10, or for increased security.

Apparatus 10 may have an onboard computer (not shown) or may be controlled by a workstation located elsewhere in the pharmacy. The computer or workstation controls shelving unit 12 when the shelving unit is one or more carousels. The computer or workstation also controls engagement device 22 and control system 28 so as to move engagement device 22 among the source of vials 30, label printer and application unit 36, counting and dispensing unit 38, capper (not shown), output device 40 and cassettes 20 carried by shelving unit 12. Apparatus 10 additionally may include a keyboard 42 or similar input communication device e.g., a touch sensitive screen (not shown) mounted on a rail (not shown) on top of apparatus 10, RF device, etc. through which information may be communicated to the onboard computer or workstation. As shown in FIG. 1A, keyboard 42 is in an open position, extending from apparatus 10, and may be accessed by an individual. As shown in FIG. 1B, keyboard 42 is in a closed, inaccessible position. The reader should understand that the form and location of the output device 40 and input device 42 may vary considerably from those shown while remaining within the scope of the present invention.

Figure 3A:
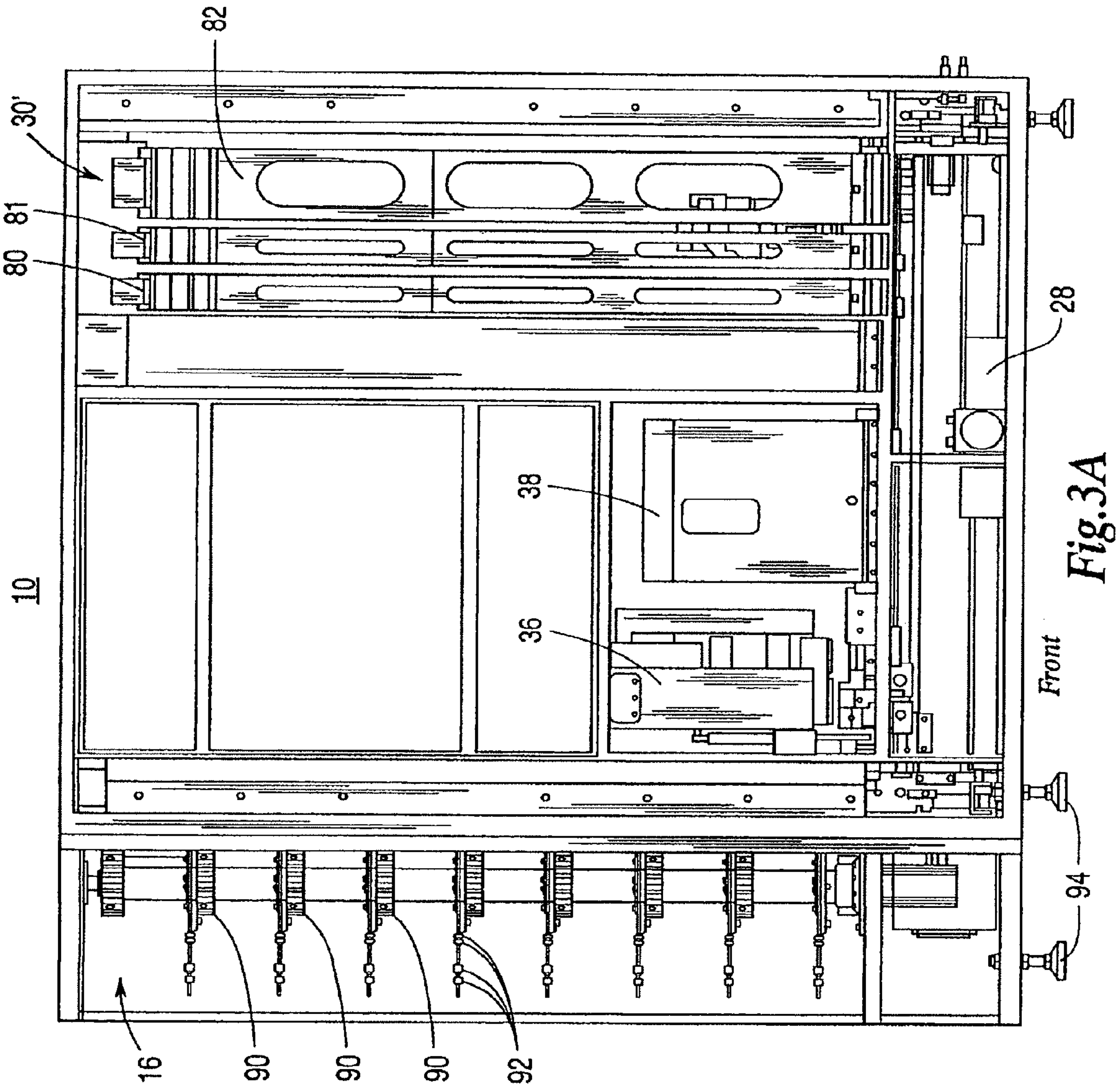
Figure 3B:
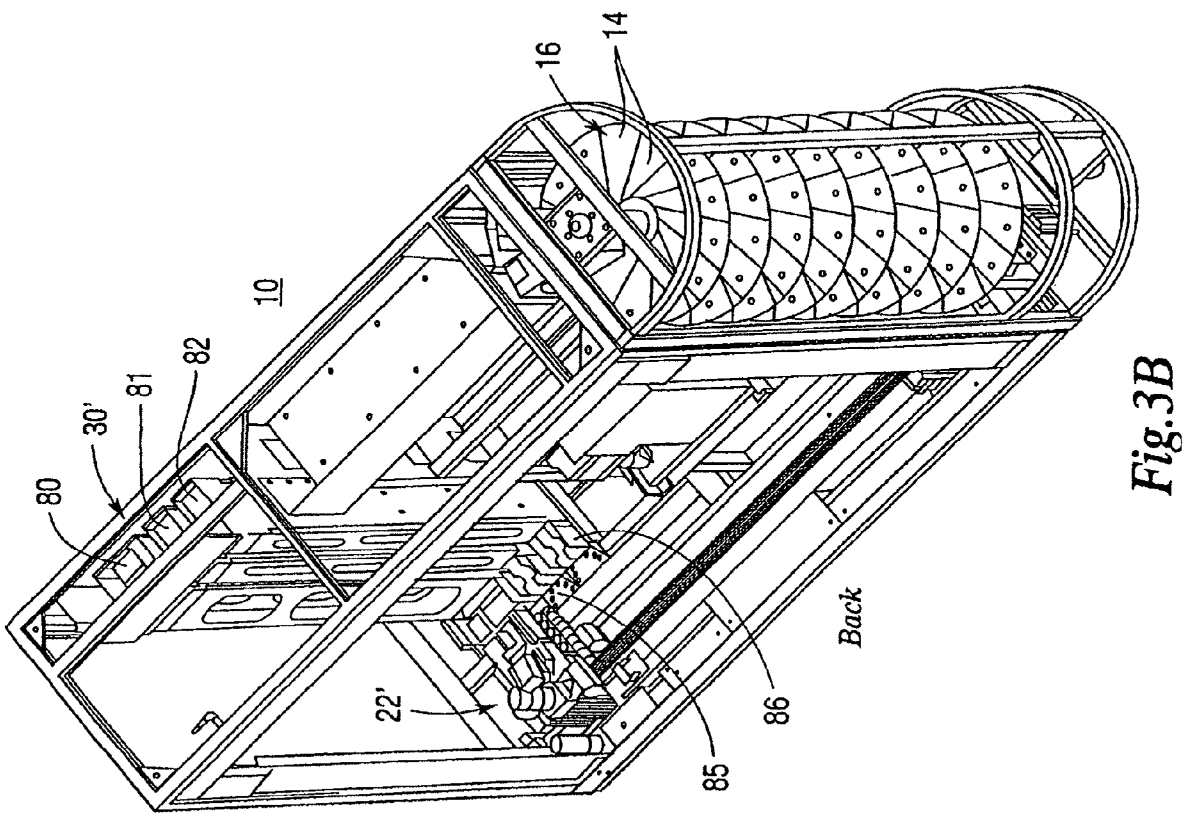
FIGS. 3B, 3C, 3D and 3E are a perspective view from the back left, a plan view of the back, a top view looking down, and a left side view, respectively, of the prescription filling apparatus of FIG. 3A.
Figure 3C:
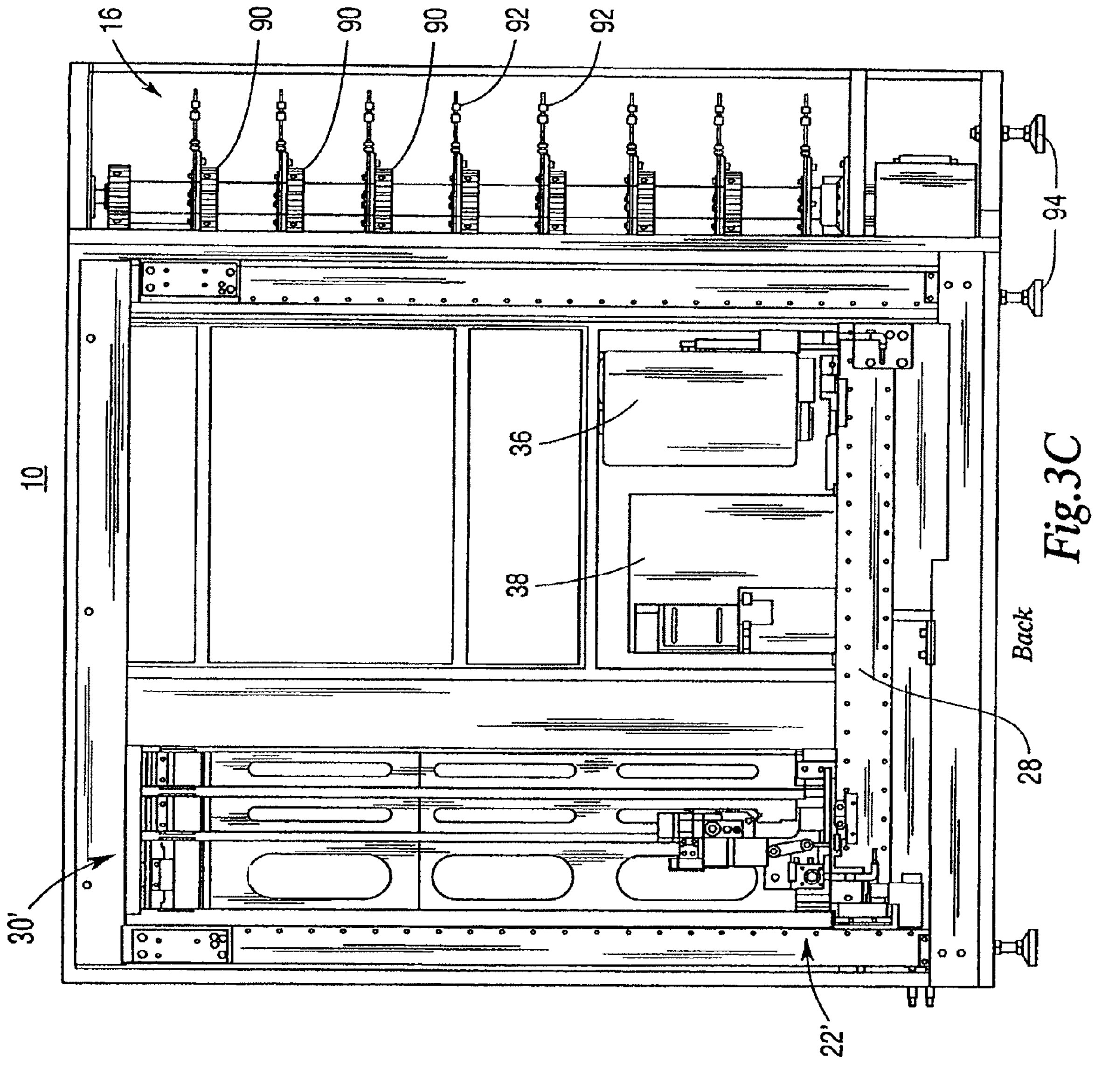
Figure 3D:
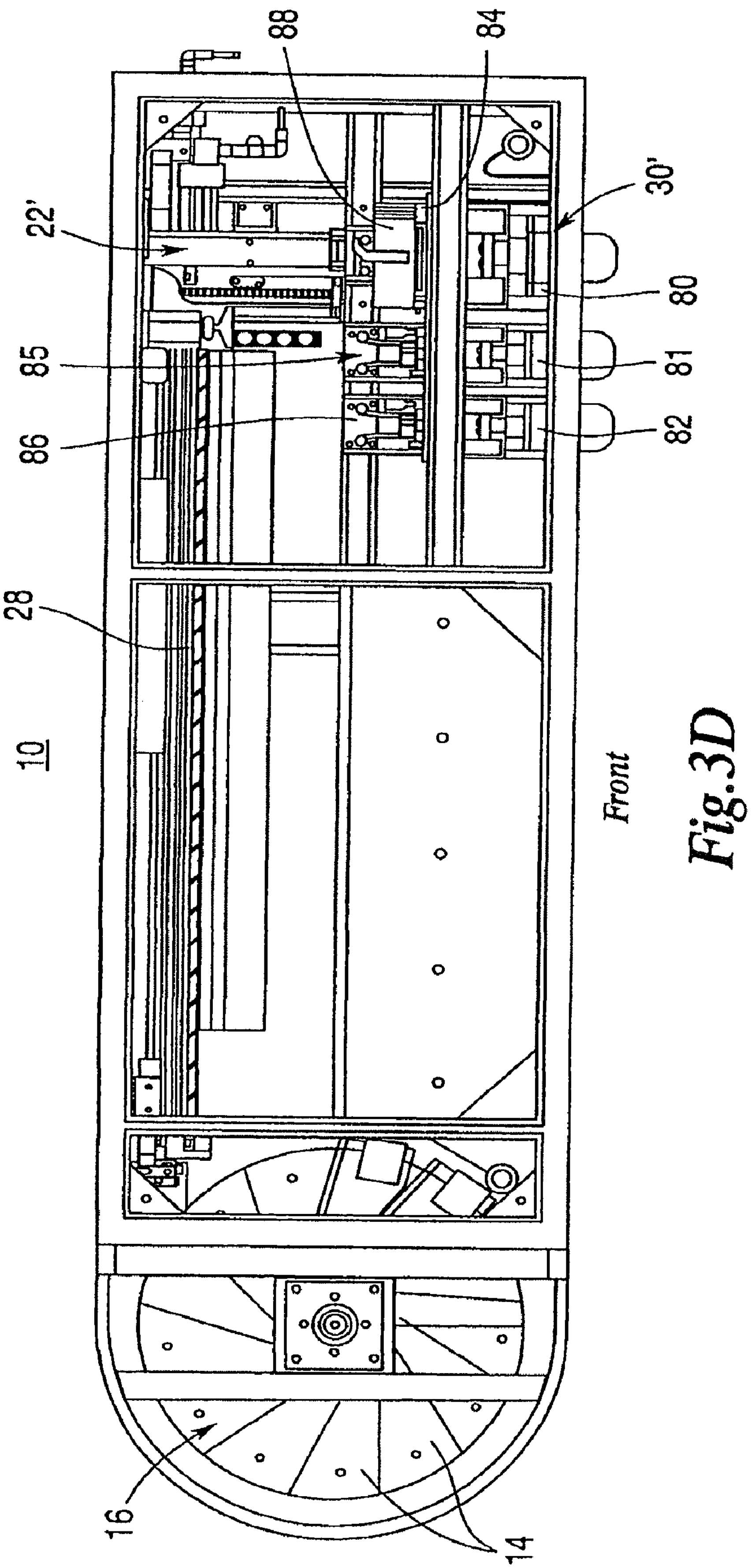
Figure 3E:
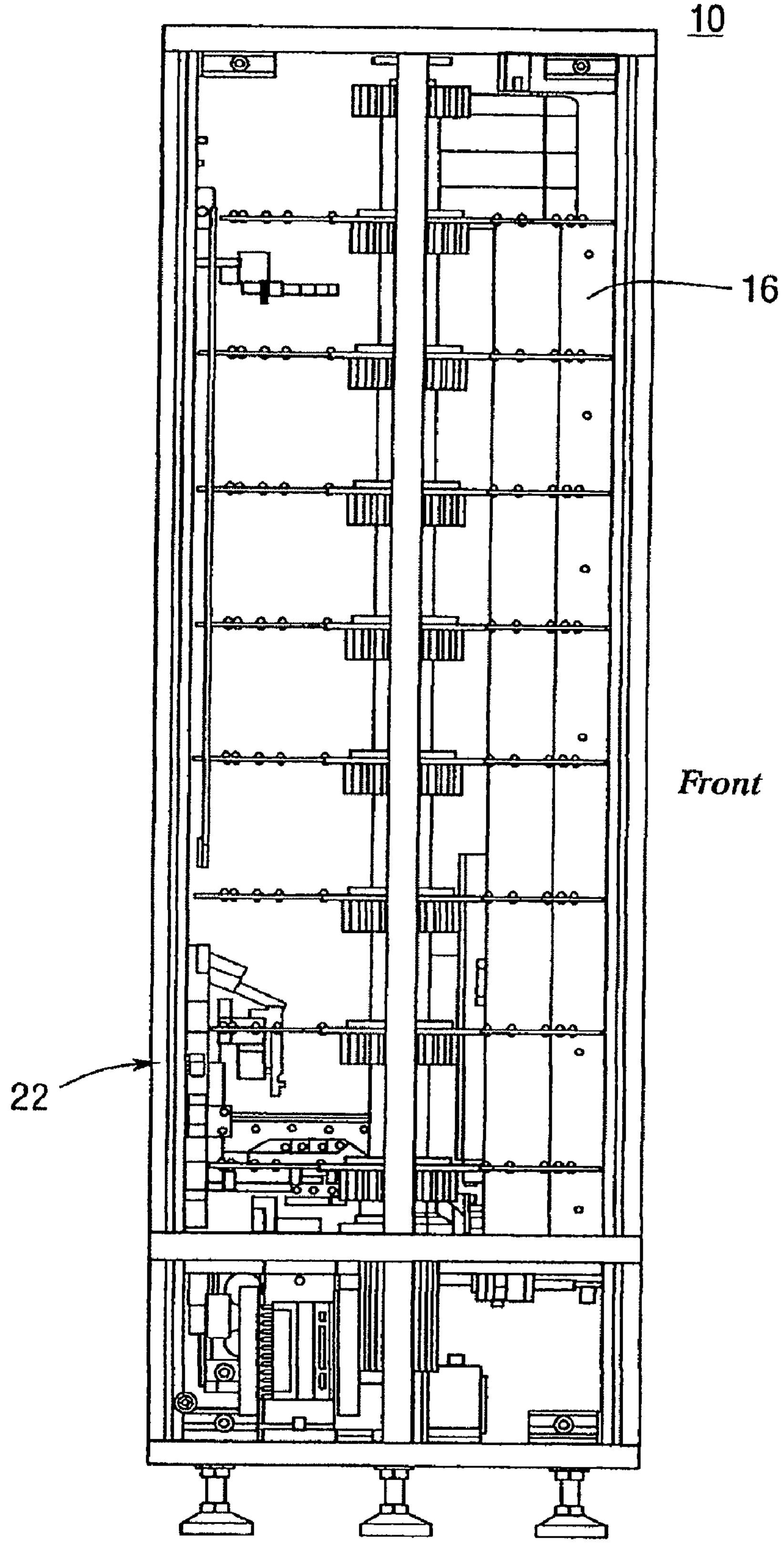

FIG. 3A is a front view of another embodiment of a prescription filling apparatus 10, with the housing removed, having a single carousel 16 on the left side. FIG. 3B is a perspective view from the back left of the apparatus of FIG. 3A while FIGS. 3C, 3D and 3E are a plan view of the back, a top view looking down, and a left side view, respectively, of the prescription filling apparatus 10 of FIG. 3A. Components of like construction and operation as those discussed in conjunction with FIGS. 1A, 1B, 1C and 2 are given the same reference numerals. In FIG. 3A, in addition to having the housing removed, the output device 40 and input device 42 have also been removed. The prescription filling apparatus 10 of FIG. 3 utilizes a different type of vial source 30, shown in the figures as 30'. The vial source 30' is implemented through a plurality of vertical dispensers 80, 81, 82 which are provided for holding vials of different sizes or to provide additional inventory of commonly used vial sizes. The vertical dispensers 80, 81, 82 may be provided with a bar code, the purpose of which is described below, identifying the contents of the dispensers. At the bottom of the vertical dispensers 80, 81, 82 is an escapement mechanism 84, 85, 86, respectively. The escapement mechanism 84 is partially obscured by a vial 88 being removed by the lower stage 26 of the computer controlled engagement device 22'. Engagement device 22' is somewhat different than engagement device 22 of FIG. 1 as will be described below. The escapement mechanisms 84, 85, 86 may take any known form such as, for example, a cartridge (not shown) which slides under the lowest vial in a manner which allows the lowest vial to be released and fall into the cartridge while all of the other vials in the vertical dispenser move down one location. As the cartridge is withdrawn, the remainder of the vials are held in place until the cartridge is reinserted for removal of another vial. Any of a wide variety of known mechanisms may be utilized while remaining within the scope of the present invention.

As can be seen best in FIGS. 3B and 3D, the storage locations 14 of the left carousel 16 are somewhat pie-shaped. Seen best in FIGS. 3A and 3C is a plurality of alignment gears 90 positioned along a vertical shaft of the carousel 16. The alignment gears 90 provide for alignment of cassettes 20 as they are reinserted into their respective storage locations for 14. As will be described more fully herein below, after the cassette 20 is properly aligned in its storage location 14, it is lowered a short distance to enable an indentation in the bottom of the cassette to mate with an alignment pin 92. Finally, illustrated in FIGS. 3A and 3C, it is seen that the prescription filling apparatus 10 may be provided with a plurality of levelers or feet 94 for allowing the apparatus 10 to be positioned in a level orientation.

FIGS. 4A, 4B, 4C and 4D are perspective, right side, top and front views respectively, of the multistage (two stage) engagement device 22' according to one embodiment of the present invention. The engagement device 22' may be used with either the embodiment shown in FIG. 1 or the embodiment shown in FIG. 3. Upper stage 24 of engagement device 22' has an end of arm tool (EOAT) in the form of a panel 46. The panel 46 carries two passive grippers 48 in the form of notched bars, with each notched bar 48 forming a channel 49 between the notched bar 48 and the panel 46. Cassette alignment members 51 are also provided along the edges of the EOAT 46.

A bar code reader 53 may be provided and used for a variety of purposes. For example, the bar code reader 53 may be used when the upper stage 24 EOAT 46 is positioned adjacent to a cassette 20 which is to be removed to confirm that the correct cassette or storage device 20 has been selected before EOAT 46 engages the cassette 20, to read the bar code on a cassette being returned to its position in a carousel either from the counter or from the outside of apparatus 10 after refilling, servicing etc., to read the bar code on a new cassette being supplied to apparatus 10, to read the bar code on the vial supply 30, 30' to insure the proper vial is selected, among others, as discussed below.

Upper stage 24 is capable of rotating about an axis 55 by virtue of a motor 57, gear box 59, encoding disk 61, and sensor board 63 carrying various home and target sensors. The position of the cassette 20 illustrated in FIG. 4A may be viewed as a home position, which is the position necessary for insertion of the cassette 20 into the counting and dispensing unit 38. However, it is necessary for the EOAT 46 to rotate about axis 55 to enable cassettes to be picked from carousels, as well as returned to carousels as will be described further herein below. The motor 57, gear box 59, encoding disks 61 and sensor board 63 operate in a known manner to enable the angular position of the EOAT 46 about axis 55 to be precisely controlled.

The upper stage 24 of engagement device 22' may move in the Z direction by virtue of a worm gear 65 and linear rails or slides (not shown). Upper stage 24 may also move in the direction of the Z axis by rotation about axis 55 which extends in the Y direction.

Lower stage 26 of the engagement device 22' is also configured with an EOAT which may take the form of a gripper mechanism 67. Gripper mechanism 67 may be implemented in a variety of ways including, for example, a rack and pinion gripper having moveably opposed arms. A gripper motor 69 is provided for moving the arms together to clamp and hold vials and for separating the arms to release the vials. At the vial source, the gripper mechanism 67 will grip the vial at substantially its mid point. The gripper mechanism 67 may be self centering and capable of gripping various diameter vials. Additionally, the bar code reader 53 (if provided) may be used to confirm that the correct vial source is inserted in the apparatus 10 and/or that a vial of the proper size has been selected by reading the bar codes provided on the bins or dispensers of the vial source 30 and 30', respectively.

Gripper mechanism 67 may assume one of three different orientations (0°, 90° and 180°) through the operation of a motor 71 or a three position solenoid so that vials in different orientations may be gripped and rotated into appropriate position at various steps in the vial filling process. If a vial were to be reverse-oriented in the vial source 30, the gripper mechanism 67 would be capable of rotating the vial 180°. Engagement device 22 would then move so that the EOAT mechanism 67 is positioned at the label printer and application unit 36 where the vial would be inserted onto a chuck. As the vial is removed from the label printer and application unit 36 chuck and transported to the counting and dispensing unit 38, the vial must be rotated 90° from a horizontal to a vertical orientation. After the pills or medication are filled into the vial at the counting and dispensing unit 38, the filled vial may be delivered to a capping station and/or delivered to an output position 40.

Lower stage 26 of engagement device 22 is provided with a worm gear enclosed within casing 73. Rotation of the worm gear within casing 73 allows the lower stage 26 to move in the plus or minus Z direction depending upon the direction of rotation of the worm gear.

Those of ordinary skill in the art will recognize that a single worm gear may be used to move both the upper stage 24 and the lower stage 26 as shown by the engagement device 22 of FIG. IC. For example, lower stage 26 of the engagement device 22 may be selectively connected to a single worm gear through a latch, cam, solenoid driven pin (not shown) or other similar devices to enable the lower stage 26 to be selectively connected to and thereby move along the single worm gear in the Z direction. Upper stage 24 thus continuously moves in the Z direction when the single worm gear is driven while lower stage 26 selectively moves in the Z direction, although other combinations of motion are possible. Those of ordinary skill in the art should recognize that other types of EOAT other than panel 46 and gripper mechanism 67 may be provided while remaining within the scope of the present invention. Also, alternative mechanisms to the various motors, gears, sensors and the like may be provided while remaining within the scope of the present invention.

Figure 4A:
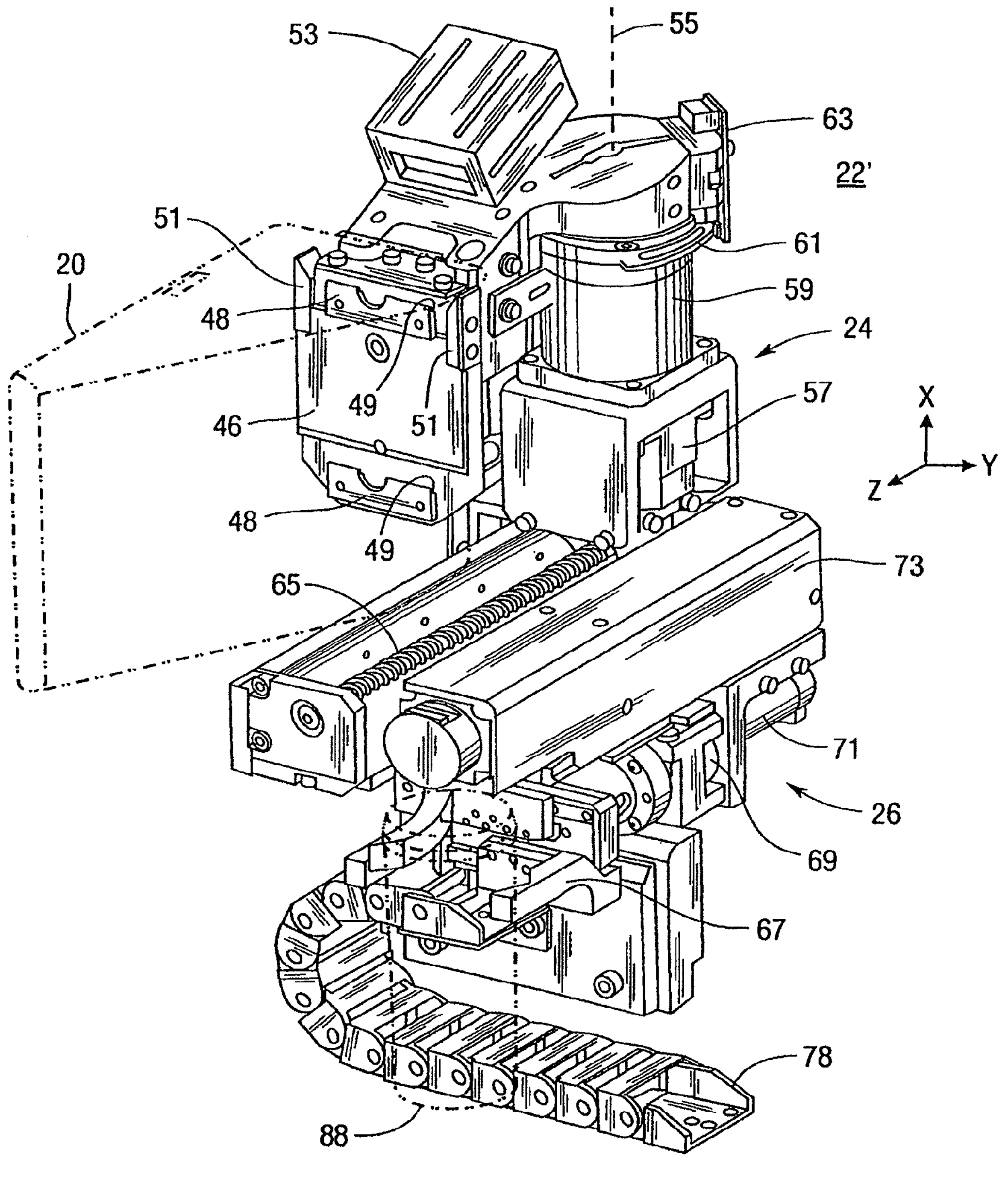
FIGS. 4A, 4B, 4C and 4D are perspective, right side, top, and front views, respectively, of a two stage engagement device according to the teachings of the present invention.
Figure 4B:
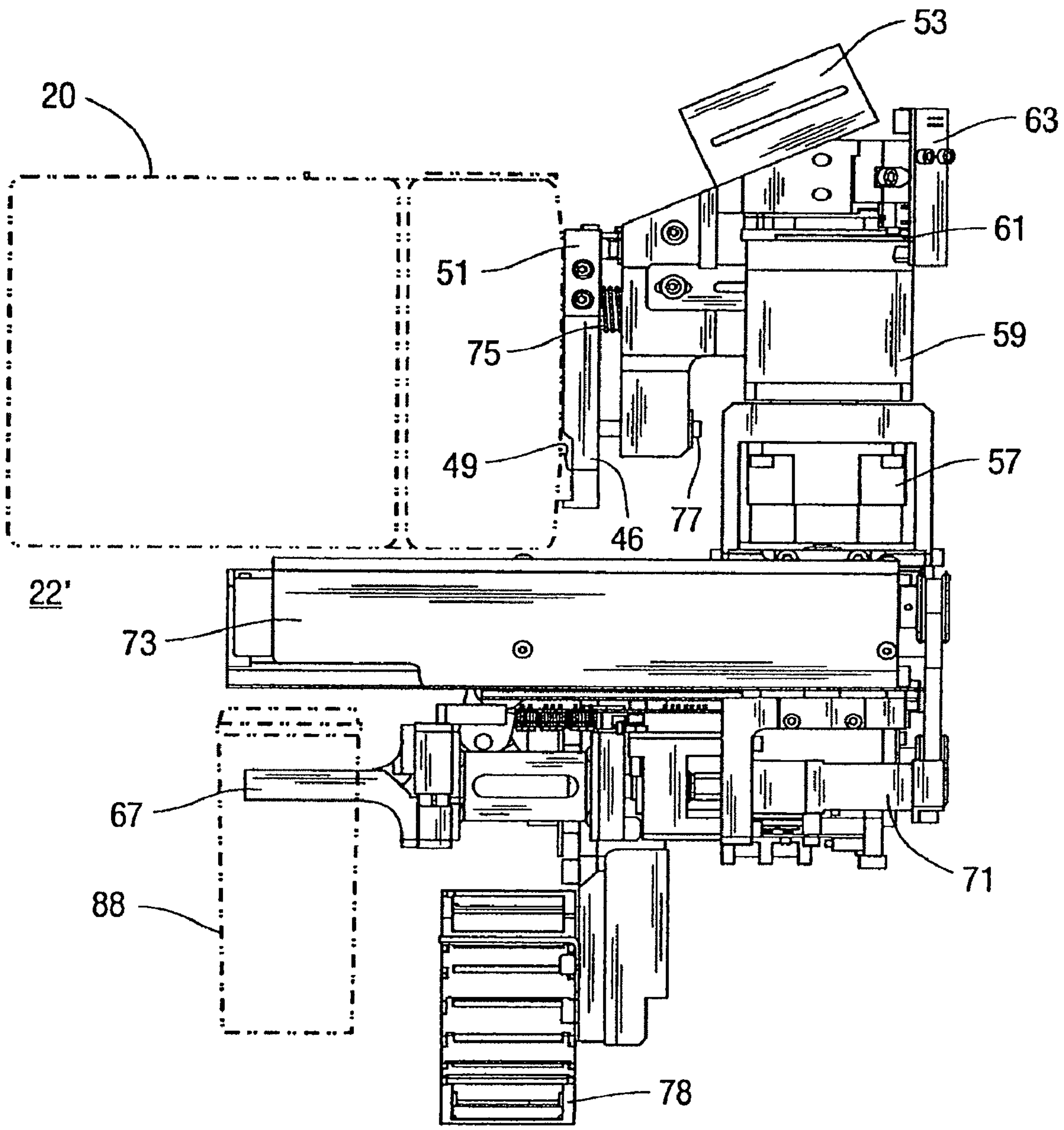
Figure 4C:
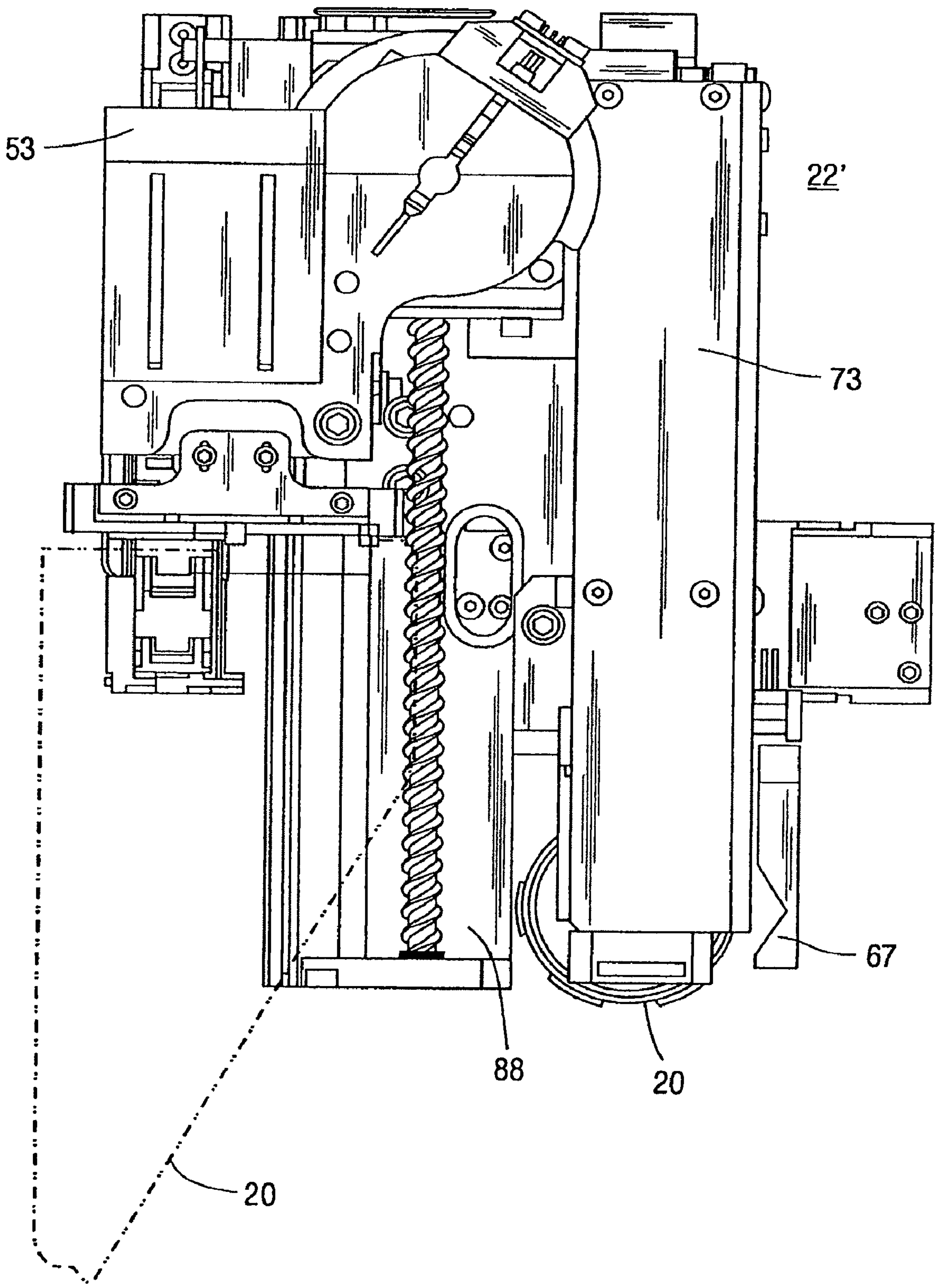
Figure 4D:
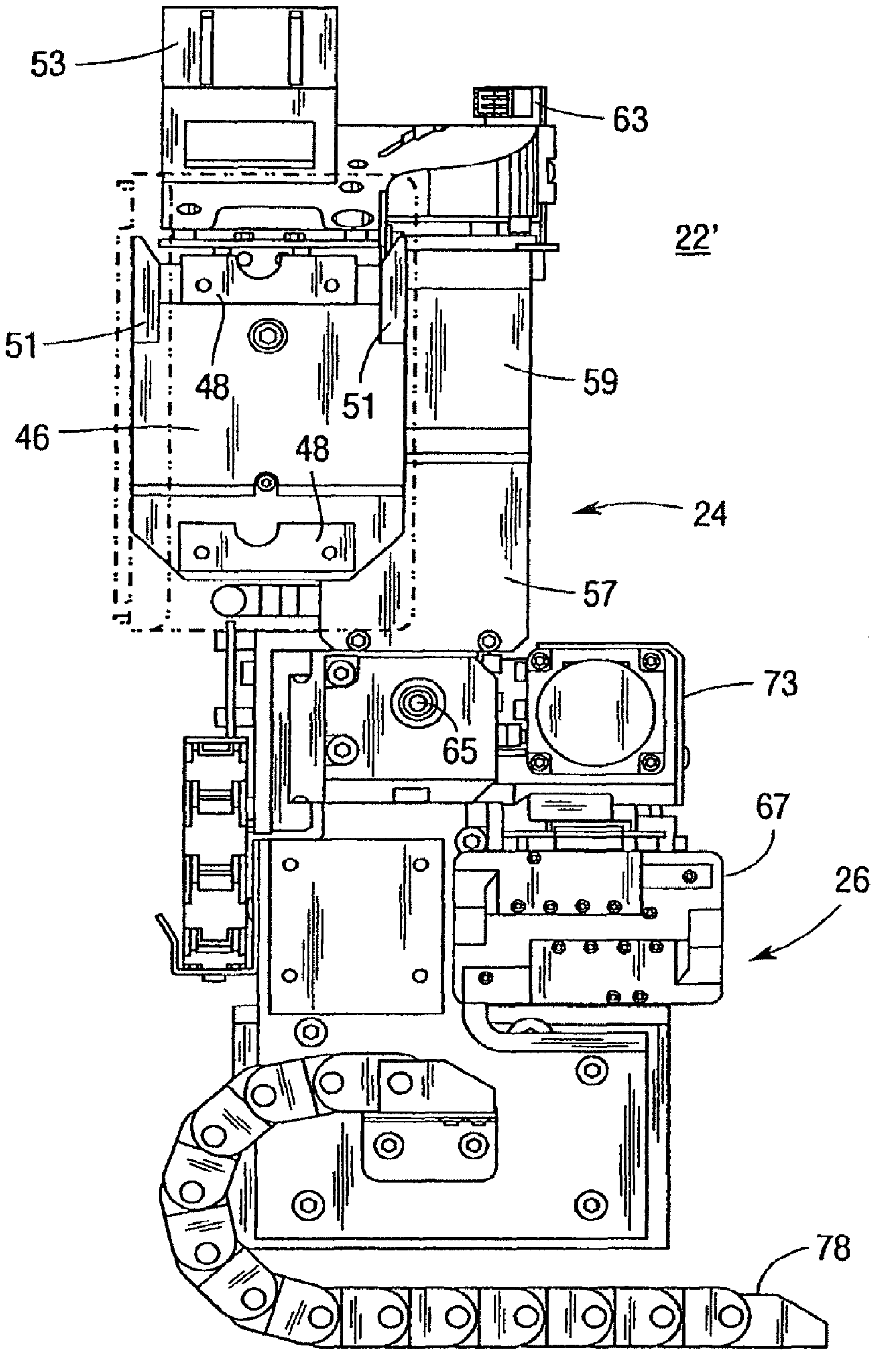

As seen best in FIG. 4B, a spring 75 and guide rod 77 may be provided so that the EOAT 46 has a certain degree of "play" or tolerance to thereby relieve some of the criticality in properly positioning the EOAT 46 with respect to the cassette 20. Thus, if the upper stage 24 is run into a cassette 20, spring 75 compresses while EOAT 46 moves backwards (to the right as shown in FIG. 4B) along guide rods 77 such that no damage is done to computer controlled engagement device 22 or the cassette 20.

Completing the description of the computer controlled engagement device 22 in FIG. 4, a cable track 78 may be provided as is known to safely guide control and power lines into and out of computer controlled engagement device 22.

Figure 5A:
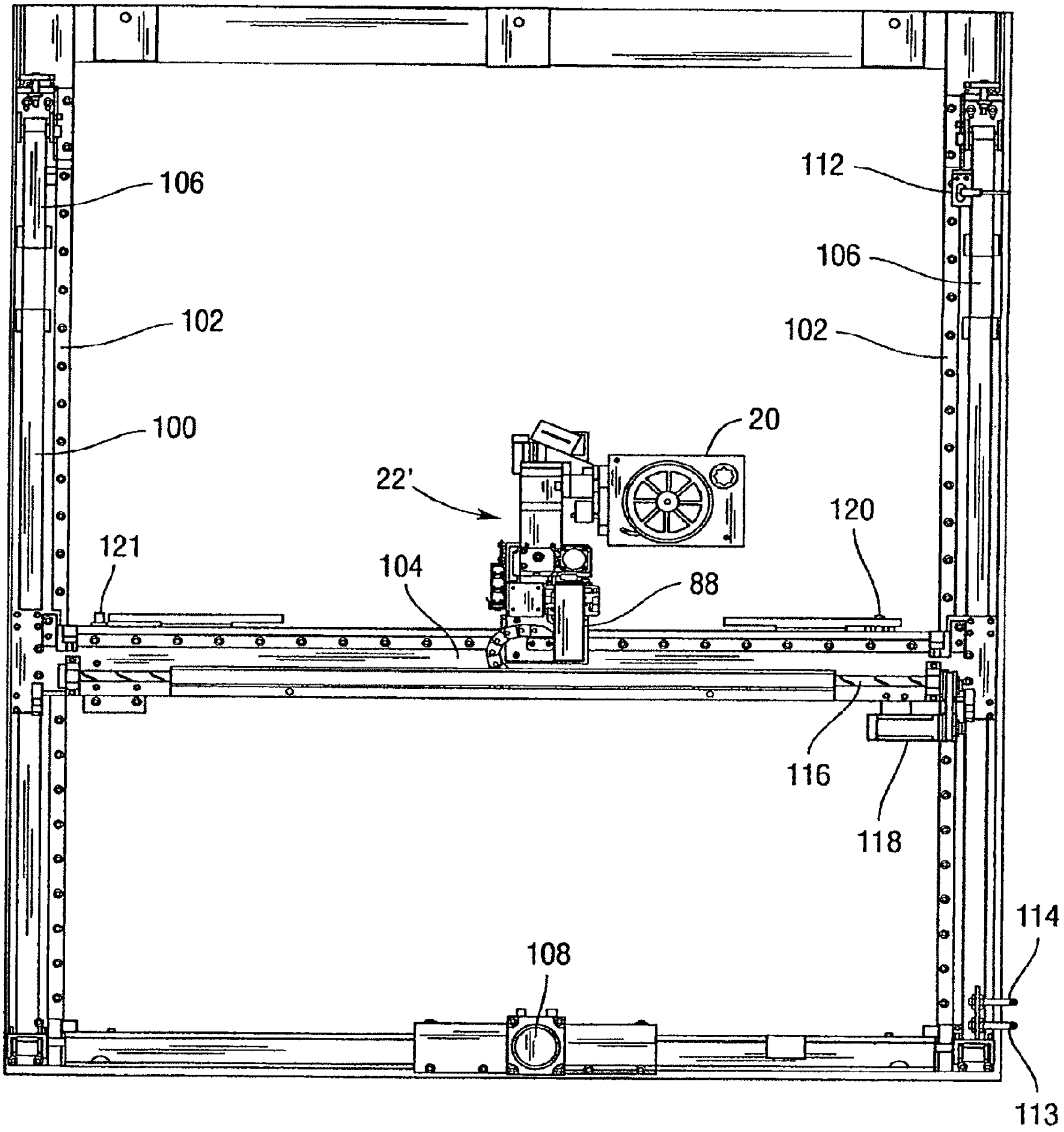
FIGS. 5A, 5B and 5C and 5D illustrate front, top, right side and rear prospective views, respectively, of a system for moving the engagement device of FIG. 4 in the X-Y directions.
Figure 5B:
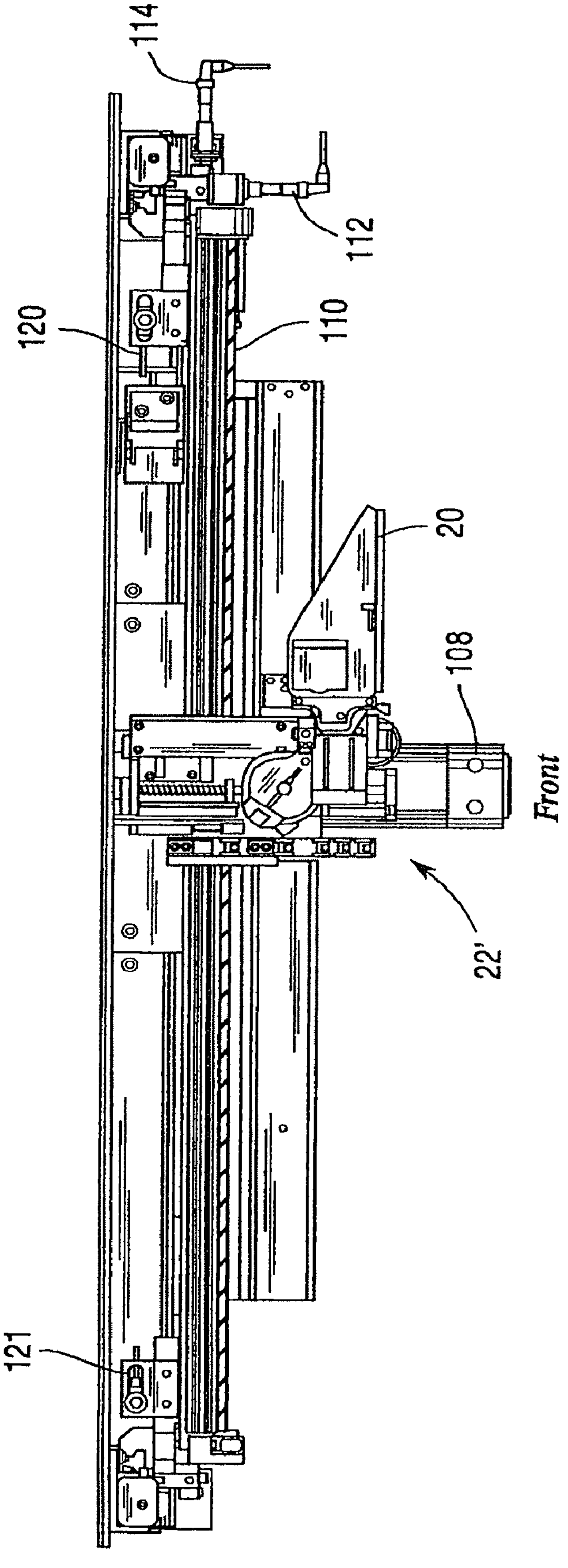
Figure 5C:
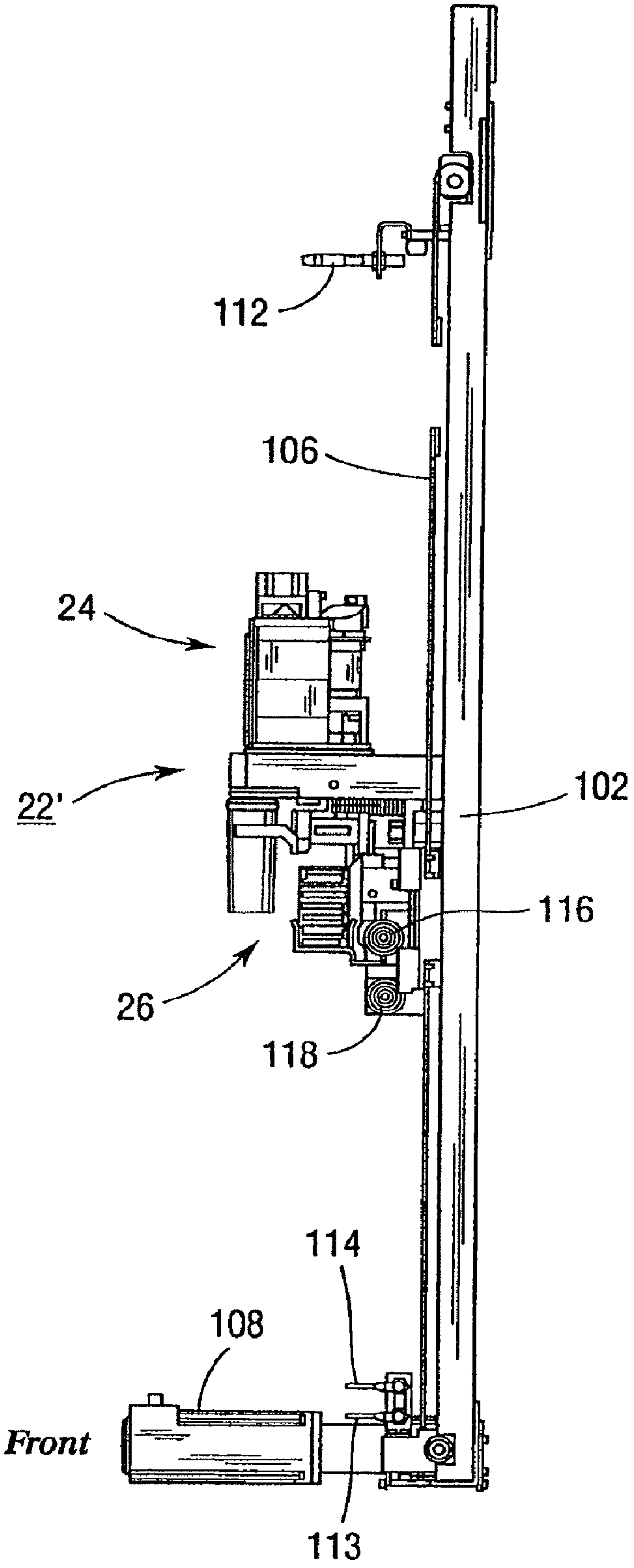
Figure 5D:
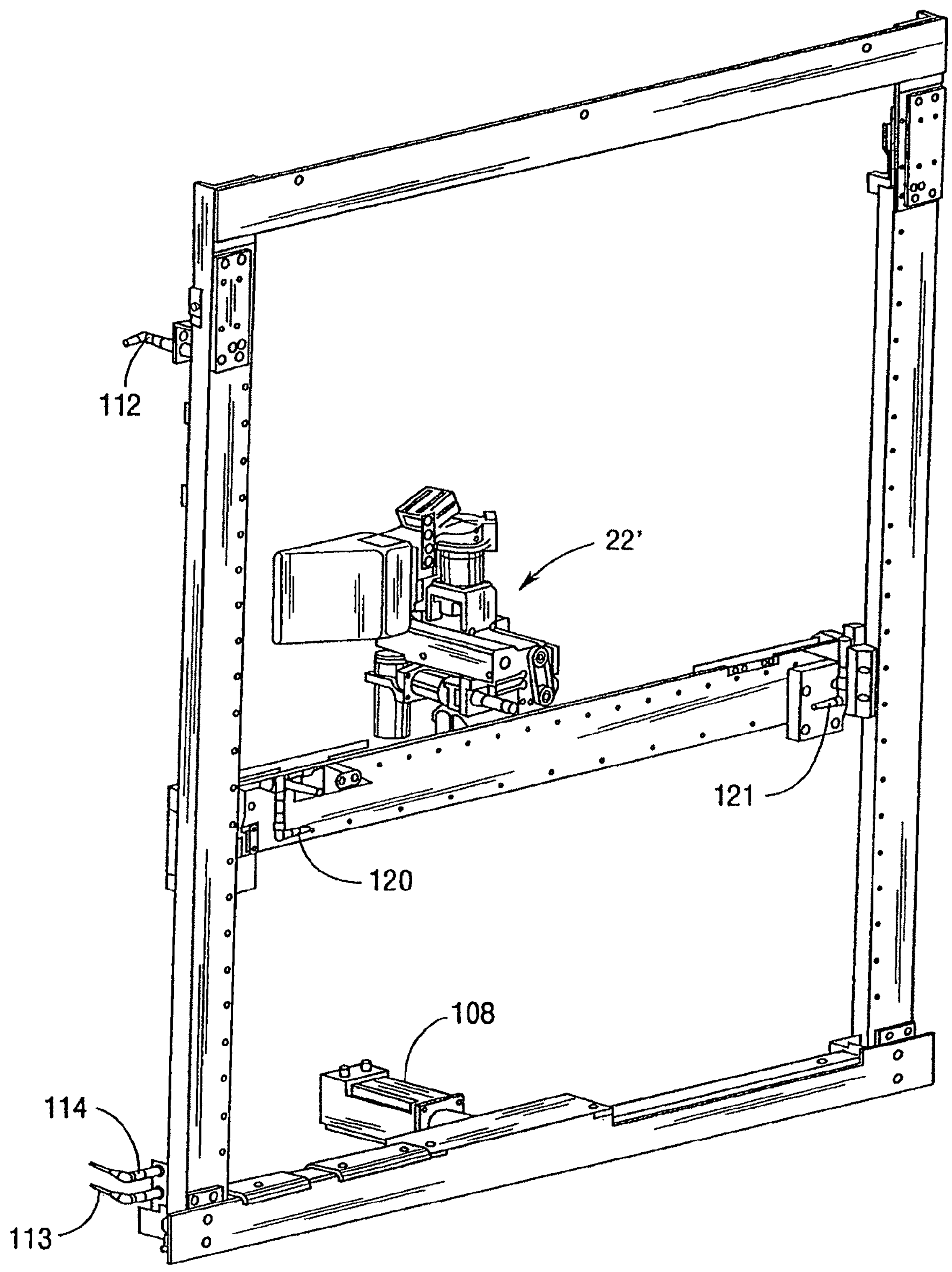

FIGS. 5A, 5B, 5C, and 5D are front plan, top, right and rear perspective views, respectively, of the computer controlled system 28 for moving engagement device 22, 22' in the X-Y directions. Although the computer controlled engagement device 22' is shown carrying both a cassette 20 and a vial 88, in operation the computer controlled engagement device 22' will usually be carrying one or the other. As shown in FIG. 5A, computer controlled system 28 includes an "H" shaped frame 100 comprised of two parallel, vertical beams 102 with a center beam 104 perpendicular to and interposed between parallel beams 102. Center beam 104 is movably connected to parallel beams 102 to allow for movement of center beam 104 in the Y direction. For example, parallel beams 102 may house chains or belts 106 to which center beam 104 of the "H" shaped frame 100 is attached. Rotation of the belts or chains 106 by a motor 108 causes center beam 104 to move up or down in the Y direction, based on the direction of rotation of the motor 108. End of travel (EOT) sensors (seen best in FIG. 5D) 112, 113 provide +Y and −Y limits on travel, respectively, while home sensor 114 indicates if computer controlled engagement device 22 is in a home position. Although in the disclosed embodiment the sensors 112, 113 are fixed and respond to targets on moving parts, those of ordinary skill in the art will recognize that the targets may be fixed and the sensors placed on the moving parts.

Computer controlled system 28 includes a worm gear or screw gear 116 which is driven by motor 118. Engagement device 22, 22' is carried by screw gear 116 such that rotation of the screw gear 116 by motor 118 provides movement of engagement device 22, 22' along center beam 104 of "H" shaped frame 100, which is movement along the X axis. EOT sensors 120, 121 provide limits on travel in the +X and −X directions, respectively. Although in the disclosed embodiment the sensors 120, 121 are fixed and respond to targets on moving parts, those of ordinary skill in the art will recognize that the targets may be fixed and the sensors placed on the moving parts.

Those of ordinary skill in the art will recognize that many other types of mechanical devices may be provided to obtain the desired movement in the X and Y directions. For example, the system 28 could be rotated 90° to form an I-shaped frame so that motion in the X direction is provided by a chain or belt and motion in the Y direction is provided by a worm or screw gear. Other types of gear/drive arrangements are possible. Other prime movers may be used as well, such as hydraulic or pneumatic systems operating in conjunction with pistons, rods, and the like.

FIGS. 6 through 16B are various views illustrating how the computer controlled system 28 may be used to move the engagement device 22, 22' among the various locations described above in the embodiments of the apparatus shown in FIG. 1 and FIG. 3. The engagement device may be moved to the left to pick a cassette 20 from left carousel 16, moved to the right to pick a cassette 20 from right carousel 18, moved to the right and down to pick a vial from one of the vial pick positions, etc. The positioning of the computer controlled system 28 within the apparatus 10 is such that the computer controlled system 28 may move engagement device 22, 22' among the source of vials 30, 30', label printer and application unit 36, counting and dispensing unit 38, output device 40, cassettes 20 carried by shelving unit 12, and a capping unit.

Figure 6:
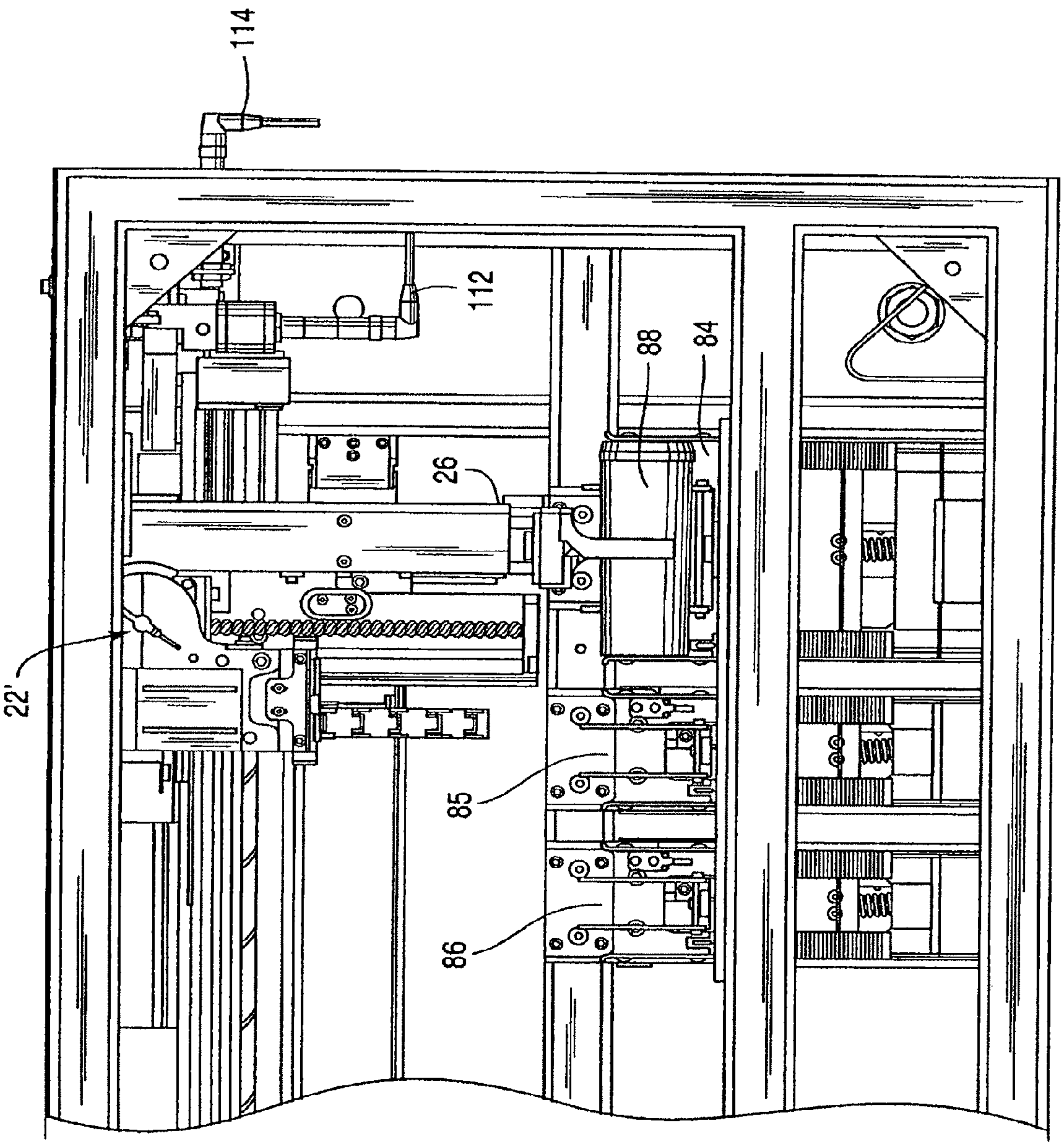
FIG. 6 is a top view looking down illustrating a vial pick from a source of vials in the prescription filling apparatus of FIG. 3.

FIG. 6 is a top view looking down on the computer controlled engagement device 22', (of the type shown in FIG. 4) as the lower stage 26 picks a vial 88 from the escapement mechanism 84.

Figure 7:
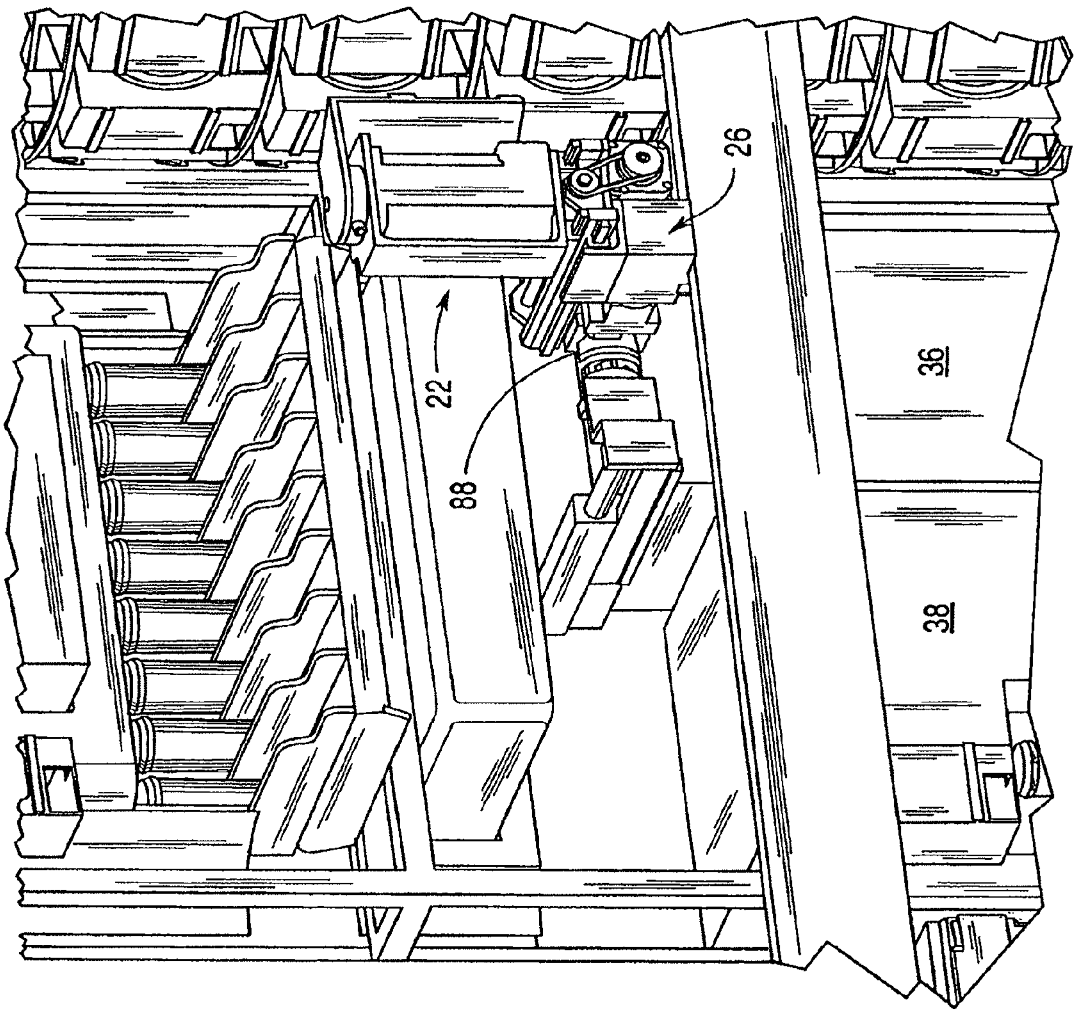
FIGS. 7 and 8 are a perspective view from the rear and a top view, respectively, illustrating the cooperation between another type of engagement device and a label printer and application unit.
Figure 8:
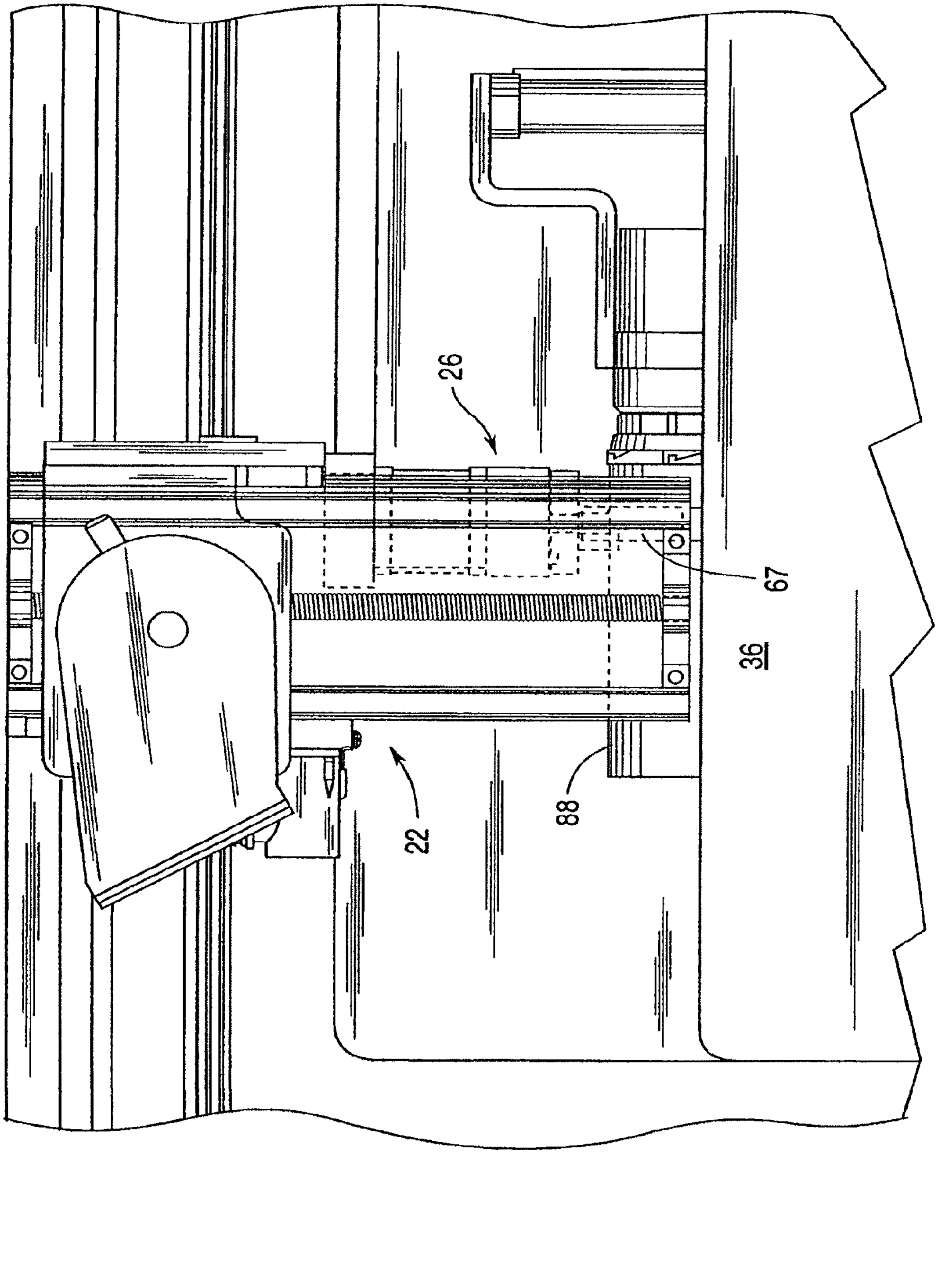

FIGS. 7 and 8 are a perspective view from the rear and a top view, respectively, illustrating the cooperation between lower stage 26 of engagement device 22 and the label printer and application unit 36. Note that the engagement device 22 is of the type in which a single screw or worm gear is used to move both the upper stage 24 and the lower stage 26. Label printer and application unit 36 may be one similar to that described in U.S. application Ser. No. 10/197,742, supra. Label printer and application unit 36 is capable of accommodating vials of varying diameter and length without requiring changes in hardware. Additionally, label printing and application unit 36 enables labels to be accurately aligned in a preferred location on a vial, regardless of the vial's length. Label printer and application unit 36 includes a chuck mechanism having a plurality of movable gripping pins to engage a vial.

FIGS. 7 and 8 show the cooperation between lower stage 26 of engagement device 22 and label printer and application unit 36. Specifically, the gripper mechanism 67 of lower stage 26 should be holding the vial in the orientation in which it was removed from vial source 30, i.e. horizontally. The computer controlled system 28 positions the engagement device 22 proximate to the label printer and application unit 36. The lower stage 26 moves in the Z direction (into the page in FIG. 7) to bring the vial in line with the chuck assembly. The computer controlled system 28 moves the engagement device 22 in the +X direction (to the left in FIG. 7) enabling the vial to be placed on the chuck of the label printer and application unit 36. After the chuck of the label printer and application unit 36 has received the vial, the lower stage 26 releases the vial so that the vial may be rotated by the chuck to apply a label. After the label is applied, the lower stage 26 again grips the vial while the chuck of the label printer and application unit releases the vial. The lower stage 26 is then withdrawn (in a direction away from the chuck in the −X direction).

Figure 9:
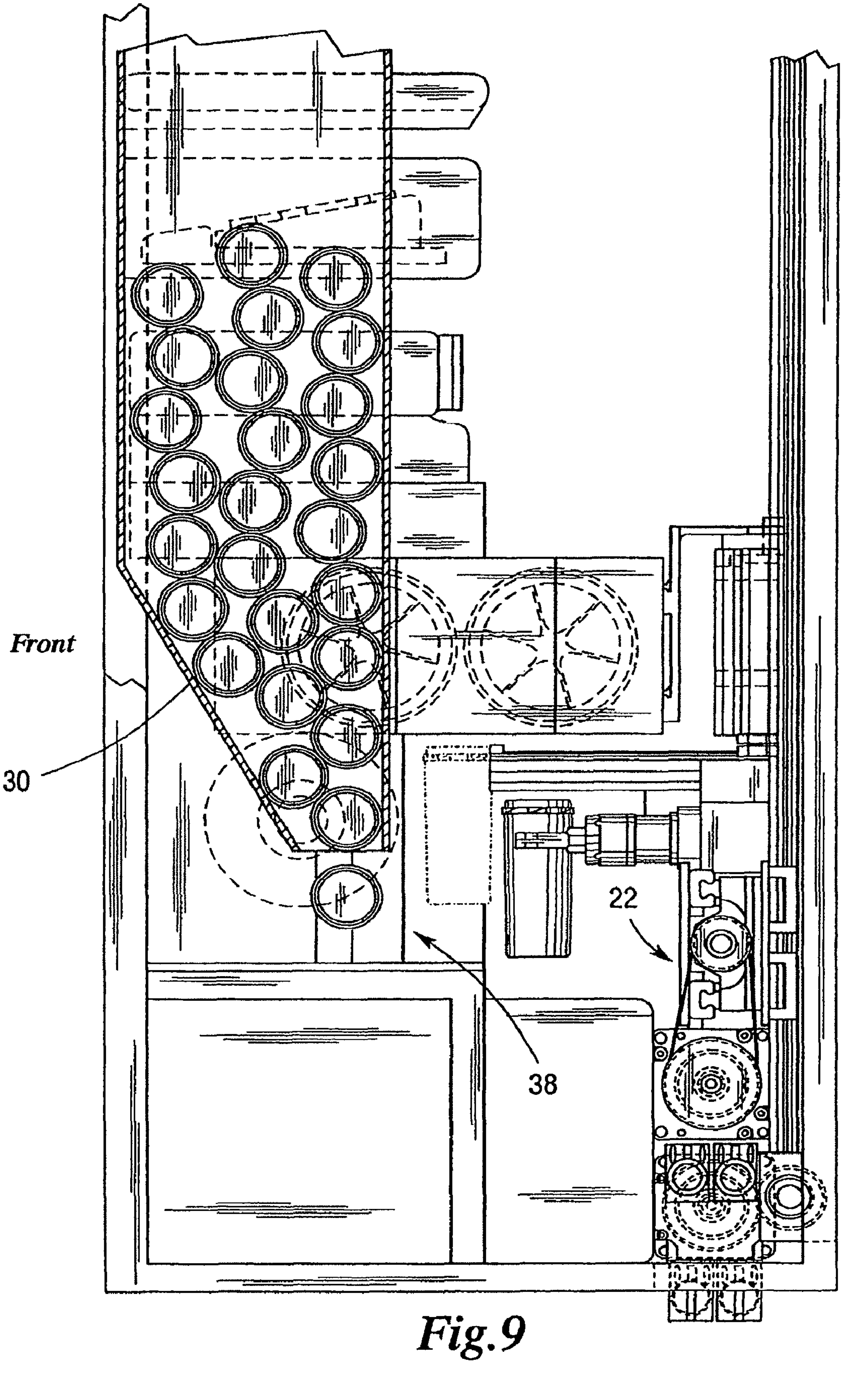
FIG. 9 is a side view illustrating the placement of a picked vial by the lower stage of the engagement device at a counter and dispensing unit in the prescription filling apparatus of FIG. 1.
Figure 10:
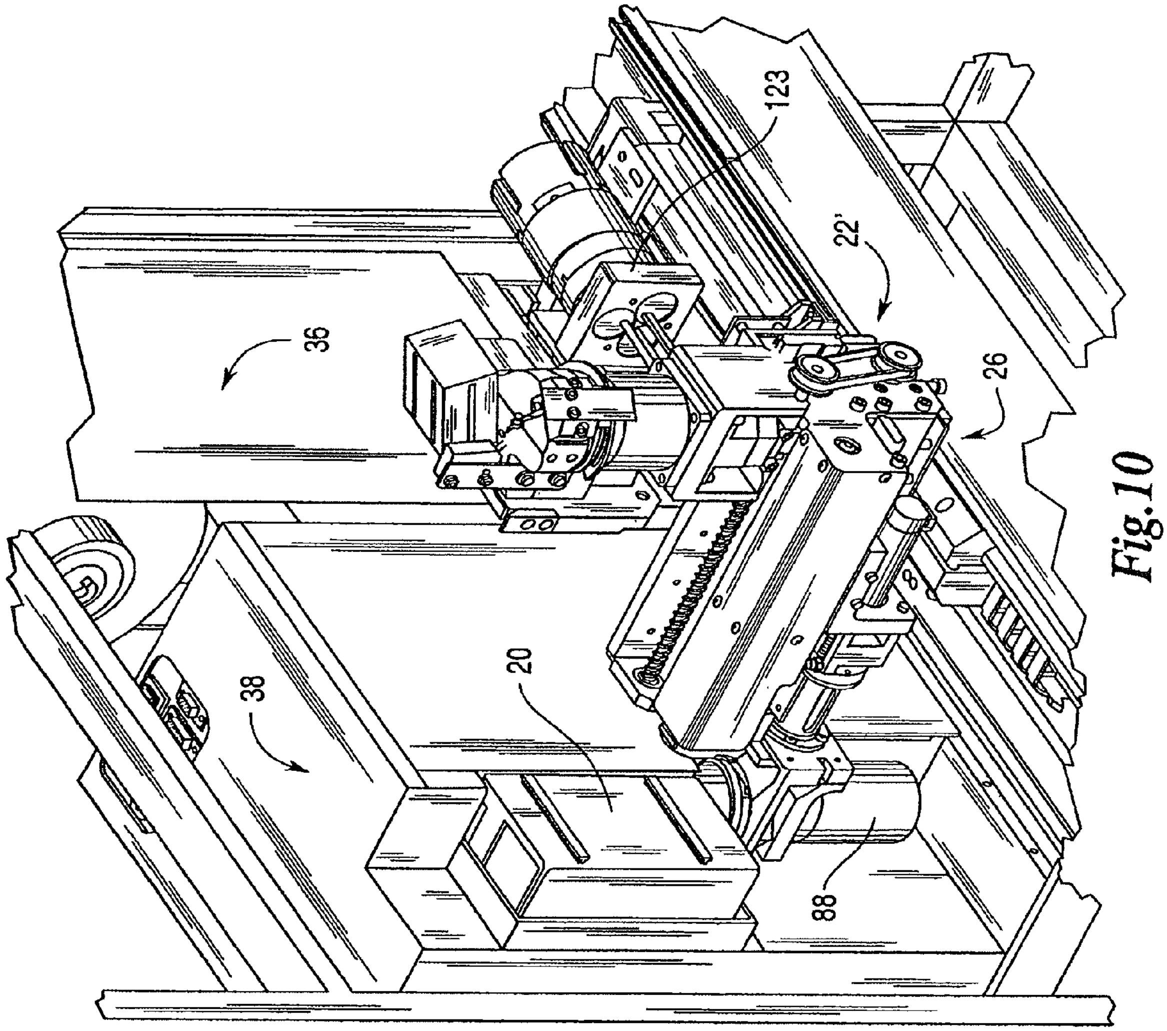
FIG. 10 is a perspective view from the rear illustrating the placement of a picked vial by the lower stage of the engagement device at a counter and dispensing unit in the prescription filling apparatus of FIG. 3.
Figure 26:
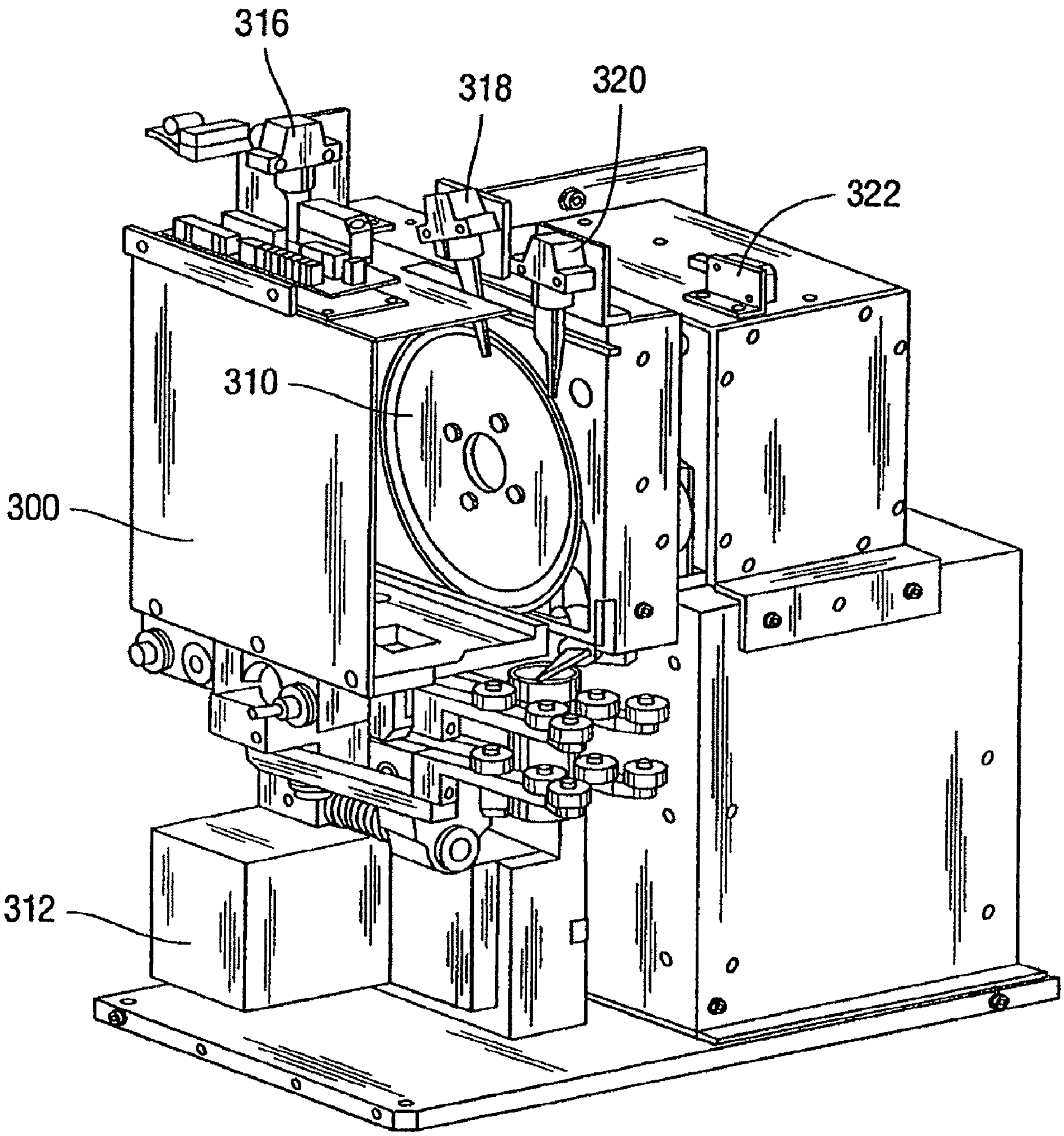
FIG. 26 is a similar view as FIG. 25 but with the housing removed.

After the label printing/label application process is completed, lower stage 26 is used to remove the vial from the label printer and application unit 36 to pill counting and dispensing unit 38. FIG. 9 is a side view illustrating lower stage 26 of the engagement device 22 positioning a vial in pill counting and dispensing unit 38. Note that in FIG. 9 the vial source 30 is of the type shown in FIG. 1 while the computer controlled engagement device 22 is of the type using a single worm gear. In the perspective view of FIG. 10, a computer controlled engagement device 22' of the type shown in FIG. 4 is illustrated. Note also that the orientation of the chuck 123 of the label printer and application unit is opposite of that shown in FIG. 7. Counting and dispensing unit 38 may be of the type described below in conjunction with FIGS. 19-24. Lower stage 26 of engagement mechanism 22 moves to align vial 88 to be in position to receive pills dispensed from pill counting and dispensing unit 38. That movement will require a 90° rotation to move the vial from a horizontal to a vertical position. The vial 88 may simply be placed in the proper position as shown in FIG. 9 or it may be engaged by arms, passively as shown in FIGS. 10 and 26, or actively engaged (not shown).

Figure 11:
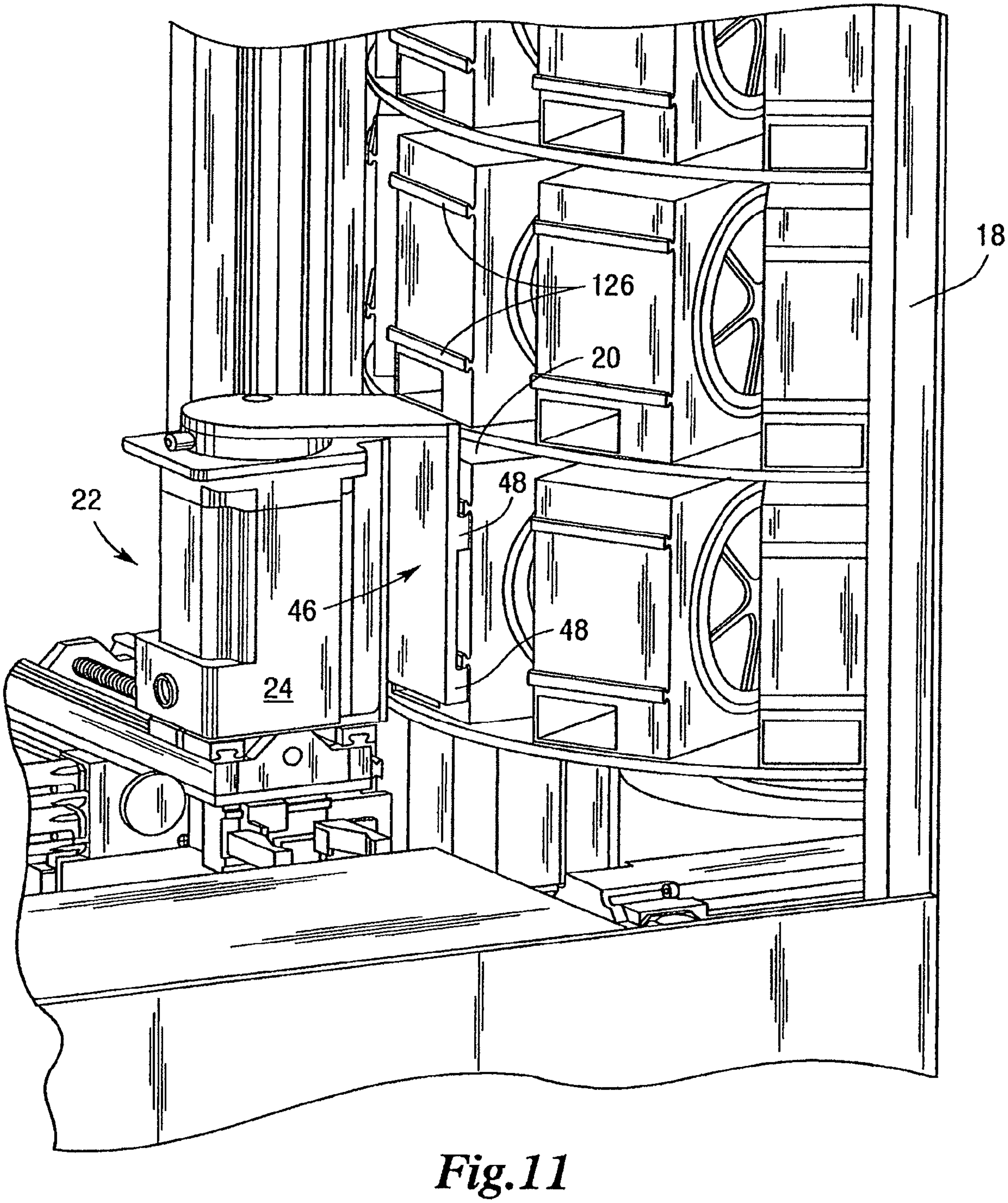
FIGS. 11, 12 and 13 are a perspective view from the front and two top views, respectively, illustrating the cooperation between an upper stage of the engagement device and a cassette carried by a right carousel of the apparatus of FIG. 1.
Figure 12:
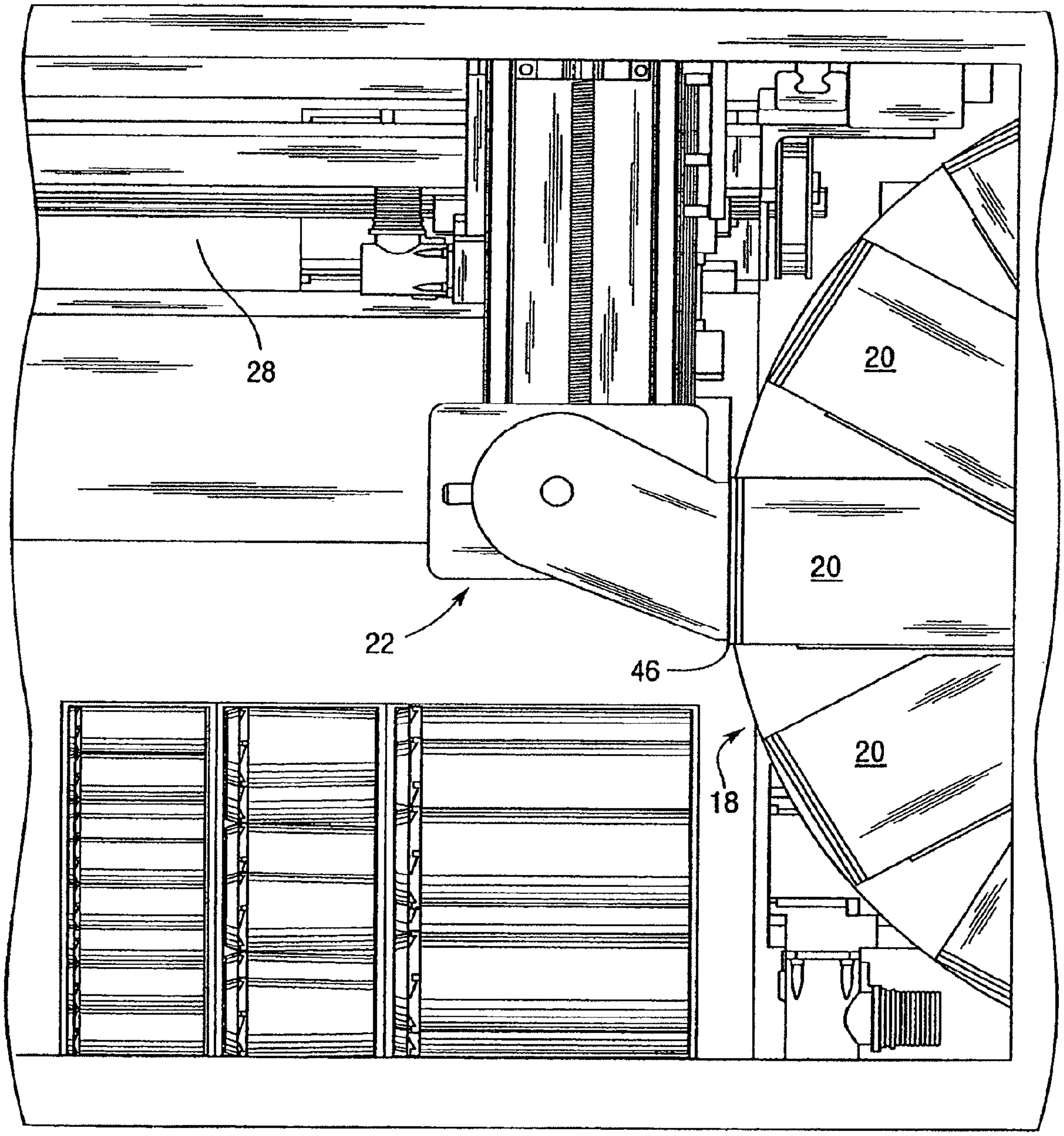
Figure 13:
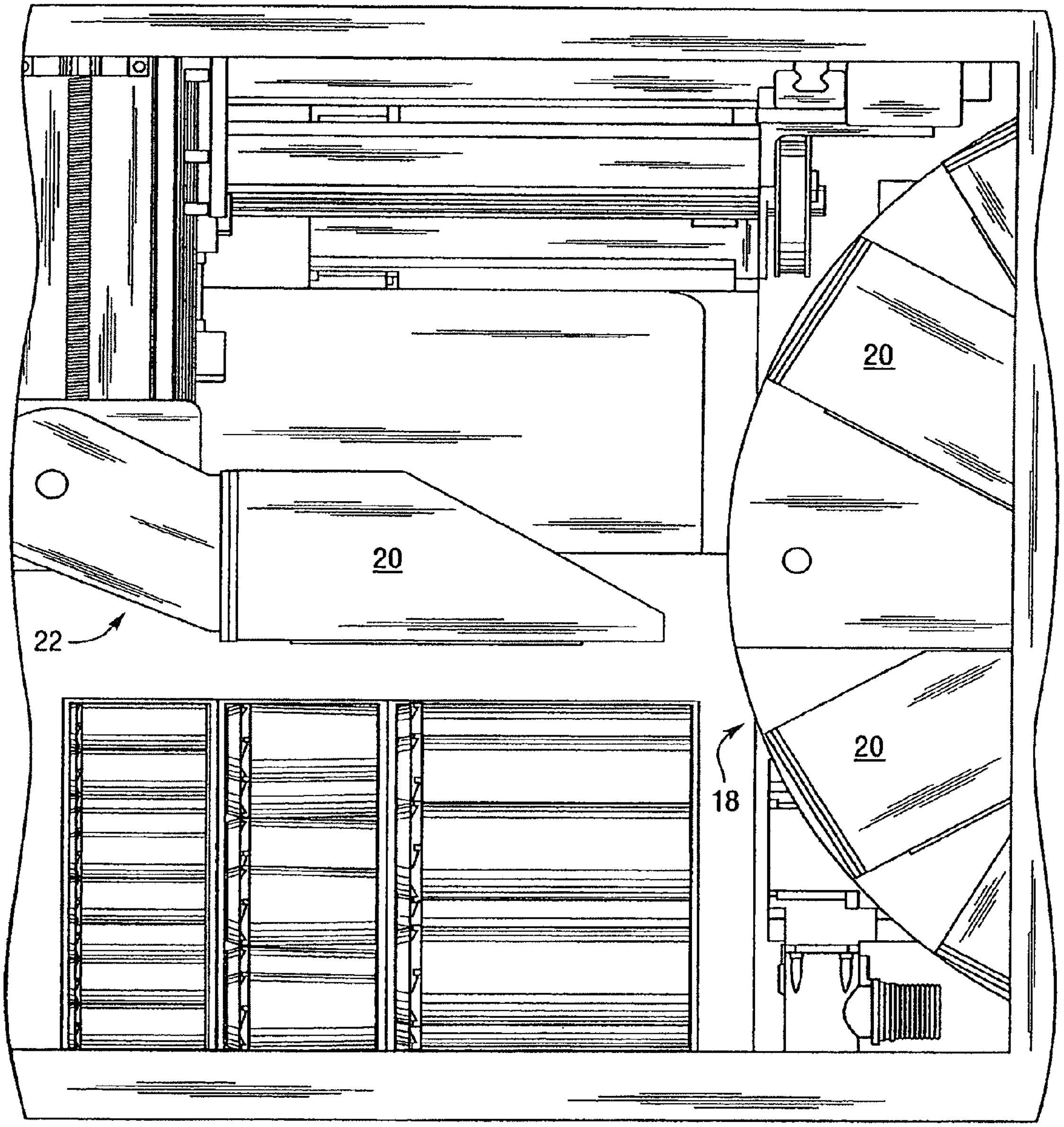

FIGS. 11, 12 and 13 are a perspective view from the front and two top views, respectively, illustrating the cooperation between upper stage 24 of engagement device 22 and cassette or storage container 20 carried by right carousel 18 of the apparatus 10 of FIG. 1. As shown in FIG. 11, storage container or cassette 20 carries at least one I-beam shaped bar 126 (or an L-shaped bar, C-shaped bar, etc. not shown) positioned horizontally as shown in FIG. 11. As will be appreciated, one edge of the I-beam shaped bar 126 fits within channel 49 formed by the notched bars 48 carried by the EOAT panel 46. As shown in FIG. 11, two I-beam shaped bars 126 are provided for mating with the two channels 49 in the EOAT panel 46. As described, panel 46 is rotatable about an axis 55 extending in the Y direction to provide motion of panel 46 in the Z direction. Additionally, engagement device 22 contains a screw extending in the Z direction to enable upper stage 24, and therefore panel 46, to move in the Z direction.

When picking a desired storage container 20 located in right carousel 18, motor 118 of computer controlled system 28 moves engagement device 22 in the +X direction so that upper stage 24 is adjacent to a "pick column". The pick column is that column of carousel 18 that is in approximately the nine o'clock position. The pick column will vary depending upon such factors as the diameter of the carousel and the location of the computer controlled system 28. Simultaneously, (or before or after), motor 108 moves the engagement device 22 in the Y direction to bring upper stage 24 to a "pick position", i.e., adjacent to the desired storage container or cassette 20 within the pick column.

Panel 46 may also be rotated as needed, to bring panel 46 to the position shown in FIG. 12. A small movement in the +X direction (to the right in FIG. 12) will now cause channels 49 (not seen in FIG. 12) to be located beneath I-beam shaped bars 126 (not seen in FIG. 12). The bar code reader 53 (if supplied) may be used to verify that the proper cassette has been selected. If the proper cassette has been selected, computer-controlled system 28 causes engagement device 22 to move in the +Y direction (upward) causing the I-beam shaped bars 126 to engage channels 49 (see FIG. 11). Continued movement in the +Y direction will cause cassette 20 to clear alignment pin 92. After confirmation that the proper cassette has been selected (which is an optional but desirable step), and after engagement, a solenoid actuated pin (not shown) or other similar device may lock the cassette to the engagement device 22. Movement to the left in FIG. 12 causes cassette 20 to be withdrawn or removed from carousel 18 as shown in FIG. 13.

Figure 14:
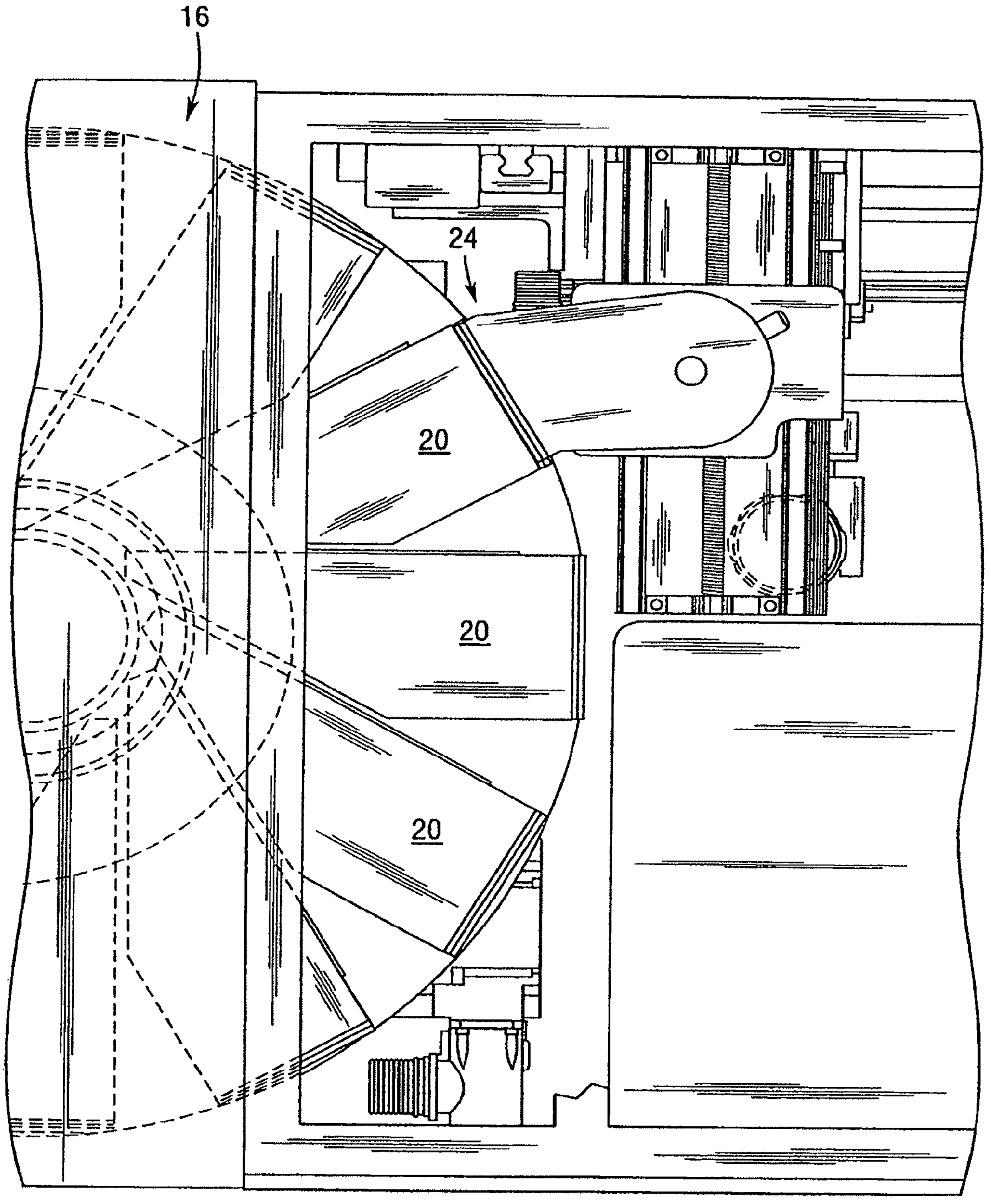
FIG. 14 is a top view illustrating the cooperation between an upper stage of the engagement device and a cassette carried by a left carousel of either the apparatus of FIG. 1 or the apparatus of FIG. 3.

FIG. 14 is a top view illustrating the cooperation between the upper stage 24 of engagement device 22 and a cassette 20 carried by left carousel 16 of FIG. 1, although the procedure for left carousel 16 of FIG. 3 would be the same. A "pick" from left carousel 16 operates substantially the same as a pick from right carousel 18. The differences are in the position of engagement device 22 and the location of the pick column for left carousel 16. When picking a desired storage container 20 located in left carousel 16, the pick column is at the two o'clock position. Again, however, the pick column will vary depending upon such factors as the diameter of the carousel and the location of the computer controlled system 28. For a pick from the left carousel 16, the engagement device 22 is not as far along the Z axis (i.e. approximately midway) than for a pick from the right carousel 18.

Figure 15:
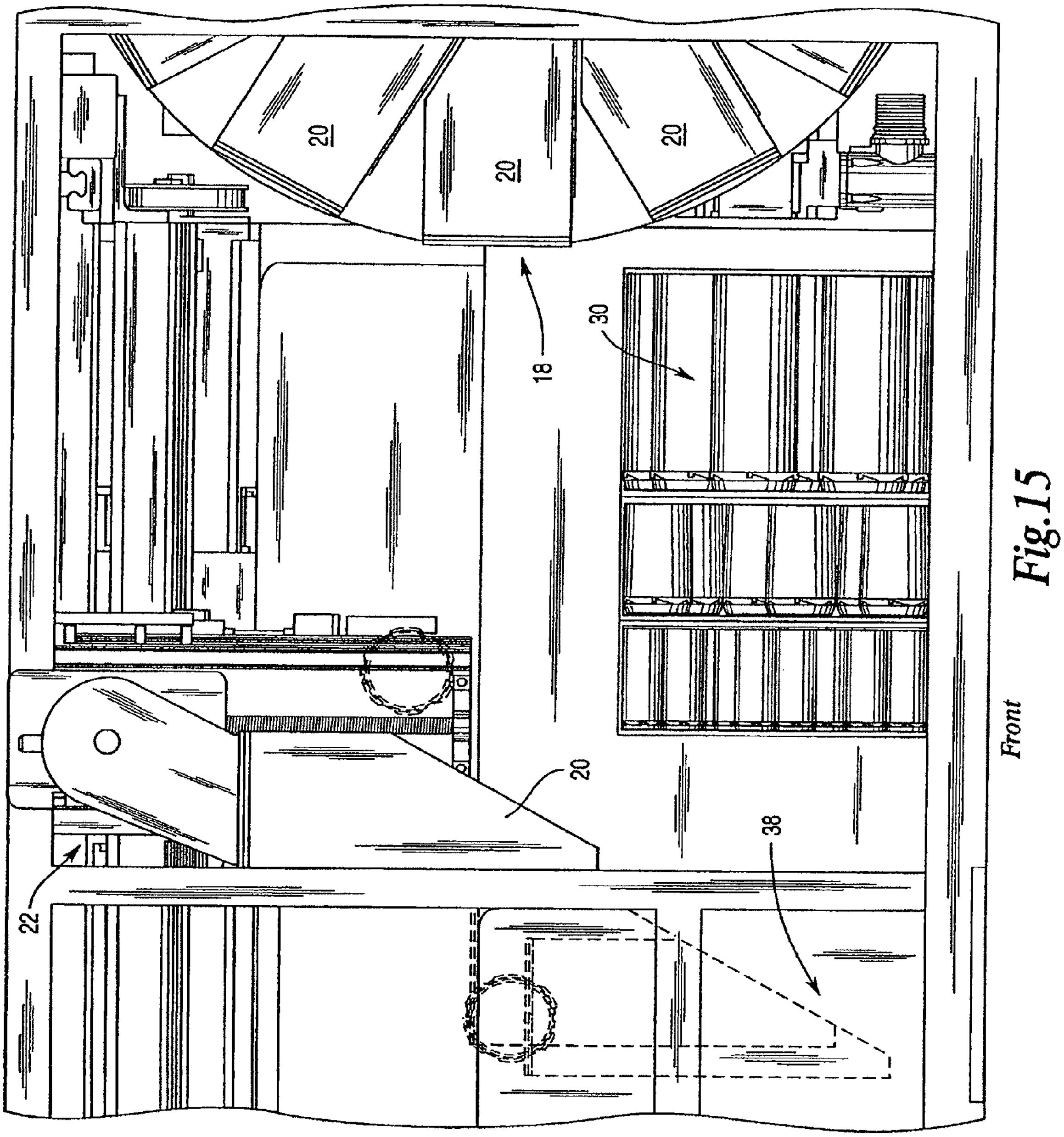
FIG. 15 illustrates an insertion position of a cassette for the pill counting and dispensing unit.

FIG. 15 illustrates an insertion orientation of cassette 20 for pill counting and dispensing unit 38. If a pick occurred from right carousel 18, panel 46 is rotated clockwise about axis 55 approximately 90°; if a pick occurred from left carousel 16, panel 46 must be rotated counter clockwise about axis 55 approximately 60°. Also, upper stage 24 must move to the 'far' end (i.e. top of FIG. 15) of the screw or worm gear. Thereafter, or simultaneously, computer controlled system 28 moves engagement device 22 proximate to pill counting and dispensing unit 38 as shown in FIG. 16A. Movement of upper stage 24 in the Z direction enables insertion of the cassette 20 into counting and dispensing unit 38. Thereafter, the engagement device 22 may tend to other tasks leaving cassette 20 in counter/dispenser 38 as shown in FIG. 16B.

Figure 17:
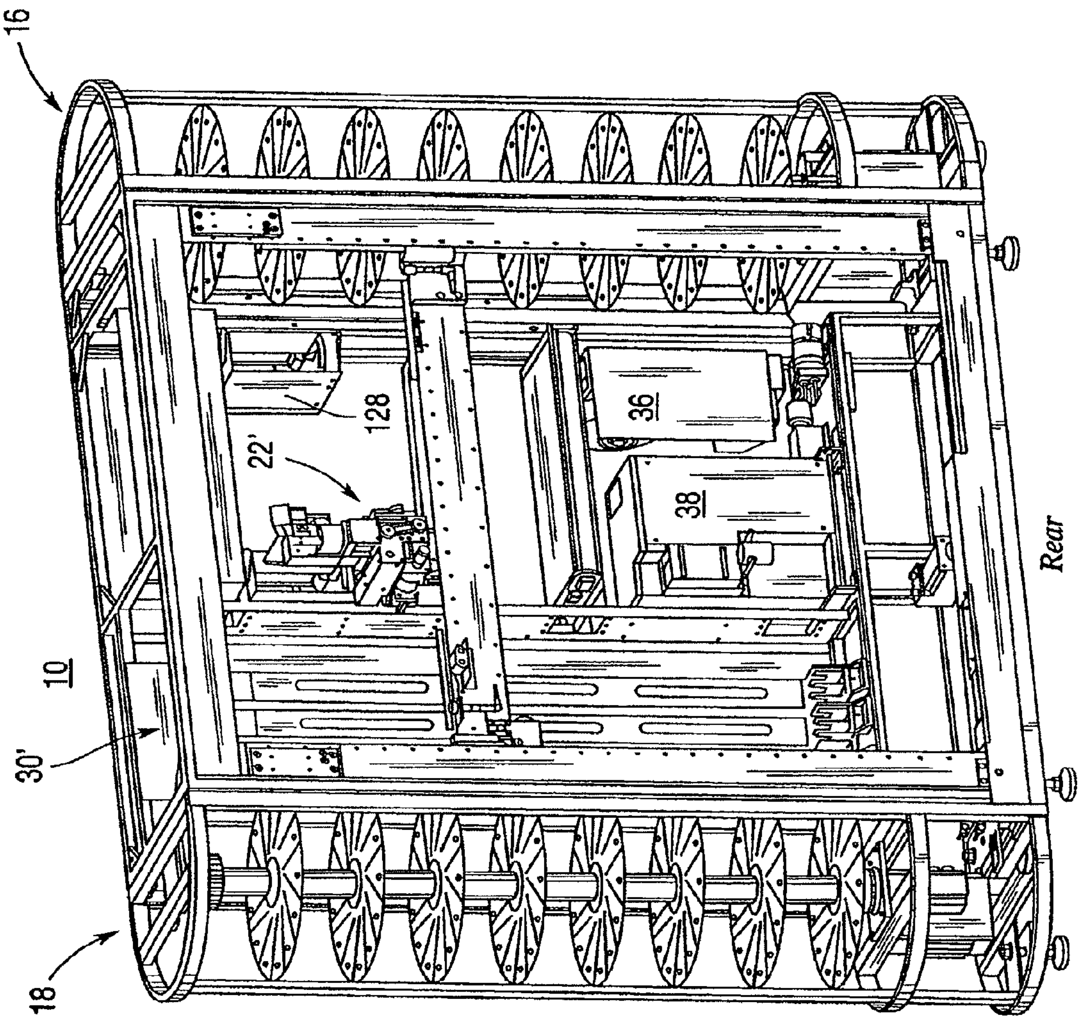
FIG. 17 illustrates a third embodiment of a prescription filling apparatus according to the present invention.

FIG. 17 illustrates another embodiment of the prescription filling apparatus 10 of the present invention. The embodiment shown in FIG. 17 is similar to the embodiment shown in FIG. 3, except that the prescription filling apparatus 10 is provided with a pair of carousels, left carousel 16 and right carousel 18. The prescription filling apparatus 10 is seen from the rear in FIG. 17.

Figure 18B:
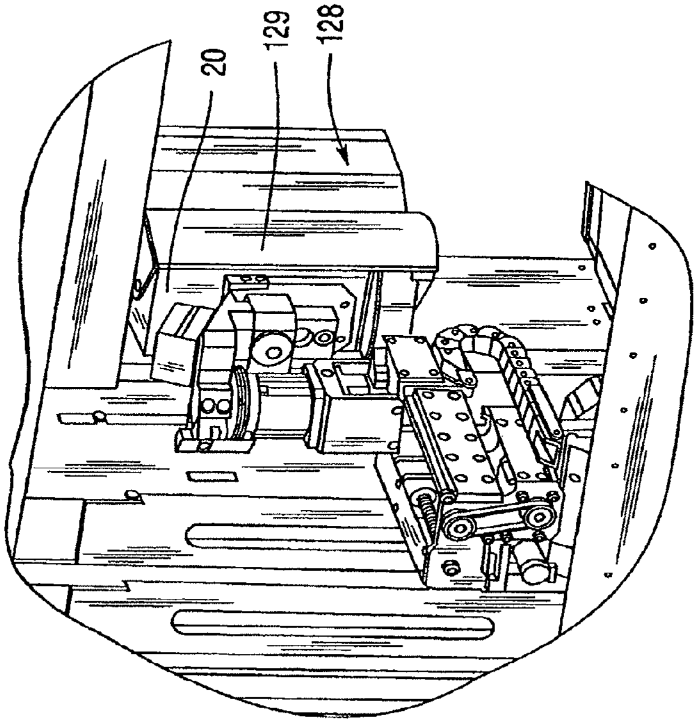
FIGS. 18A, 18B and 18C illustrate a replenishment-in/replenishment-out housing.
Figure 18C:
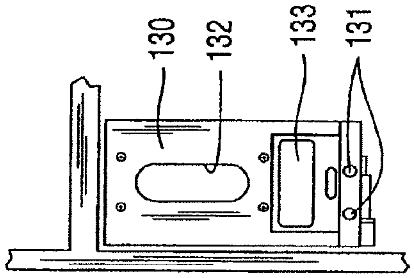

The prescription filling apparatus 10 illustrated in FIG. 17 is provided with a replenishment-in/replenishment-out housing 128. The replenishment-in/replenishment-out housing 128 (sometimes referred to as an input/output housing) is shown in greater detail in FIGS. 18A-18C. The replenishment-in/replenishment-out housing 128 is provided with a rear door 129, seen best in FIG. 18B, and a front door 130, seen best in FIG. 18C. The rear door 129 and front door 130 are computer controlled and may be provided with an interlock system, not shown, so that only one of the two doors may be opened at a time. The interlock system may take any variety of known forms including mechanical linkages, solenoid actuated pins or the like. The front of the replenishment-in/replenishment-out housing 128 may be provided with LEDs 131 or other type of indicators as shown in FIG. 18C to indicate when the front door 130 may be opened. The front door 130 may have a window 132 for viewing inside the housing 128 and a door handle 133. Those of ordinary skill in the art will recognize that any suitable type of barrier may be employed in place of doors 129, 130 while remaining within the scope of the present invention.

Figure 18A:
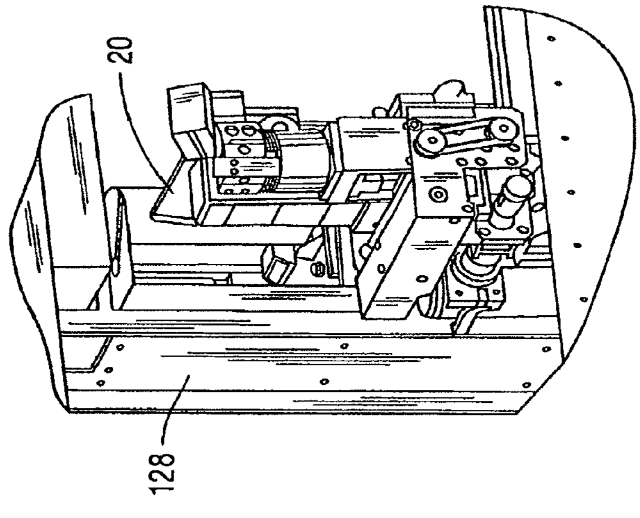
Figure 19:
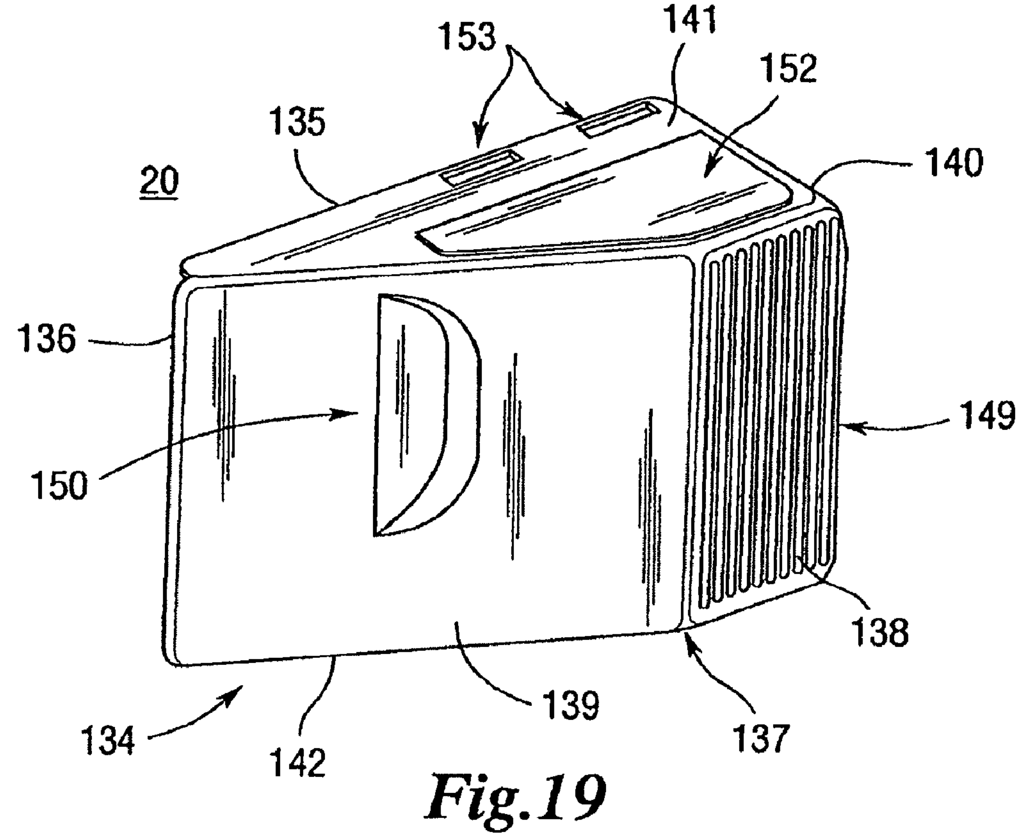
FIGS. 19 and 20 are perspective views of one embodiment of a cassette that may be used with the apparatus of either FIG. 1 or FIG. 3.

During a replenishment operation, the computer controlled engagement device 22, 22' may select a cassette which needs replenishment, servicing, or replacement with another cassette and transfer it to the replenishment-in/replenishment-out housing 128 as shown in FIG. 18A. FIG, 18B illustrates the computer controlled engagement device 22, 22' inserting the cassette 22 into the replenishment-in/replenishment-out housing 128. Once the cassette is loaded in the replenishment-in/replenishment-out housing 128 and the rear door 129 is closed and locked, the front door 130 may be unlocked and the LED 131 or other display device illuminated to indicate to the user that the cassette in the replenishment-in/replenishment-out housing 128 may be removed for replenishment, servicing, replacement, etc. Upon appropriate action being taken with respect to the removed cassette 20, when the removed cassette or another cassette 20 is inserted into the replenishment-in/replenishment-out housing 128, the user may use the input device 42 to communicate to the apparatus 10 that the cassette 20 may be removed from the replenishment-in/replenishment-out housing 128 and replaced on a carousel 16, 18. The bar code reader 53 (if supplied) may be used to scan the bar code on the cassette in the replenishment-in/replenishment-out housing 128 to determine the appropriate position on the carousel for that cassette.

Because the replenishment-in/replenishment-out housing 128 operates in a manner such that both the rear door 129 and front door 130 may not be unlocked and opened at the same time, it is not possible for a user to insert their hand or any objects into the apparatus 10. That allows the user to remove cassettes for replenishment, servicing, replacement, etc. while the apparatus 10 is filling prescriptions. Due to safety concerns, oftentimes other apparatus of this type must be shut down for replenishment, cleaning of the cassettes, stock swapping, and other activities to insure user safety. However, with the apparatus 10 of the present invention, the cassettes may be moved to a location, i.e., the replenishment-in/replenishment-out housing 128, such that they may be safely removed from the apparatus 10 while the apparatus 10 is operational. Those of ordinary skill in the art will recognize that more than one replenishment-in/replenishment-out housing 128 may be provided while remaining within the scope of the present invention.

FIGS. 19-24 illustrate a cassette of the type of which may be used in connection with the present invention. The cassette 20 is comprised generally of a housing 134 having a first side wall 135, a front wall, or nose, 136, a second side wall 137 comprised of a parallel section 138, which is parallel to the first side wall 135, and an incline section 139, which is inclined with respect to the first side wall 135. The housing is also comprised of a rear wall 140, seen best in FIG. 22, a top wall 141, seen best in FIGS. 19 and 20, and a bottom wall 142, seen best in FIG. 21.

Figure 20:
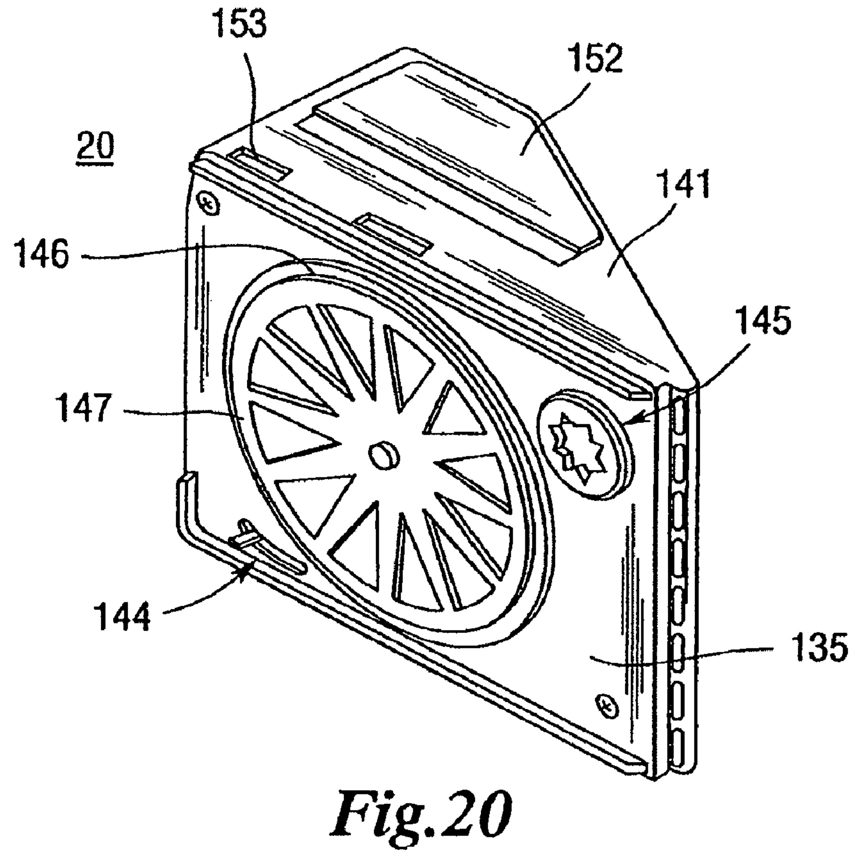
Figure 21:
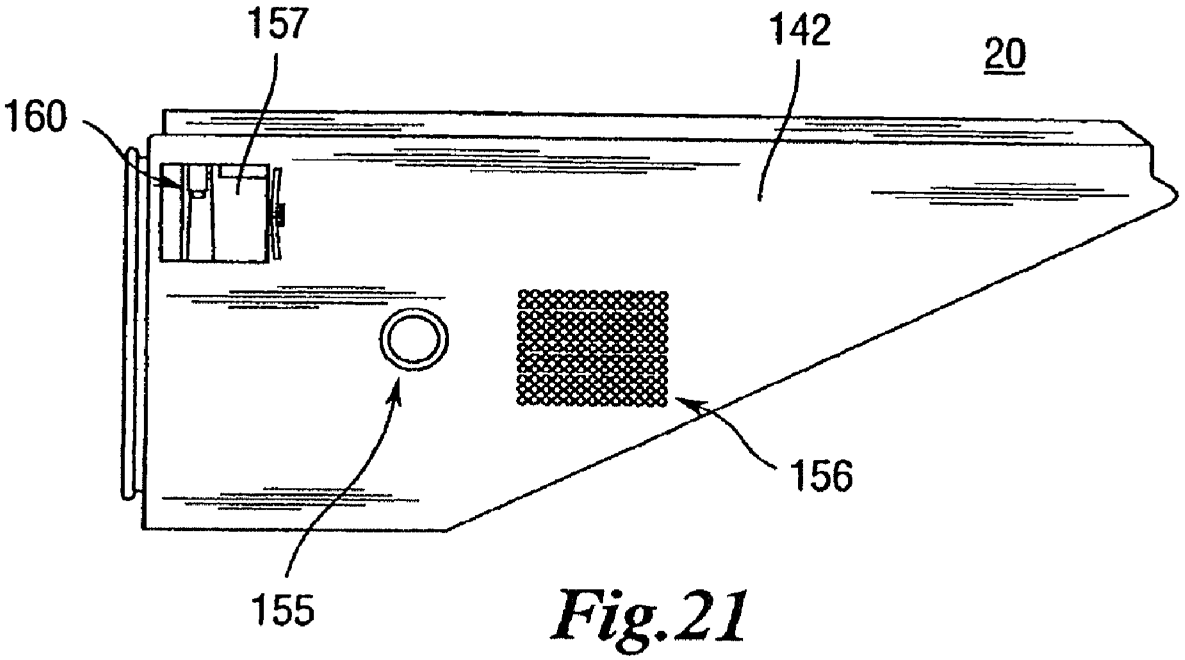
FIGS. 21 and 22 illustrate the bottom and back, respectively, of the cassette of FIGS. 19 and 20.
Figure 22:
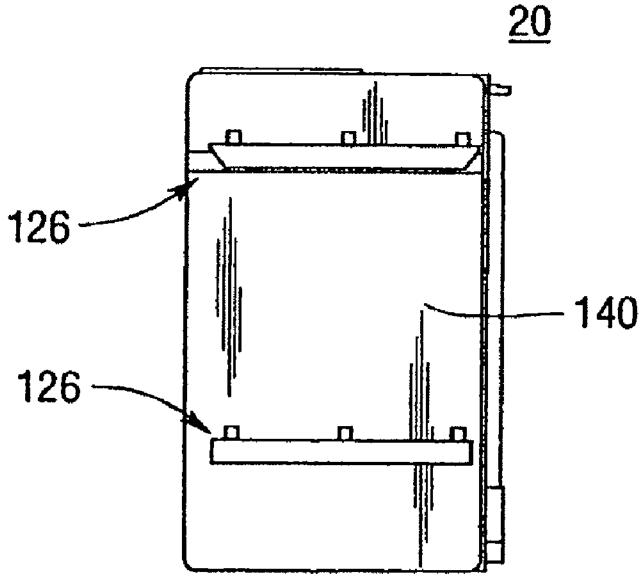

The first side wall 135 may carry a chute gate actuator 144 and a driven calibration wheel 145, the functions of which are described below. Also visible in FIG. 20 is one side 146, which is a tapered driven side, of a rotatable conveying wheel 172 seen best in FIG. 23. The side 146 is covered by a flexible dust cover 147, the function of which is described below. The second side wall 137 may carry grip handles 149 and a hand hold 150. The rear wall 140 carries the I-beam shaped bars 126 as previously described. Those of ordinary skill in the art will recognize that bars of other shape, as well as other types of passive grippers, may be used in place of I-beam shaped bars 126 while remaining within the scope of the present invention. The front wall 136, or nose, is sized to mate with the alignment gear 90 of the carousels 16, 18 as previously described. The top wall 141 carries a replenishment or access door 152 (optionally lockable) as well as sensor openings 153. The bottom wall 142, seen best in FIG. 21, carries an alignment recess 155. As previously described, the alignment recess 155 cooperates with the alignment pin 92 in each somewhat pie-shaped storage location 14 to maintain the cassette 20 in its proper position. The bottom wall 142 also carries air inlet openings 156 (which may be venturi shaped) and has a discharge opening 157 through which a chute gate 160, seen best in FIG. 23, can be seen.

Figure 23:
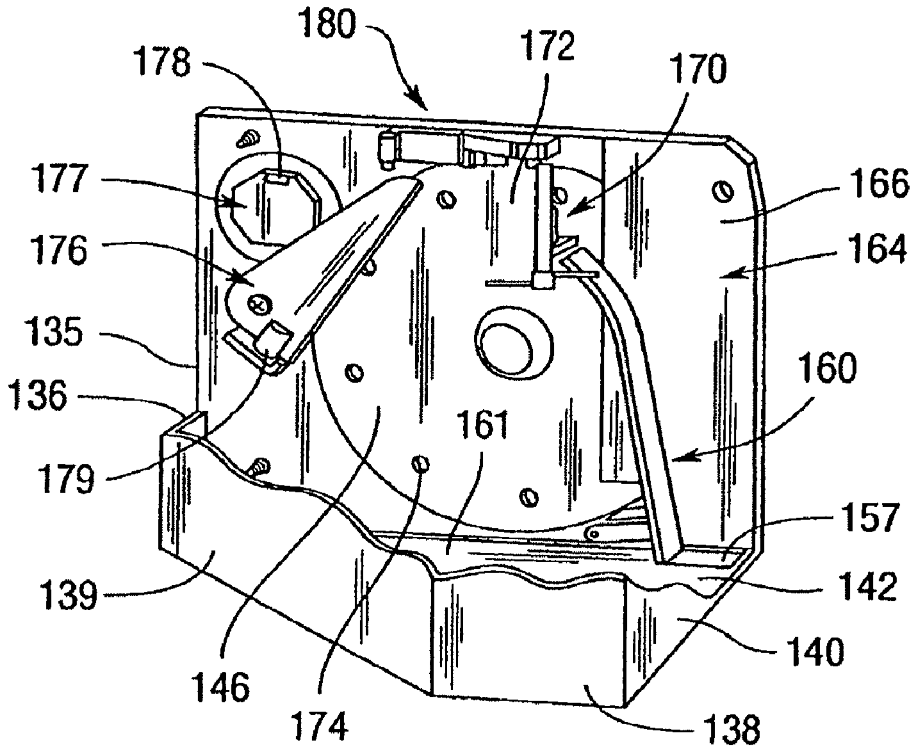
FIGS. 23 and 24 illustrate the internals of the cassette of FIGS. 19 and 20.
Figure 24:
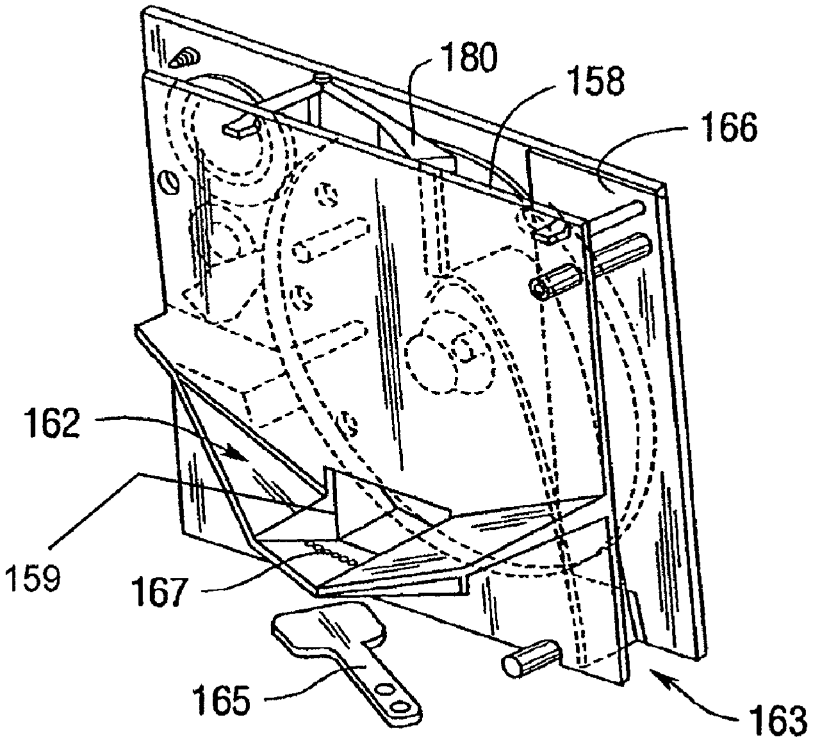

Turning now to FIG. 23, it will be seen that the housing 134, specifically the first side wall 135, front wall 136, parallel section 138 of second side wall 137, inclined section 139 of second side wall 137, rear wall 140, top wall 141, and bottom wall 142 cooperate to define an area 161. As shown in FIG. 24, the area 161 is divided into a pill storage chamber 162 for storing medication units, e.g., pills, capsules, caplets, tablets, gel-caps, etc., and a pick-up area 163 by a dividing wall 158. The dividing wall 158 may have openings 159 therethrough to enable units of medication to move from the bulk storage chamber 162 into the pick-up area 163. An air intake valve 165 may be used to regulate the volume of air input to the bulk storage chamber 162.

Returning to FIG. 23, a discharge chute 164 is formed by a baffle 166 forming a side wall, the chute gate 160 forming one end wall, a portion of the divider wall 158 (seen in FIG. 24) forming the other side wall, and a portion of the rear wall 140 of the housing 134 forming the other end wall of the discharge chute 164. The discharge chute 164 has an exit end generally aligned with the discharge opening 157 in the bottom wall 142 of the housing 134. The chute gate 160 is capable of moving, preferably in response to some type of biasing force, from the open position as shown in FIG. 23, to the right, to a closed position in which the exit end of the discharge chute 164 is closed. When the chute gate 160 is in the open position as shown in FIG. 23, the interior of the discharge chute 164 is in communication with the discharge opening 157 in the bottom wall 142. The position of the chute gate 160 is controlled by the chute gate actuator 144 (FIG. 20) and, preferably, a biasing force which biases the chute gate 160 into the closed position in the absence of a force acting on the chute gate actuator 144.

Completing the description of the discharge chute 164, a pre-chute gate 170 is provided at an upper end or entrance end of the discharge chute 164. The pre-chute gate 170 acts as a valve at the entrance end of the discharge chute 164. The discharge chute 164 may have a volume of approximately 15-25 drams, so it may hold a number of pre-counted medication units as is described below.

As seen in FIG. 23, the cassette 20 is provided with the rotatable conveying wheel 172 which can be accessed and rotated from outside of the cassette by virtue of its tapered, driven side 146. The rotatable wheel 172 is generally parallel to the first side wall 135 and has a plurality of openings 174 proximate to the periphery thereof. The openings 174 may optionally be venturi shaped. The openings 174 are normally not in communication with outside ambient air by virtue of the flexible dust cover 147. Also provided are a calibration arm 176 and a calibration cam 177, which may carry a permanent magnet 178. The position of the calibration cam 177 is controlled by the driven calibration wheel 145 (see FIG. 20). Rotating the driven calibration wheel 145 rotates the calibration cam 177, presenting various surfaces to the calibration arm 176. The calibration arm 176 is biased against the calibration cam 177 by a spring 179, which prevents inadvertent motion of the calibration arm 176, and is positioned adjacent to the plurality of openings 174. The purpose of the calibration arm, as is known in the art, is to be positioned so that it may cover part of each opening 174 as it rotates by to insure that only one pill or medication unit is carried by each of the plurality of openings 174. The position of the calibration cam 177 determines the position of the calibration arm 176 which in turn insures that only one pill or medication unit is carried by each of the plurality of openings 174. By knowing the size of the pills before hand, the calibration cam 177 and calibration arm 176 can be set so that each of the plurality of openings 174 carries only one pill. A sensor gate 180 may be provided proximate to sensor openings 153 (seen in FIG. 19).

The bulk storage chamber 162 and pickup area 163 of FIG. 24 are similar to corresponding chambers disclosed in U.S. Pat. No. 4,697,721, which is hereby incorporated by reference, although the present invention does not rely upon mechanical agitation of the pills in the bulk storage chamber 162. The lower portion of the bulk storage chamber 162 is tapered to encourage pills to flow toward the openings 159 in the divider wall 158 between the bulk storage chamber 162 and a pickup area 163. Several small holes 167 perforate the tapered, lower portion of the bulk storage chamber 162 allowing air flow to be directed through the bulk storage chamber thereby creating an agitation effect on the pills. This pill agitation prevents the pills from jamming between the bulk storage chamber 162 and the pick-up area 163 and ensures an adequate quantity of pills in the pick-up area 163 for proper dispensing. During replenishment, the pills are poured into the bulk storage chamber 162.

The feed rate of the system is dependent upon the quantity of pills in the pickup area 163. As the rotatable conveying wheel 172 rotates through the pick-up area, there must be sufficient numbers of pills nearby to ensure that one of the pills can be captured and lifted by each of the plurality of openings 174. If there are too many pills present, they push each other off the openings 174, because of congestion in the area. If there are too few pills, not enough pills will be available for capture by the plurality of openings 174.

The operation of the cassette and the functions of the various components will be described in detail herein below in conjunction with the description of an exemplary embodiment of a counting and dispensing unit illustrated in FIGS. 25-32. Generally, however, upon insertion of the cassette 20 into a counting and dispensing unit, a vacuum source is provided which causes the flexible dust cover 147 to flex thereby exposing openings 174 to the vacuum source. The driven side 146 of conveying wheel 172 is connected to a source of rotary motion which rotates rotatable conveying wheel 172. The bottom portion of rotatable conveying wheel 172 (as seen in FIG. 23), rotates through a quantity of medication with certain of the medication becoming entrapped by the plurality of openings 174. As the openings 174 rotate past calibration arm 176, which has been previously set, calibration arm 176 insures that only a single pill is carried beyond calibration arm 176. If the calibration arm 176 is set too low, fewer pills remain held in place and the feed rate is lowered significantly. If the calibration arm 176 is set too high, multiple pills may be on a single opening when it passes counting sensor 318. That results in inaccurate counting if the sensor cannot distinguish between multiple and single pills. As the plurality of openings 174 rotate past baffle 166 and entrance end of discharge chute 164, the vacuum is blocked by the baffle 166 such that the pill is released from rotatable conveying wheel 172 and falls into discharge chute 164. As the vacuum is being drawn, air enters the cassette 20 through the air inlet 156 in the bottom wall 142, through intake valve 165, and through small holes 167 thereby agitating the pills to increase the probability that an adequate supply of pills will be available in pick-up area 163, such that each of the plurality of openings 174 may pick up a pill as the plurality of openings 174 rotate through the volume of pills stored in the pick-up area 163. At an appropriate time, discussed herein below, the chute gate 160 is opened to allow any pills in the discharge chute 164 to exit the cassette 20. Counting may, or may not, continue after the chute gate 160 is opened depending upon whether the number of pills precounted into the discharge chute 164 before opening of the chute gate 160 is equal to the number of pills to be dispensed.

Figure 25:
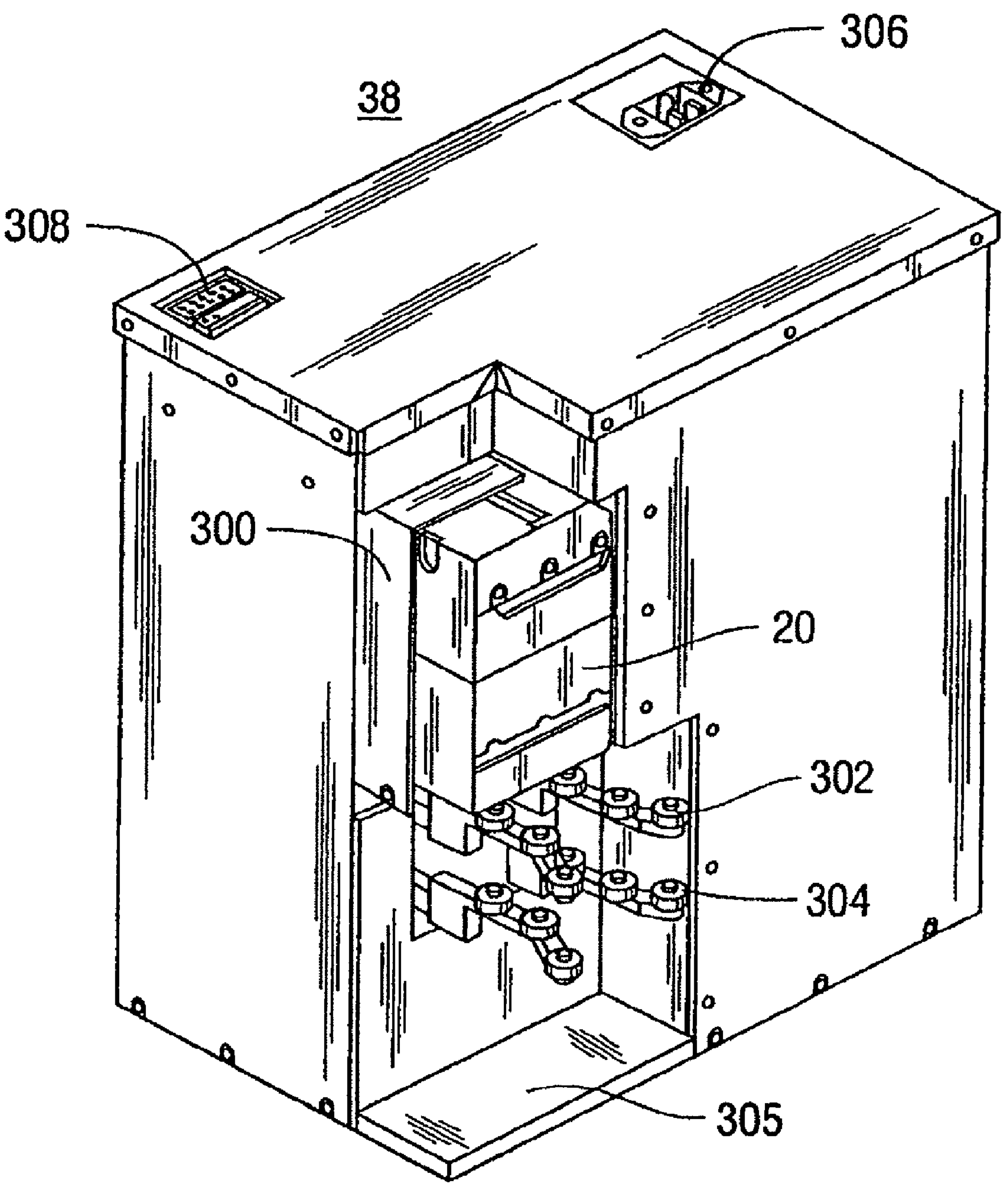
FIG. 25 is a perspective view of one example of a pill counting and dispensing unit.

One example of a counting and dispensing unit 38 which may be used in connection with the embodiments of the prescription filling apparatus 10 disclosed herein is shown in FIGS. 25 through 32. In FIG. 25, the counting and dispensing unit 38 is seen to have a cassette loader 300 (shown in detail in FIG. 28) into which a cassette 20 has been inserted. An upper, four bar linkage 302 and a lower, four bar linkage 304 are illustrated. The linkages 302, 304 provide a passive mechanism for holding a vial. In the alternative, the linkages 302, 304 may be eliminated and the vial brought to rest against a base 305 of the counting and dispensing unit 38.

Also illustrated in FIG. 25 is a power connection 306 and signal inputs 308. Those of ordinary skill in the art will recognize that the location of power connection 306 and signal inputs 308 may be varied while remaining within the scope of the present invention.

Figure 27B:
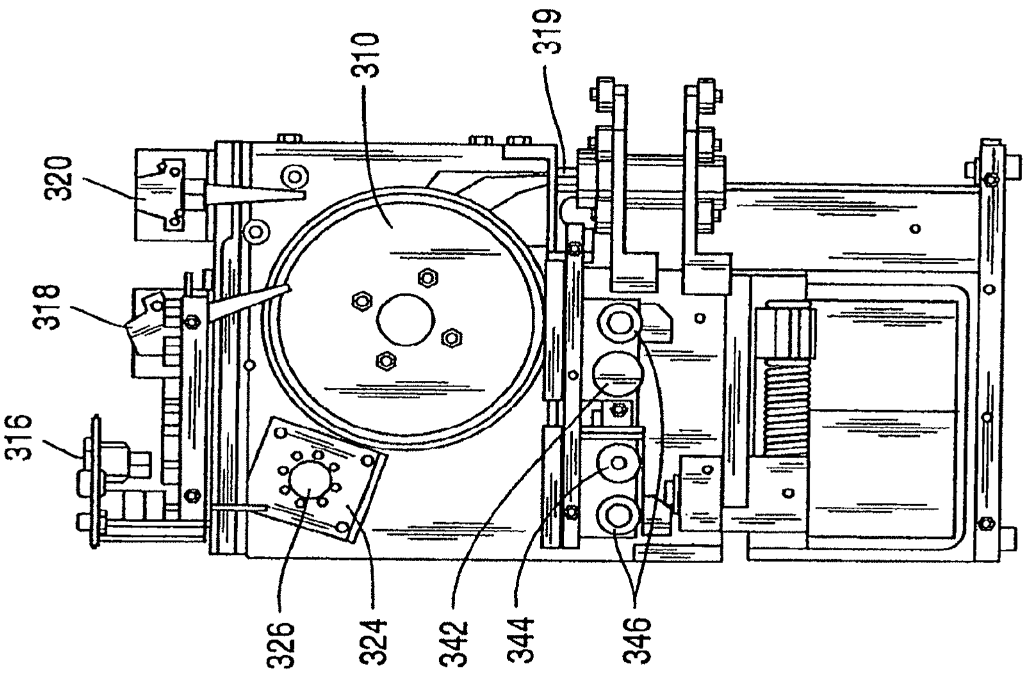
FIGS. 27A and 27B are right and left side views, respectively, with parts removed, of the counting and dispensing unit of FIG. 25.

Turning now to FIG. 26, a perspective view taken from the rear of the counting and dispensing unit 38 with its enclosure removed is illustrated. In FIG. 26 it can be seen that one side of the loader 300 is open and faces a drive wheel 310. The drive wheel 310 is configured (tapered as shown in FIG. 27B) to mate with the driven side 146 of the conveying wheel 172 (see FIG. 20). The tapered mating surfaces also insure the rotatable conveying wheel 172 rotates concentric to the drive wheel 310, which maintains the openings 174 in alignment with a focal point of a counting sensor 318. The tapered surfaces also improve the seal along the periphery of these two rotatable components, although there is a small gap between the drive wheel 310 and the driven side 146 sufficient to enable flexible dust cover 147 to flex so that the openings 174 are exposed to the vacuum source. The drive wheel 310 is connected to a top pulley 311, seen best in FIG. 27A. Returning to FIG. 26, a drive motor 312 is connected to a bottom pulley 313 seen best in FIG. 27A. The top pulley 311 and the bottom pulley 313 are connected by a belt 314. As is known in the art, belt 314 could be replaced by a chain or a gear drive. Alternatively, drive wheel 310 could be connected directly to the drive shaft of drive motor 312. Those of ordinary skill in the art will recognize that numerous alternatives to the motor, pulley, belt configuration illustrated in the figures are possible while remaining within the scope of the present invention.

Also visible in FIG. 26, and FIG. 27B, are a plurality of sensors. Cassette-in sensor 316, which may take the form of a switch, indicates whether a cassette 20 is positioned within loader 300.

The counting sensor 318 and gate sensor 320 are positioned as shown in the figures and are, preferably, sensors of the type which rely upon a beam of light. Counting sensor 318 and gate sensor 320 are positioned so as to shine a beam of light through sensor openings 153 (see FIG. 19) in the top wall 141 of the cassette 20. The counting sensor 318 may be of the type that relies upon the light beam to bounce back when a pill or medication unit is carried by the rotatable conveying wheel 172 (see FIG. 23) through the light beam. Similarly, the gate sensor 320 may be of the type that relies upon the light beam to bounce back to indicate that the chute gate 160 is closed. Those of ordinary skill in the art will recognize that other types of counting sensors and gate sensors may be used while remaining within the scope of the present invention.

Also seen in FIG. 26 is a filter-in sensor 322 which indicates when a filter is present within the counting and dispensing unit 38. The sensor could take the form of a switch or any other type of known device while remaining within the scope of the present invention.

Turning now to FIG. 27B, a vial-in sensor 319 may be provided to sense when a vial is present. The vial-in sensor 319 may take the form of a switch which changes state whenever a vial is present. Other types of sensors may be provided while remaining within the scope of the present invention. Also seen in FIG. 27B is a calibration board and sensor 324 provided for sensing the position of the permanent magnet 178 of the calibration cam 177 (see FIG. 20) of the cassette 20. The sensor may be a Hall effect sensor although those of ordinary skill in the art will recognized that any of a wide variety of sensors or switches may be used. If the position of the calibration cam 177 is not as expected, i.e., it does not match the information received by the counting and dispensing unit 38 for the prescription to be counted and dispensed, a drive block 326 may be used to drive the driven calibration wheel 145 to set the calibration cam 177 to the proper setting. One means for driving the drive block 326 is illustrated in FIG. 27A.

Figure 27A:
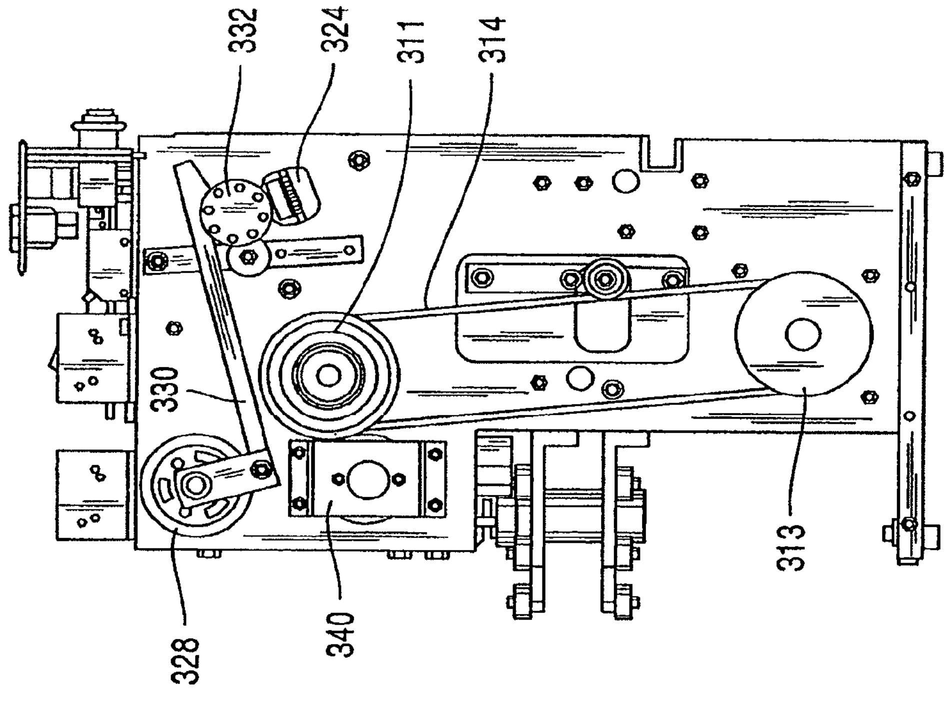

In FIG. 27A, a rotary solenoid 328 acting on a ratchet arm 330, which in turn rotates a calibration drive 332 is illustrated. The position of the cam 177 is sensed by the calibration board and sensor 324. In this manner, the calibration cam 177 (see FIG. 23) of the cassette 20 may be stepped through its various surfaces to present the desired surface to the calibration arm 176. Those of ordinary skill in the art will recognize that other means for driving the calibration cam 177, such as a stepper motor, servo motor, or other types of devices for directly providing rotary motion, or for converting linear motion into rotary motion, may be provided while remaining within the scope of the present invention.

Also visible in FIG. 27A is a gate solenoid 340. The purpose of the gate solenoid 340 is to provide a force (directly or indirectly) against the chute gate actuator 144 to overcome the bias force holding the chute gate 160 in the closed position to thereby allow the chute gate 160 to assume an open position. Thus, the gate solenoid 340 provides a means for moving the chute gate 160 from its closed to its open position. Those of ordinary skill in the art will recognize that many types of mechanical equivalents of the gate solenoid 340 may be provided. For example, a pin could be provided on the counting and dispensing unit 38 which engages the chute gate actuator 144 such that the chute gate 160 is moved from the closed to the open position upon insertion of the cassette into the loader 300. A stepper motor or servo motor could also be provided. In a similar manner, another pin or pins could be provided on the counting and dispensing unit 38 to engage the pre-chute gate 170 and the sensor gate 180 to move those gates into the open position. Those of ordinary skill in the art will recognize that the pre-chute gate 170 and sensor gate 180 could be moved to the open position by solenoids or other electronic or pneumatically driven devices. Such devices (pins, solenoids, motors, pistons, etc.) constitute means for opening the pre-chute gate 170 and sensor gate 180.

Figure 28:
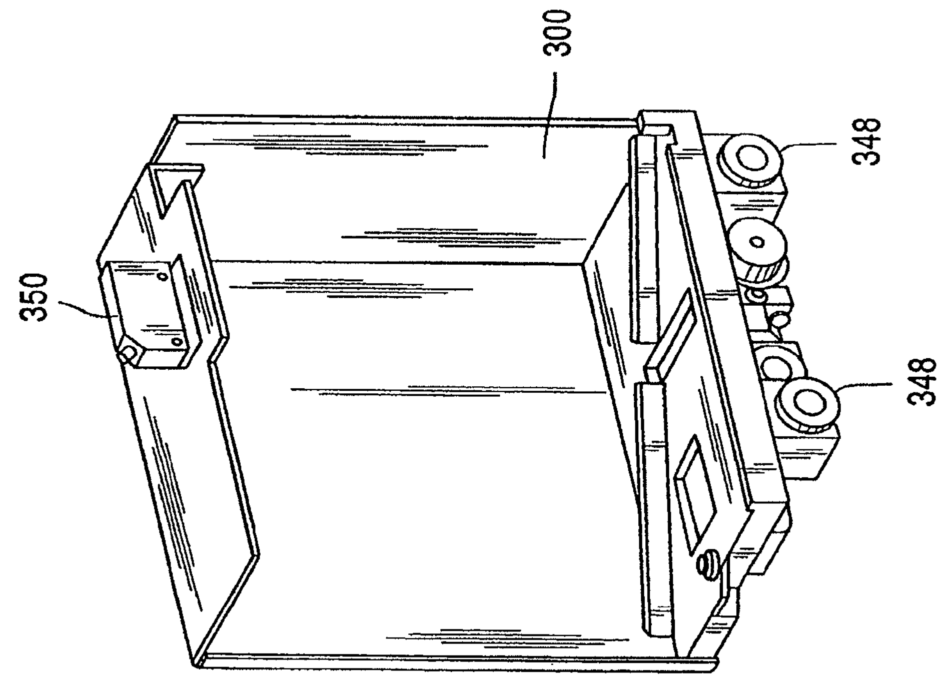
FIG. 28 is a perspective view of one embodiment of a loader.
Figure 30:
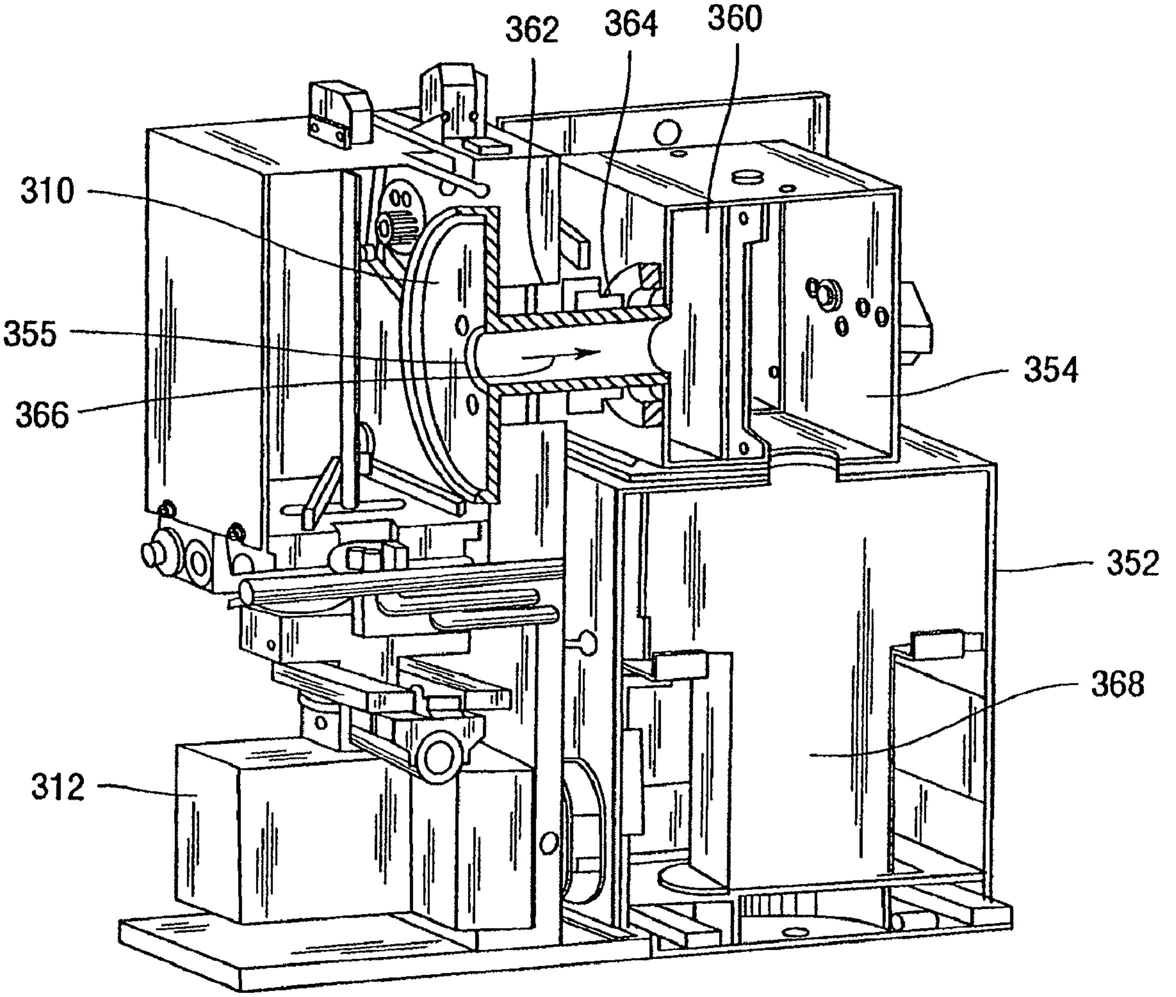
FIG. 30 is a cutaway view taken from an angle similar to the angle of the view of FIG. 26.

In FIG. 27B, a load solenoid 342 for pulling the cassette loader 300 laterally into an operative position is illustrated. An eject or unload solenoid 344 is provided for moving the cassette loader 300 out of the operative position. The load solenoid 342 and eject solenoid 344 constitute a means for moving the loader 300. Other means for moving the loader could include motors, hydraulic mechanisms, springs, etc. Also illustrated are linear bearing slide pins 336 for guiding the motion of the cassette loader between the inoperative and the operative positions. As shown in FIG. 28, the cassette loader 300 has a pair of linear bearings 348 for receiving the linear bearing slide pins 346. The ability of the cassette loader 300 to move laterally simplifies the insertion and removal of the cassettes into and out of, respectively, the counting and dispensing unit 38.

The cassette loader 300 may optionally be provided with a cassette level sensor 350. The cassette level sensor 350 may preferably be an optical device whose beam penetrates the tinted or translucent cassette housing 134 but is blocked by the presence of any amount of pills, but not pill dust. The cassette level sensor 350 is positioned to detect when the level of pills drops below a predetermined volume.

Figure 29:
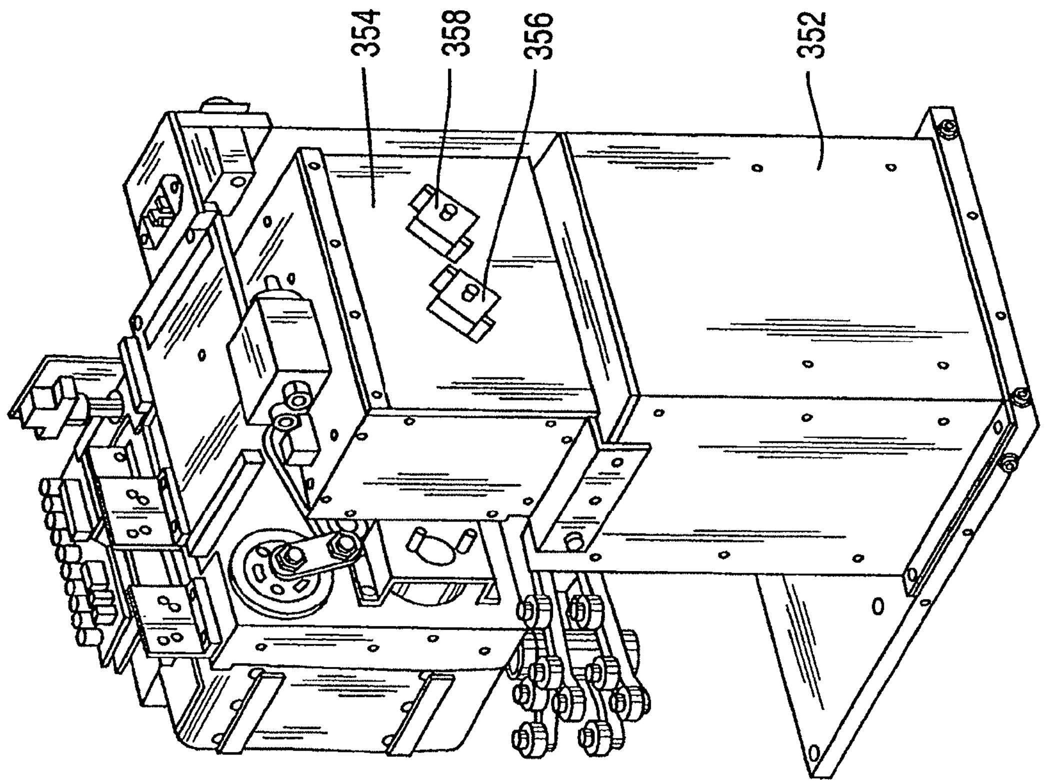
FIG. 29 is a perspective view from the left rear of the pill counting and dispensing unit of FIG. 25 with the housing removed.

FIG. 29 illustrates a vacuum box 352, an air box assembly 354, a dirty filter switch 356 and a vacuum switch 358. As seen most clearly in FIG. 30, the vacuum box 352 is in communication with the air box assembly 354 which in turn is in communication with a port 355 located concentrically on drive wheel 310 through a filter 360. Appropriate bearings 362 and seals 364 are provided so that a vacuum may be pulled in the direction of the arrow 366 by a vacuum motor 368.

Figure 31:
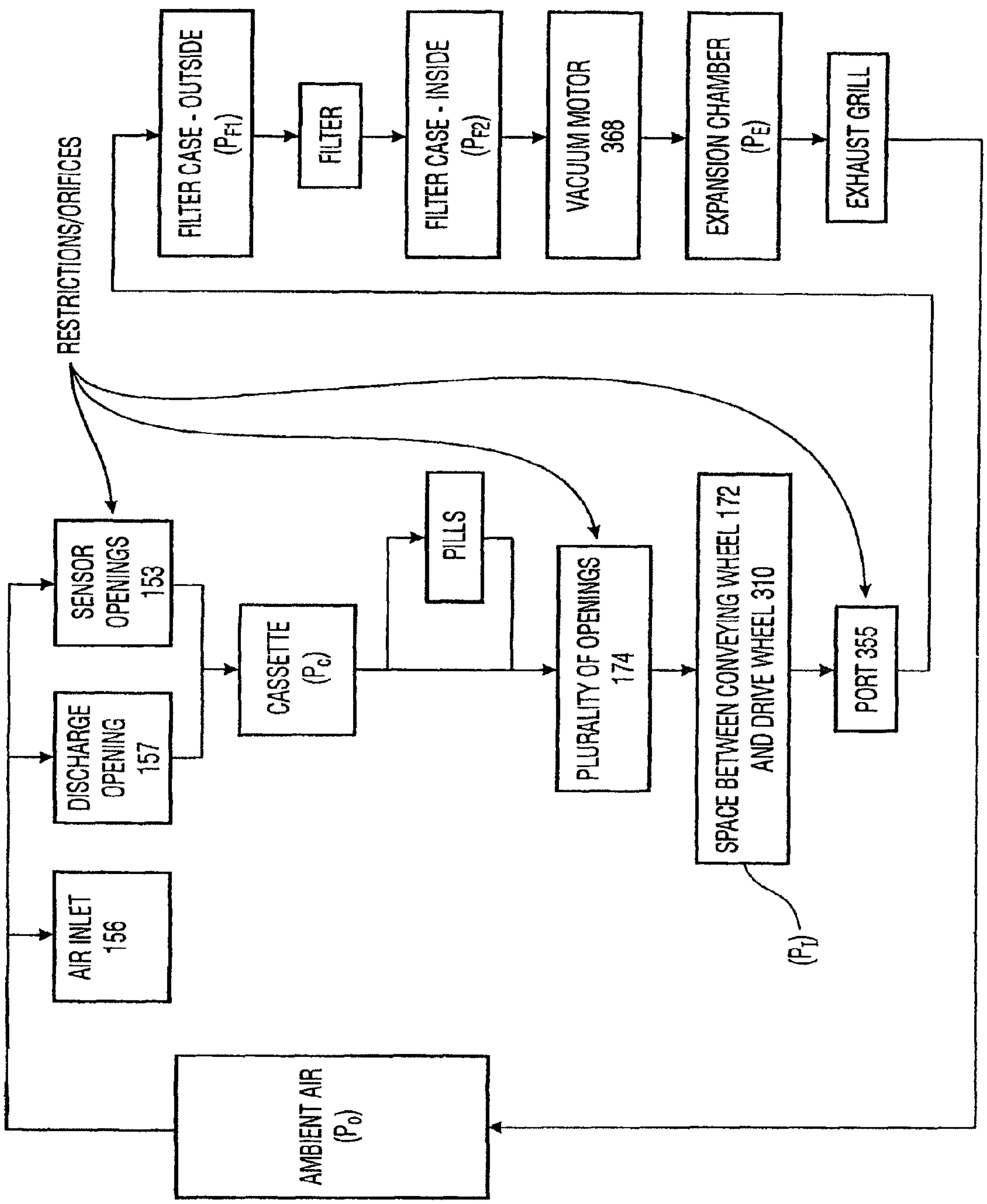
FIG. 31 is a diagram illustrating the air flow within the pill counting and dispensing unit of FIG. 25.

During operation, air flow is as shown in FIG. 31. Ambient air flows into the cassette 20 through the air inlet 156, discharge opening 157 and sensor openings 153, across the pills, through the openings 159 in divider wall 158, through the plurality of openings 174 on the rotatable conveying wheel 172, through the port 355 on the drive wheel 310. The air flow proceeds unrestricted through the large port 355 directly into the air filter 360. Once the air flow has passed through the filter 360, the air flow converges and immediately travels into the vacuum motor inlet port where it is compressed by the vacuum motor 368, and finally exhausted out an exhaust grill of the counting and dispensing unit 38.

The high velocity of the air as it enters the small openings 174 on the rotatable wheel 172 moves the pills to the openings. The magnitude of the net aerodynamic force acting on the pills increases with surface area and is a function of pill shape and orientation. However, in general, a large, lightweight pill requires less air flow to move than a small, heavy pill. When the pills move to cover the openings 174, the pressure differential across the rotatable wheel 172 ($P_c$–$P_1$) exerts a holding force on the pills. This force increases both with the size of the opening 174 and the pressure differential across the rotatable wheel 172. The holding force must be sufficient to lift the pills vertically out of the pickup area and past the calibration arm 176. A larger opening 174 tends to lower the pressure differential because it is less of a restriction to the air flow.

Figure 32:
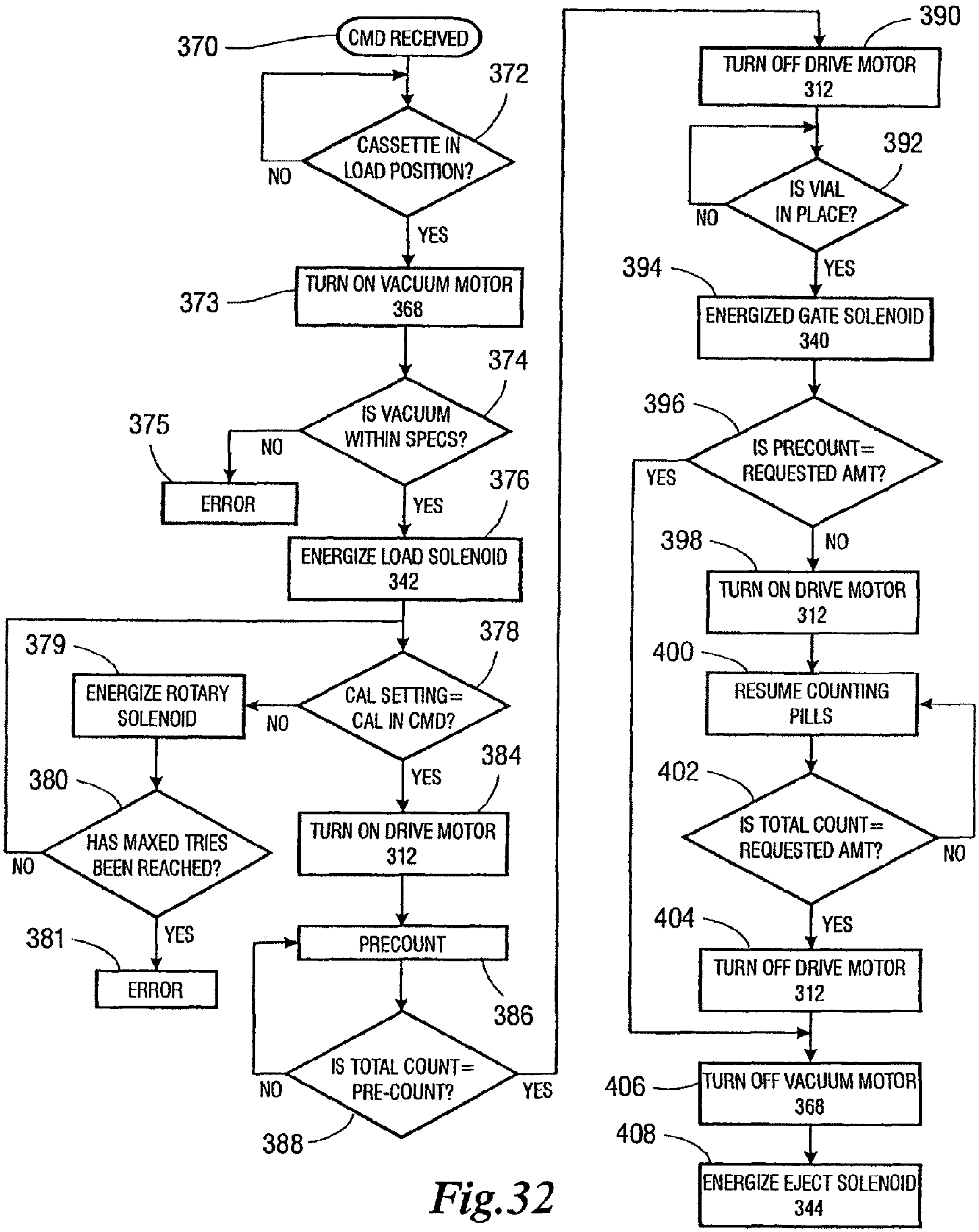
FIG. 32 is a diagram illustrating the operation of the pill counting and dispensing unit of FIG. 25.

FIG. 32 is a diagram illustrating one example of the operation of the counting and dispensing unit 38 of FIG. 25. The counting and dispensing unit 38 carries onboard electronics and/or computing capability sufficient to perform at least the process shown in FIG. 32. The counting and dispensing unit 38 may also carry electronics or software for communicating with equipment located outside of prescription filling apparatus 10 for diagnostic or emergency operation if there is a problem. The process begins at step 370 where a command is received. The command includes information such as a precount number, a requested amount, which may or may not be equal to the precount number, and a setting for the calibration cam 177. At step 372, the cassette-in sensor 316 is interrogated and a determination is made if a cassette 20 is in the cassette loader 300. If not, the process remains at step 372 until the presence of the cassette is confirmed.

When the presence of a cassette is confirmed, the process continues with step 373 in which the vacuum motor 368 is turned on. At step 374, the vacuum switch 358 is interrogated to determine if the vacuum is within specifications. If it is not, an error message is generated at step 375 and the process is halted. If, however, at step 374 the vacuum is within specifications, the load solenoid 342 is energized at step 376 to move the cassette loader 300 into the operative position.

At step 378, the calibration setting of the calibration cam 177 is read and compared to the calibration setting in the received command. If they are not the same, the rotary solenoid 328 is energized at step 379 and the sensor 324 is monitored until the desired calibration setting has been received. If the calibration action fails, for example if a maximum number of tries has been attempted but the calibration is still not proper as shown by step 380, an error is generated at step 381 and the process is halted.

At step 384, after the calibration has been verified and/or set, the drive motor 312 is turned on. Counting, referred to as pre-counting at this point in the process, begins at step 386 by monitoring the counting sensor 318. At step 388, the total count from step 386 is compared to the precount in the received command signal. If the total count at step 388 does not equal the precount, counting continues at step 386. When the total count from step 386 equals the precount, the motor 312 is turned off at step 390. A maximum time of, for example, three seconds may be allowed between pill counts. If that maximum time is exceeded for any reason, such as pills stop feeding, cassette runs empty, etc., an error is generated and the process is halted.

At step 392, the vial-in sensor 319 is interrogated to determine if a vial is in place. The process remains at step 392 until a positive indication is received that a vial is in place, or until a timer times out. If the timer times out, an error is generated and the process is halted.

At step 394, the gate solenoid 340 is energized which acts upon the chute gate actuator 144. That allows the precounted pills in the discharge chute 164 to exit the cassette 20 into the vial. The gate solenoid 340 could be repeatedly energized to rapidly open and close the chute gate 160 to insure all pills in the discharge chute 164 fall freely into the vial.

At step 396, it is determined whether the precounted number of pills equals the requested amount. If not, once again the drive motor 312 is turned on at step 398 and counting resumes at step 400.

Counting continues until, at step 402, a determination is made that the total count, i.e. the amount counted at step 386 plus the amount counted at step 400, equals the requested amount in the received command. At that time, the drive motor 312 is turned off at step 404. Thereafter, at step 406 the vacuum motor 368 is turned off, and the gate solenoid 340 actuated to close chute gate 160. However, if at step 396 it is determined that the precount equals the requested amount, process flow continues directly with step 406. After step 406, the eject solenoid 344 is energized at step 408. When both the filled vial and the cassette are removed, as demonstrated by interrogation of cassette-in sensor 316 and vial-in sensor 319, respectively, the process is ready to be repeated for filling additional prescriptions.

The precount feature of the present invention allows a certain number of pills to be loaded into the discharge chute 164 thereby enabling counting to start even if a vial is not yet in place at the counting and dispensing unit 38. Furthermore, for prescriptions of a small volume, where the precount may equal the total requested amount, counting may be completed by the time a vial is placed at the counting and dispensing unit 38. Thus, the ability to precount provides a mechanism for speeding up the prescription filling process.

Another method of operating the counting and dispensing unit 38 includes the steps 370, 372, 373, 374, 376, 378, 379, 380 and 384 of FIG. 32. However, once a pill is detected at counting step 386, the drive motor 312 is deenergized awaiting a vial. Once a vial or container is sensed as being in place, gate solenoid 340 is energized, drive motor 312 is turned back on, and counting begins by counting and dispensing medication directly into the vial or container until the desired quantity is reached.

Another method of operating the counting and dispensing unit 38 includes a method of determining the proper calibration cam 177 position for any new or unclassified pill. The operator enables a calibration learning mode which instructs the operator to place a pill cassette filled with the new or unclassified pill into the cassette loader 300. The operator will be instructed to place a large vial or container under the discharge opening 157. Once a vial or container is detected, the cassette is moved into the operative position and the calibration cam 177 is set to the most restrictive setting, the vacuum motor 368 is turned on and the drive motor 312 is turned on. The counting sensor 318 and receiver 319 monitor the intervals between sensed pills. The counting and dispensing unit 38 operates for sufficient time to allow the pills to be conveyed past the counting sensor 318 and dispensed. If the interval between pills is greater than the interval that would be measured if a pill was on each opening 174 of the rotatable conveying wheel 172, the process is stopped. Thereafter, the setting of the calibration cam 177 is increased by one position and the process is repeated.

Once the counting and dispensing unit 38 has achieved a calibration position that results in the steady flow of pills, the operator will be instructed to remove the vial or container and replace it with an empty container. The counting and dispensing unit 38 will then count and dispense a predetermined quantity of pills into the vial. The operator will then be instructed to confirm the quantity dispensed. The operator must manually count the dispensed pills to confirm the dispensed quantity. If the quantity dispensed is correct, the cam 177 setting is recorded. If the quantity dispensed is less than expected, the calibration position of the cam 177 is increased by one and the process repeated. If the quantity dispensed is more than expected, the calibration position of the calibration cam 177 is reduced by one, and the procedure repeated. If the counting and dispensing unit 38 attempts to adjust the calibration cam 177 setting below the smallest setting, the operator will be informed that a cassette with smaller openings 174 is needed before automatic calibration can be achieved.

Figure 33:
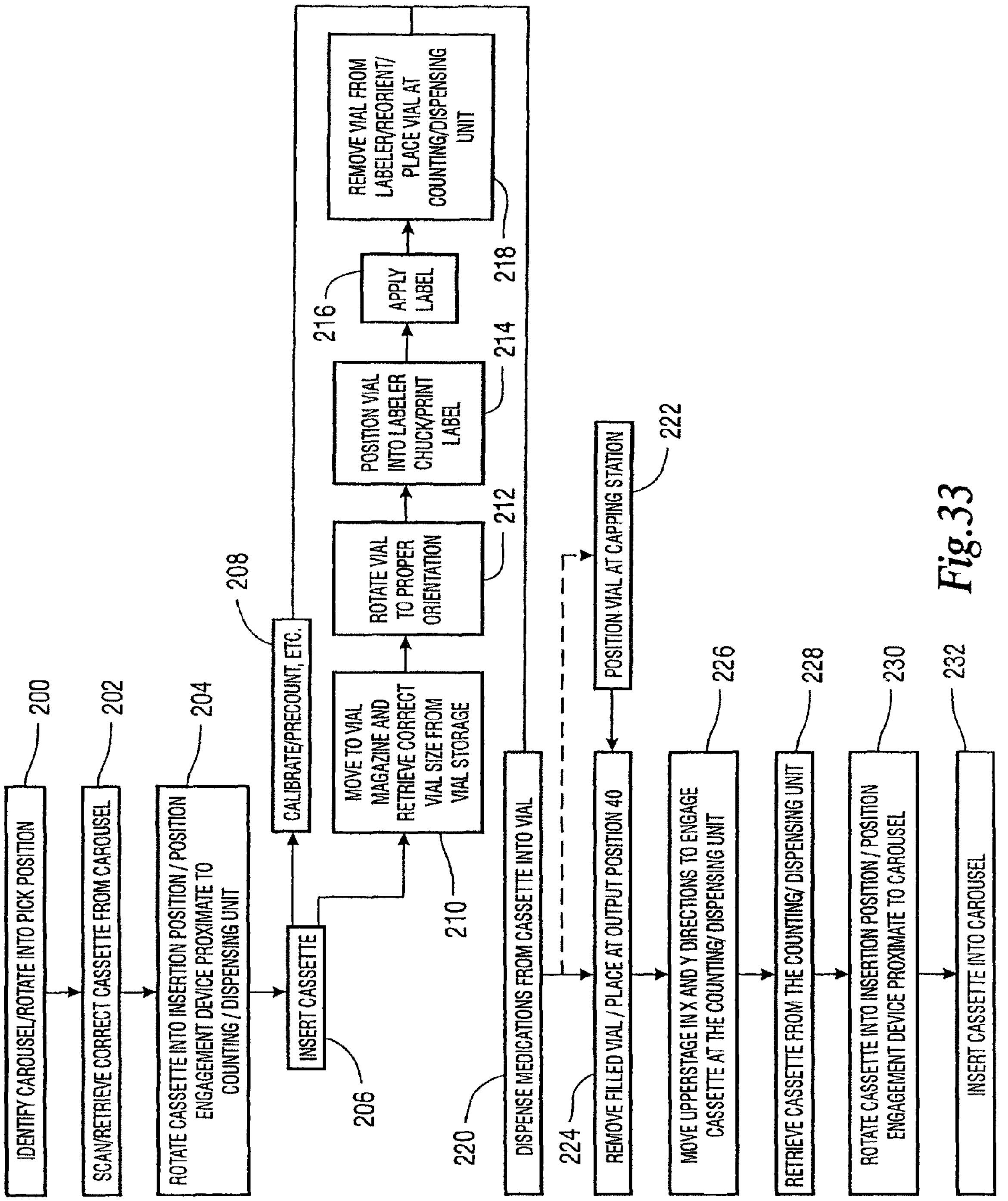
FIG. 33 is a flow chart illustrating a method of filling a prescription using the prescription filling apparatus of the present invention.

FIG. 33 is a flow chart illustrating a method of filling a prescription using the prescription filling apparatus 10 of the present invention. Before describing the exemplary process shown in FIG. 33 it should be noted that the order of the steps set forth in the figure and as recited in the claims is not critical such that the steps may be performed in any desired order, sequentially and/or in parallel. Of course, certain steps, such as the capping step, necessarily need to be performed after the dispensing step. Otherwise, the steps may be carried out in any desired order, which may be dependent upon such factors as the location of the various components, the time required to perform the step, etc.

At step 200, a computer or workstation identifies the carousel 16 or 18 carrying the desired cassette 20, and determines the position of the cassette 20 within the carousel. The carousel containing the desired cassette is rotated so that the desired cassette is positioned at the carousel's pick column. At step 202, the engagement device 22, 22' is positioned so that the upper stage 24 the engagement device 22, 22' is positioned at the cassette to be picked. That may involve rotating the upper stage 24 of the engagement device 22 clockwise approximately 60° from the insertion position for a pick from the left carousel 16 or counterclockwise approximately 90° from the insertion position for a pick from the right carousel 18. The bar code of the cassette may be scanned to insure that the proper cassette has been selected.

The engagement device 22, 22' is moved in the X direction (plus X or minus X depending upon whether the pick is from the right carousel 18 or left carousel 16 respectively), and then in the +Y direction, to cause insertion of the I-beam shaped members 126 into channels 49 carried by panel 46 and to lift the cassette 20 free of alignment pin 92. Thereafter, the engagement device 22, 22' is moved in the plus X direction to withdraw the desired cassette from the left carousel 16 or is moved in the minus X direction to withdraw a cassette 20 from right carousel 18.

At step 204, if the pick was from the left carousel, the cassette is rotated counterclockwise approximately 60° to the insertion position and if the pick was from the right carousel 18, the cassette 20 is rotated clockwise approximately 90° to bring the cassette into the insertion position. Preferably simultaneously, the engagement device 22, 22' is moved to a position so that the cassette 20 may be inserted into the pill counting and dispensing unit 38. At step 206, the cassette 20 is inserted into the pill counting and dispensing unit 38 by upper stage 24 of the engagement device 22, 22' moving in the Z direction.

At step 208, counting and dispensing unit 38 performs certain activities such as checking/setting the calibration of the cassette, pre-counting pills and the like as described in conjunction with FIG. 32. In parallel with step 208, at step 210, lower stage 26 of engagement device 22, 22' selects a vial of the correct size from the source of vials 30, 30' or other vial store. The bar code of the vial source may be scanned to insure that a vial of the correct size is selected. At step 212, the vial is oriented to the proper position, if necessary. At step 214, the engagement device 22, 22' is positioned proximate to the label printer and application unit 36, and lower stage 26 of engagement device 22, 22' positions the vial onto the chuck of the label printer and application unit 36. A label is printed, and at step 216, the printed label is applied to the vial. At step 218, lower stage 26 of engagement device 22, 22' removes the vial from the label printer and application unit 36 and reorients the vial as necessary. The engagement device 22, 22' is positioned proximate to the pill counting and dispensing unit 38, and the lower stage 26 places the vial at counting and dispensing unit 38.

At step 220 the chute gate 160 is opened to dispense the precounted pills. If the number of precounted pills does not equal the requested amount, counting/dispensing into the vial continues until the requested amount has been dispensed. After the medication is dispensed, the engagement device 22, 22' removes the filled vial from the counting and dispensing unit 38 and may place the filled vial at step 222 at an optional capping station. Thereafter, or directly from step 220, the filled vial is moved to an output position 40. The positioning of the filled vial at the output position at step 40 may be performed in such a manner that order grouping is accomplished. For example, vials for a single patient may be placed in the same output lane.

At step 226, the engagement device is positioned proximate to the cassette which is located at the pill counting and dispensing unit 38. At step 228, the cassette is removed from the unit 38 and at step 230 the cassette is rotated into the position necessary to insert the cassette back into its position in the carousel. At step 232 the cassette is returned to its position in the carousel. The "nose" of the cassette is mated with the appropriate portion of the alignment gear 90. Movement in the −Y direction causes disengagement of I-beam shaped members 126 from channels 49 while alignment pin 92 is positioned within alignment recess 155. If there are more orders to fill, the process may be repeated. If there are no more orders to fill, the process ends. Those of ordinary skill in the art will recognize that certain steps may be performed before others such that the order of the steps in FIG. 33 is not critical to the present invention.

Figure 34A:
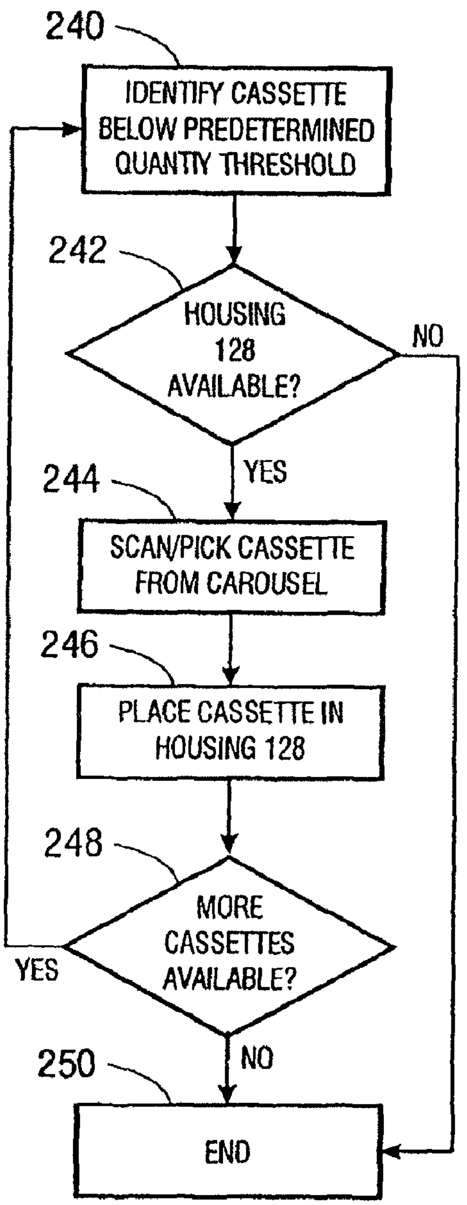
FIGS. 34A and 34B are two flow charts illustrating a refill process.
Figure 34B:
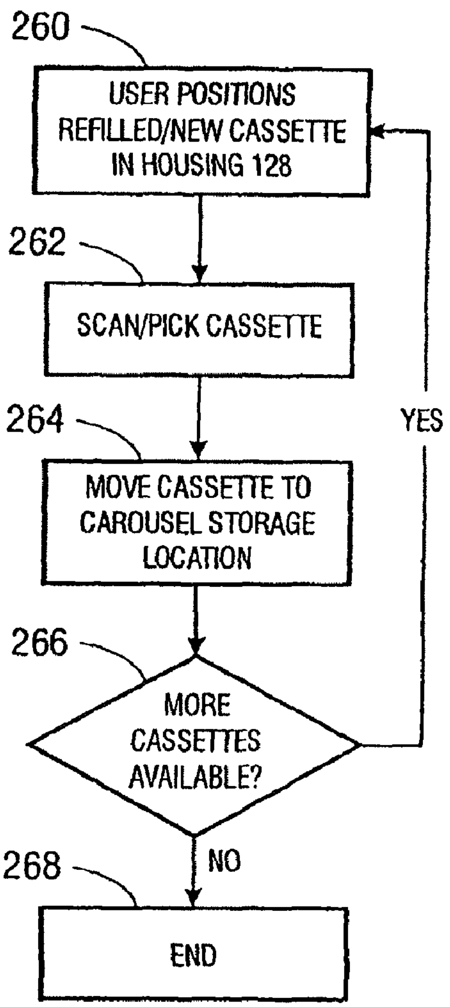

FIGS. 34A and 34B are two flow charts illustrating a refill process. As shown in flow chart 34A, at step 240 a computer or workstation identifies cassettes below a predetermined threshold which should be refilled. Alternatively, cassettes needing repair or servicing, containing outdated or seasonal stock, containing stock to be replaced, etc., are identified. At step 242 a determination is made if a replenishment-in/replenishment out housing 128 available. If no, the process ends. If yes, at step 244 a scan and pick of that cassette is performed as discussed above. At step 246 the cassette is placed in the housing 128, rear door 129 is locked, front door 130 is unlocked, and LED's 131 are energized to indicate to the user that a cassette is ready for removal. The user may open front door 130 and take the necessary action with respect to the cassette. If more cassettes are to be refilled, serviced, swapped out, etc., as determined by step 248, the process repeats. If there are no more cassettes which need to be refilled, serviced, swapped out, etc., the process ends at step 250.

Referring now to FIG. 34B, after the cassette has been refilled, serviced, swapped out, etc., or if a new cassette is to be inserted in prescription filling apparatus 10, the user positions the cassette in the housing 128 at step 260. The user may enter information about the cassette placed in the housing 128 using, for example, keyboard or other input device 42. The engagement device 22, 22' operating in conjunction with the computer controlled system 28, retrieves the cassette from the housing 128, scans the cassette's bar code and places the cassette in the proper storage location in the proper carousel at steps 262 and 264, respectively. Thereafter, the process ends at step 268 unless the user has additional cassettes to be placed within apparatus 10 as determined at step 266.

Figure 35:
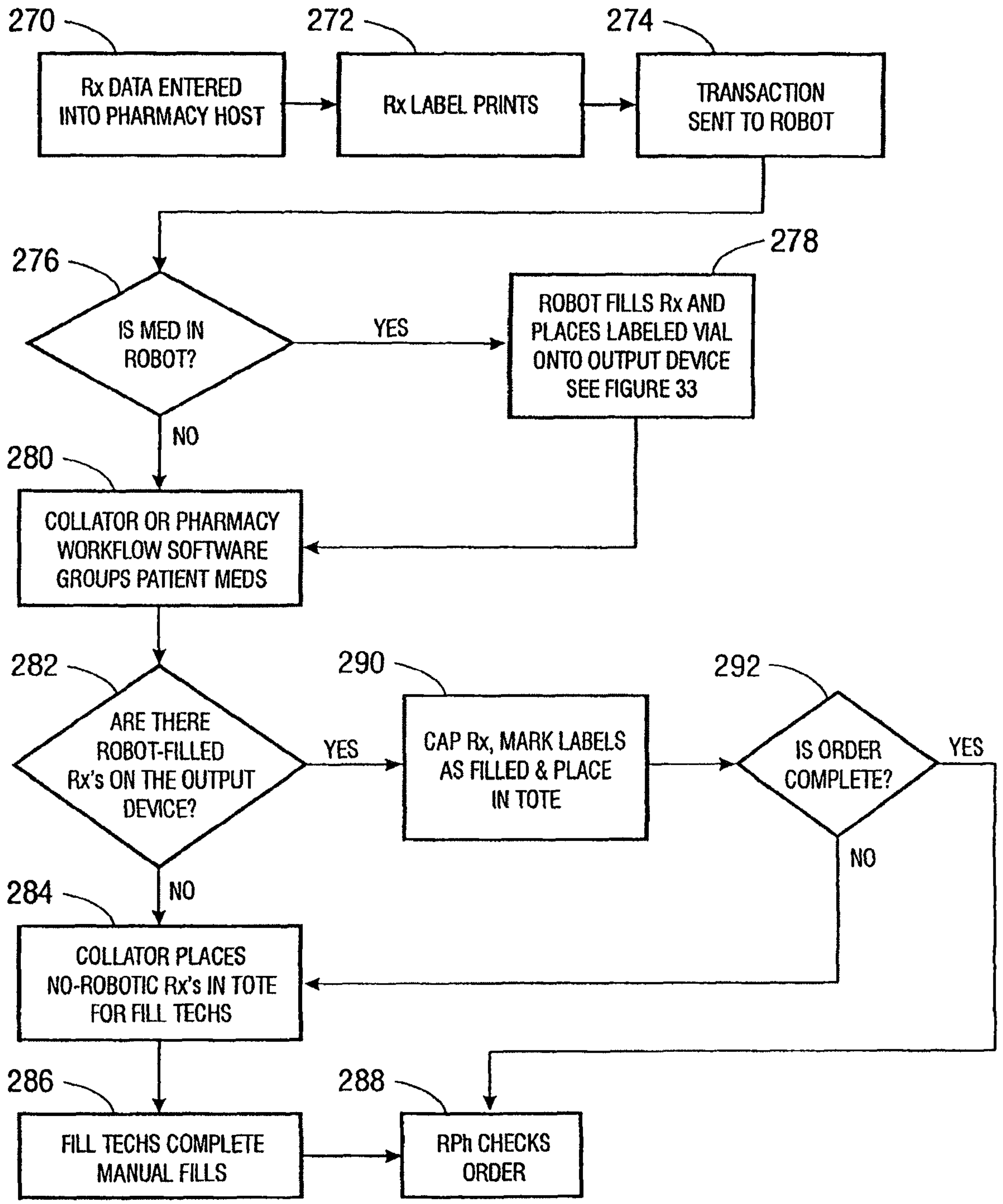
FIG. 35 is a block diagram of an overall process in which the prescription filling apparatus of the present invention may be used.

FIG. 35 illustrates an exemplary process for filling an order using the prescription filling apparatus 10 of the present invention. At step 270, prescription data is entered into a pharmacy host system. At step 272, prescription labels are printed and, at step 274, information regarding the prescription to be filled is sent to the prescription filling apparatus 10.

At step 276, the prescription filling apparatus 10 determines if the required medication is maintained within prescription filling apparatus 10. If yes, prescription filling apparatus 10 fills the prescription as described above in conjunction with, for example, FIG. 33 as shown by step 278. If the answer at step 276 is no, or after the prescription filling apparatus 10 places a labeled vial onto the output device, at step 280 a collator or pharmacy workflow software groups patient medications.

At step 282 a determination is made if there are prescriptions on the output device filled by prescription filling apparatus 10. If there are none, at step 284 the collator has no vials filled by prescription filling apparatus 10 to place in a tote or other device for fill technicians. At step 286 the fill technicians complete the fill process by performing manual fills, which are then checked at step 288 by registered pharmacists.

If, however, at step 282 there were filled vials in the output location, then at step 290 the vials are capped, (if not capped by the apparatus 10), the labels are marked as filled, and the prescriptions are placed in the tote. At step 292 a determination is made if the order is complete; if no, the process continues with step 284; if yes, the process continues with step 288. In that manner, the prescription filling apparatus 10 of the present invention may be incorporated into a pharmacy system.

Another method of filling a prescription involves the situation in which a cassette is depleted of pills before the desired quantity is dispensed. If the label is printed after filling rather than before filling, a prescription vial label representative of the partial quantity dispensed is generated and applied to the vial. Another cassette containing the same pills is selected and used in the foregoing process to dispense the remaining quantity of the patient prescription into a different vial, and appropriate labeling is provided.

Figure 36:
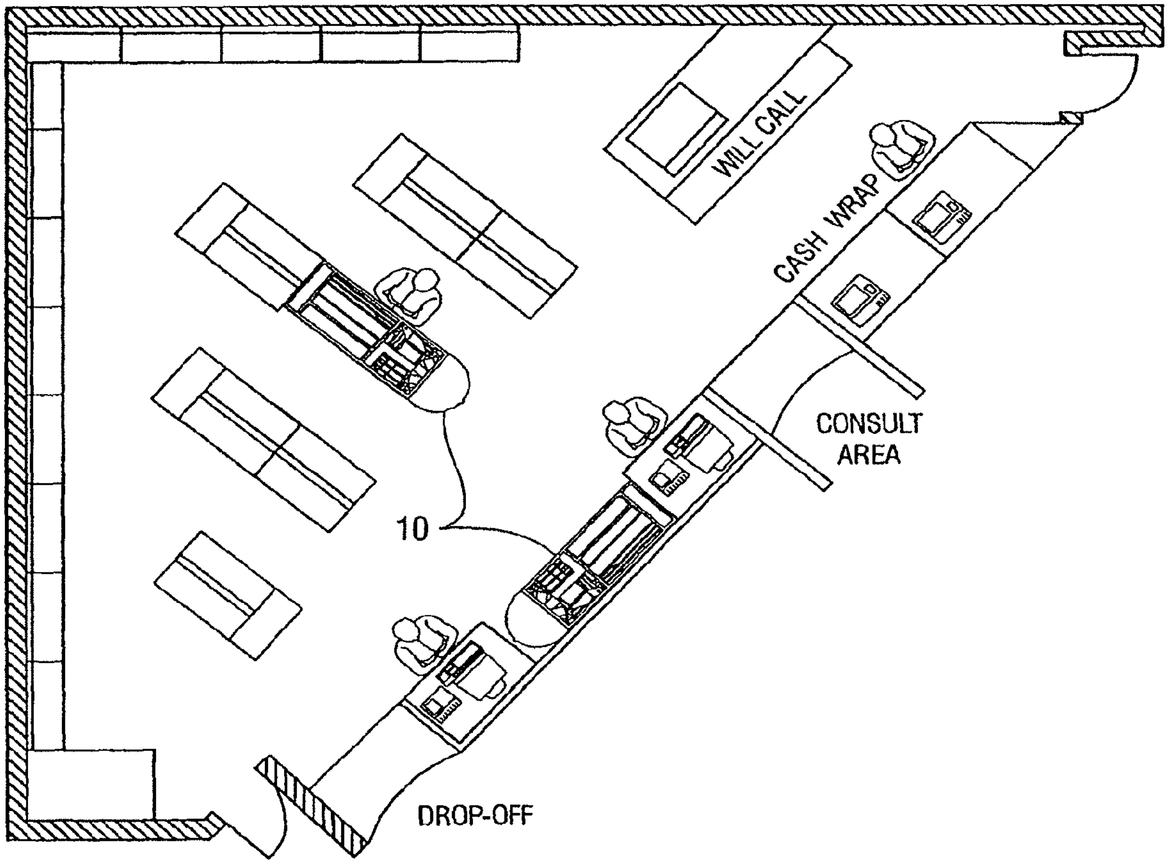
FIG. 36 is an exemplary floor plan using the prescription filling apparatus of the present invention.

FIG. 36 illustrates how the prescription filling apparatus 10 of the present invention may fit into a typical pharmacy layout. The modular, flexible design of the present invention provides the ability to easily upgrade on site from an apparatus having one carousel to an apparatus having two carousels. In one currently anticipated embodiment, each carousel may hold up to 104 medications.

The prescription filling apparatus 10 of the present invention provides safeguards against medication errors. For example the bar code reader can be used to verify that the correct drug is being dispensed. The counting and dispensing unit checks the calibration of the cassette and resets the calibration as needed. Operators are directed to the proper output location by pick lighting. The prescription filling apparatus 10 of the present invention provides maximum security in that vials may be placed in optional, lockable output bins or the like until personal with appropriate access authority requests the order.

The prescription filling apparatus 10 of the present invention is easy to use in that an optional capper/lid unit automates a manual step in the order fulfillment process. Additionally, instead of being used to fill prescriptions, the apparatus may be used to pre-pack medications for pre-pack management. The present invention also provides for order grouping and informing the user when an order is completed. A pharmacy can use vials ranging from 6 to 60 DRAM.

The prescription filling apparatus 10 of the present invention is low maintenance in that it uses cassettes that simplify the drug changing process (e.g. two cassettes for all drugs). Furthermore, the cassettes can be calibrated on site and are self-cleaning. Drug/vial replenishment is done without interruption to the dispensing process and vials can be easily accessed for replenishment, cleaning, swapping stock, etc.

While the present invention has been described in conjunction with presently preferred embodiments, those of ordinary skill in the art will recognize that many modifications and variations are possible. The present invention is intended to be limited only by the scope of the following claims and not by the scope of the disclosed exemplary embodiments.

What is claimed is:

1. A method, comprising:

applying a vacuum to at least certain openings of a plurality of openings in a conveying wheel;

rotating the conveying wheel through a pick-up area and past an entrance end of a discharge chute;

using input air to agitate medication from a chamber through an opening in a dividing wall and into the pick-up area; and automatically adjusting a calibration arm based on the medication to be dispensed.

2. The method of claim 1 additionally comprising conveying a predetermined number of medication units from said pick-up area to said discharge chute, and opening a gate to dispense the predetermined number from said discharge chute.

3. The method of claim 2 additionally comprising opening a valve at an entrance end of said discharge chute prior to conveying said predetermined number of medication units from said pick-up area to said discharge chute.

4. A method, comprising:

applying a vacuum to at least certain openings of a plurality of openings in a conveying wheel;

automatically adjusting a calibration arm based on the medication to be dispensed so that one medication unit is carried by each of the openings rotating the conveying wheel through a pick-up area and past an entrance end of a discharge chute to convey a predetermined number of medication units to said discharge chute; and opening a gate to dispense the predetermined number from said discharge chute.

5. The method of claim 4 additionally comprising using input air to agitate the medication from a chamber into the pick-up area.

6. The method of claim 4 additionally comprising opening a valve at an entrance end of said discharge chute prior to conveying said predetermined number of medications from said pick-up area to said discharge chute.

* * * * *